Figure 27:
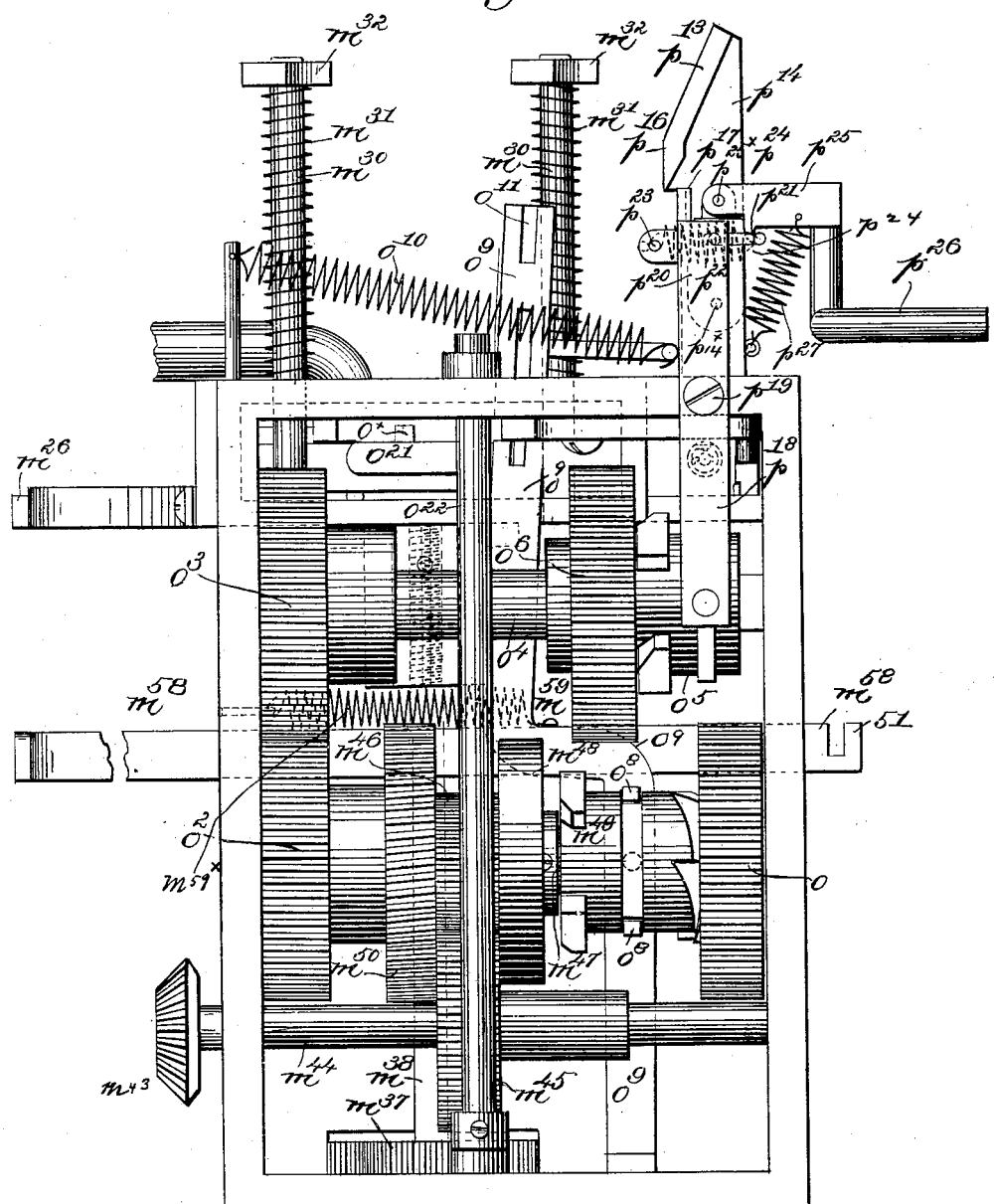

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 1.
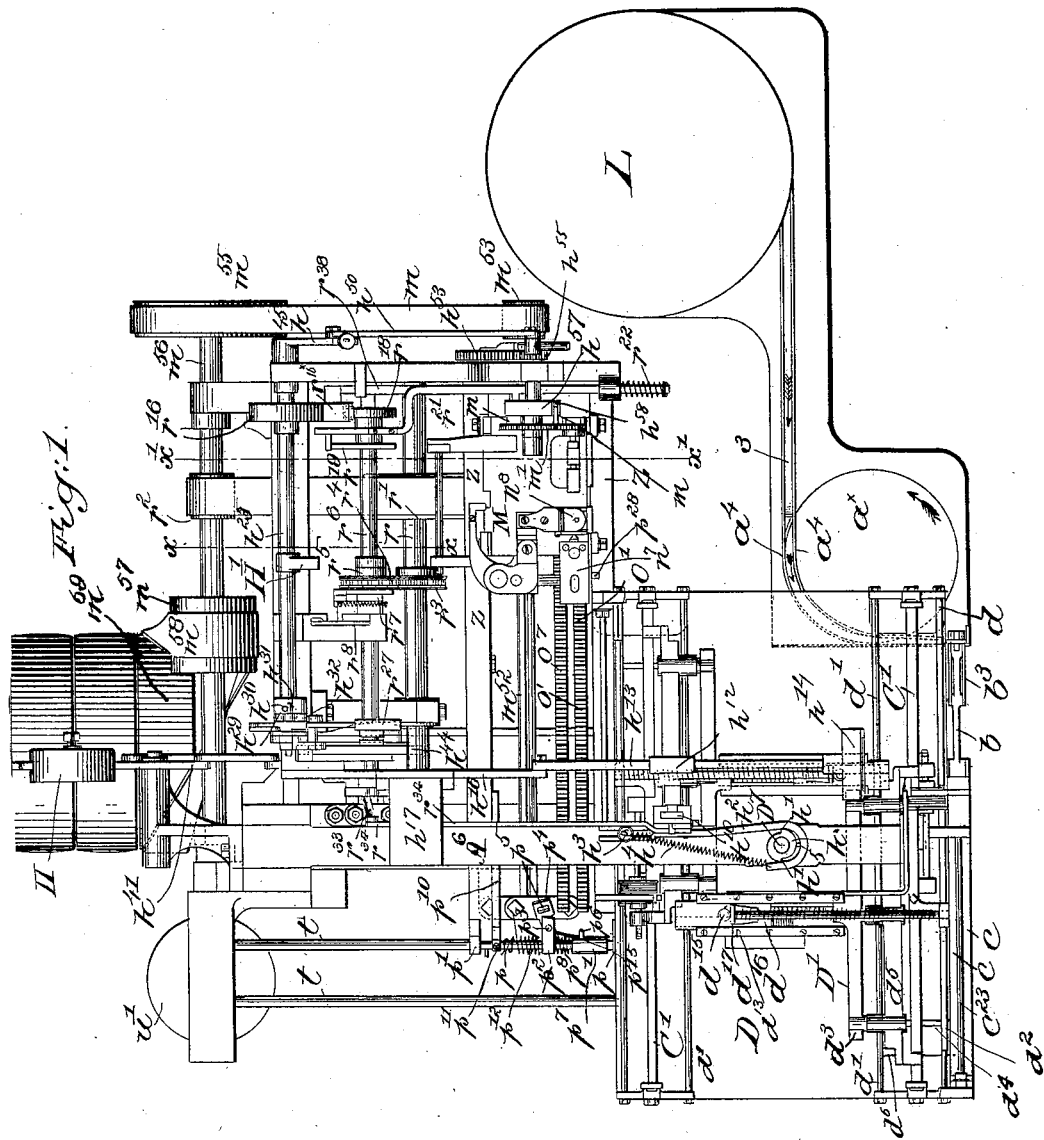
Witnesses:
Fred S. Greenleaf.
Louis N. Gowell
Inventor.
Patrick H. McGrath
by Crosby & Gregory
Atty's No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 2.
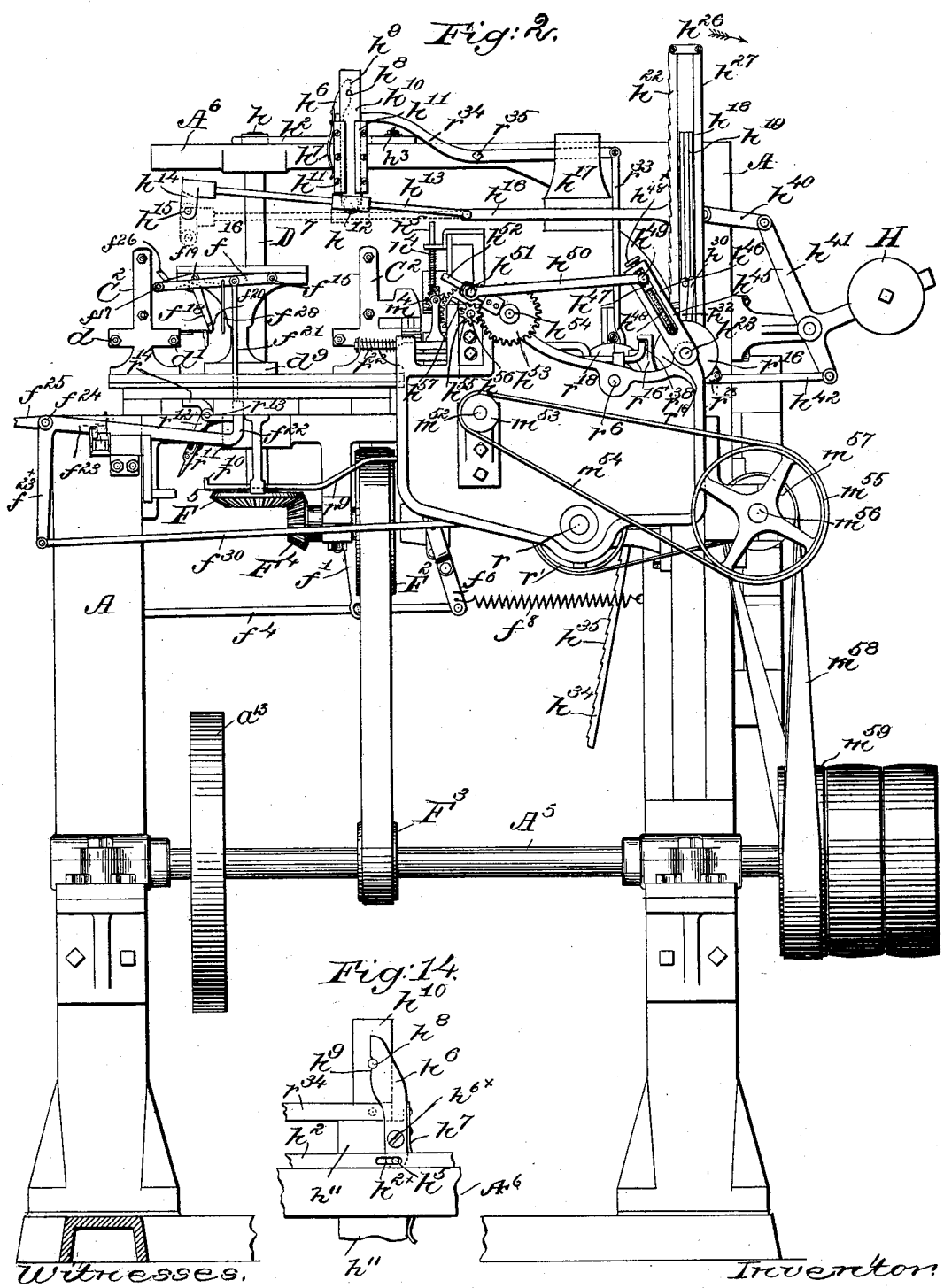

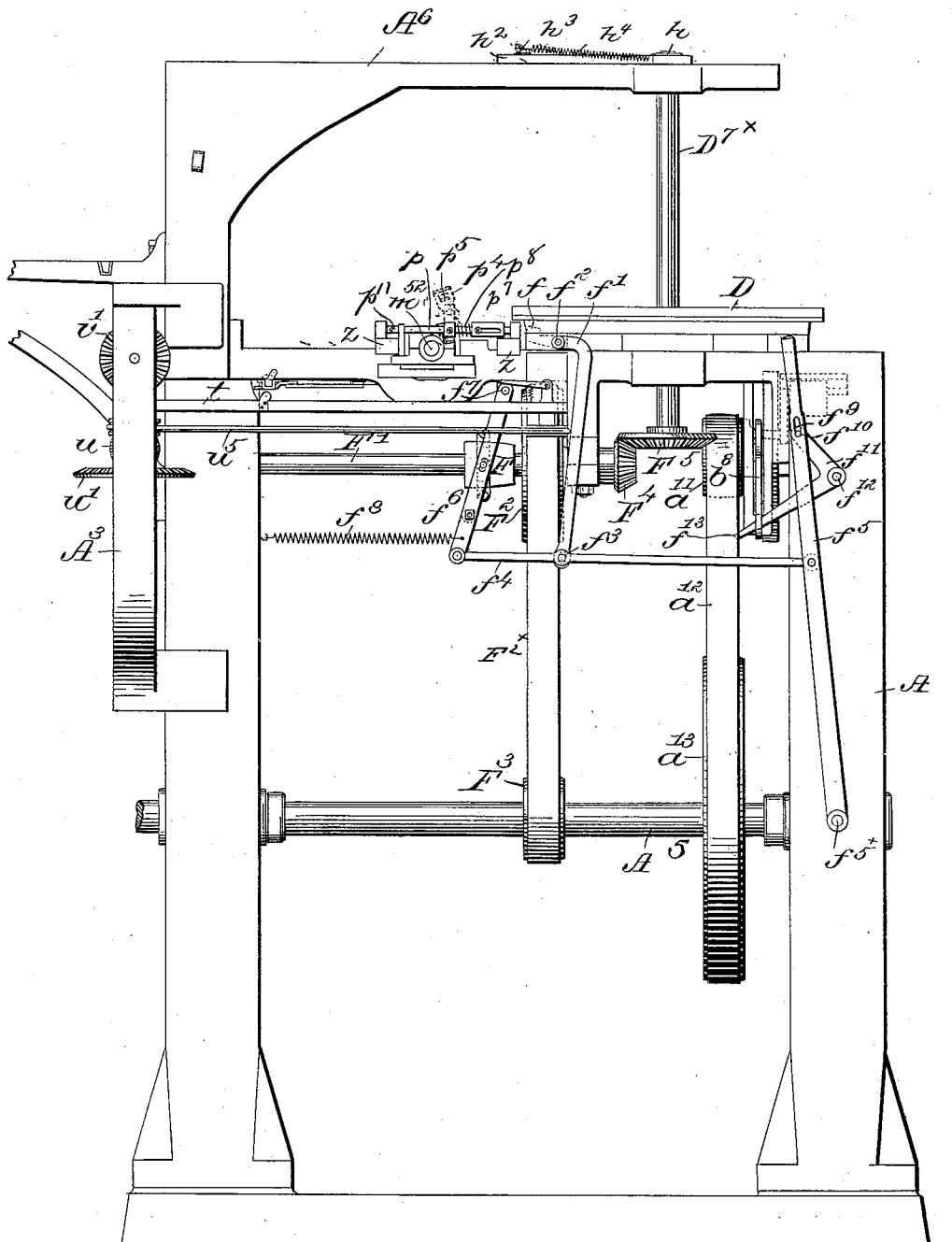

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 4.
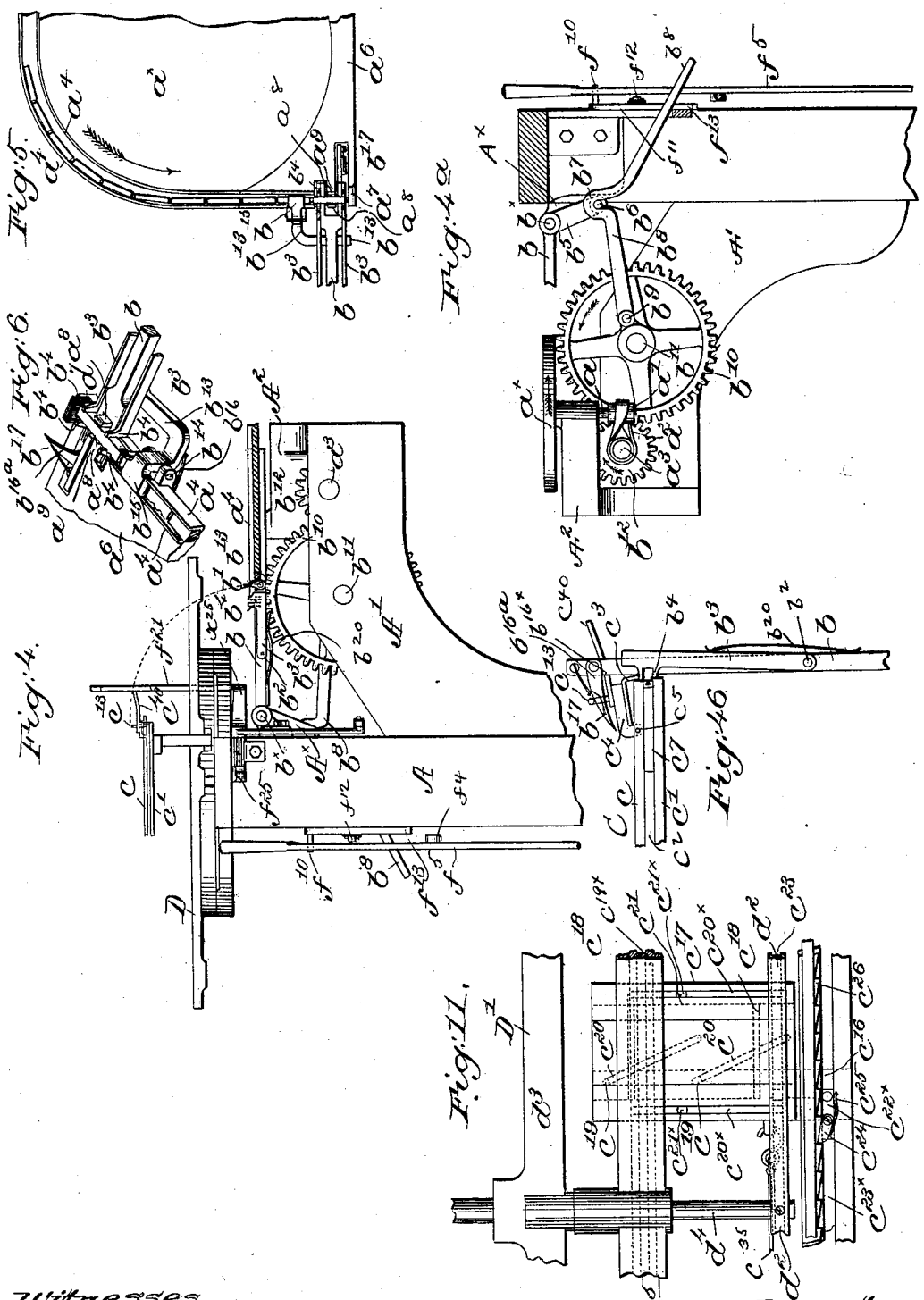

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 5.

Fig. 7.

Witnesses
Inventor
Patrick H. McGrath
By Crosby & Gregory
his Attorneys

THE NORRIS PETERS CO., PHOTO-LITHO., WASHINGTON, D. C.

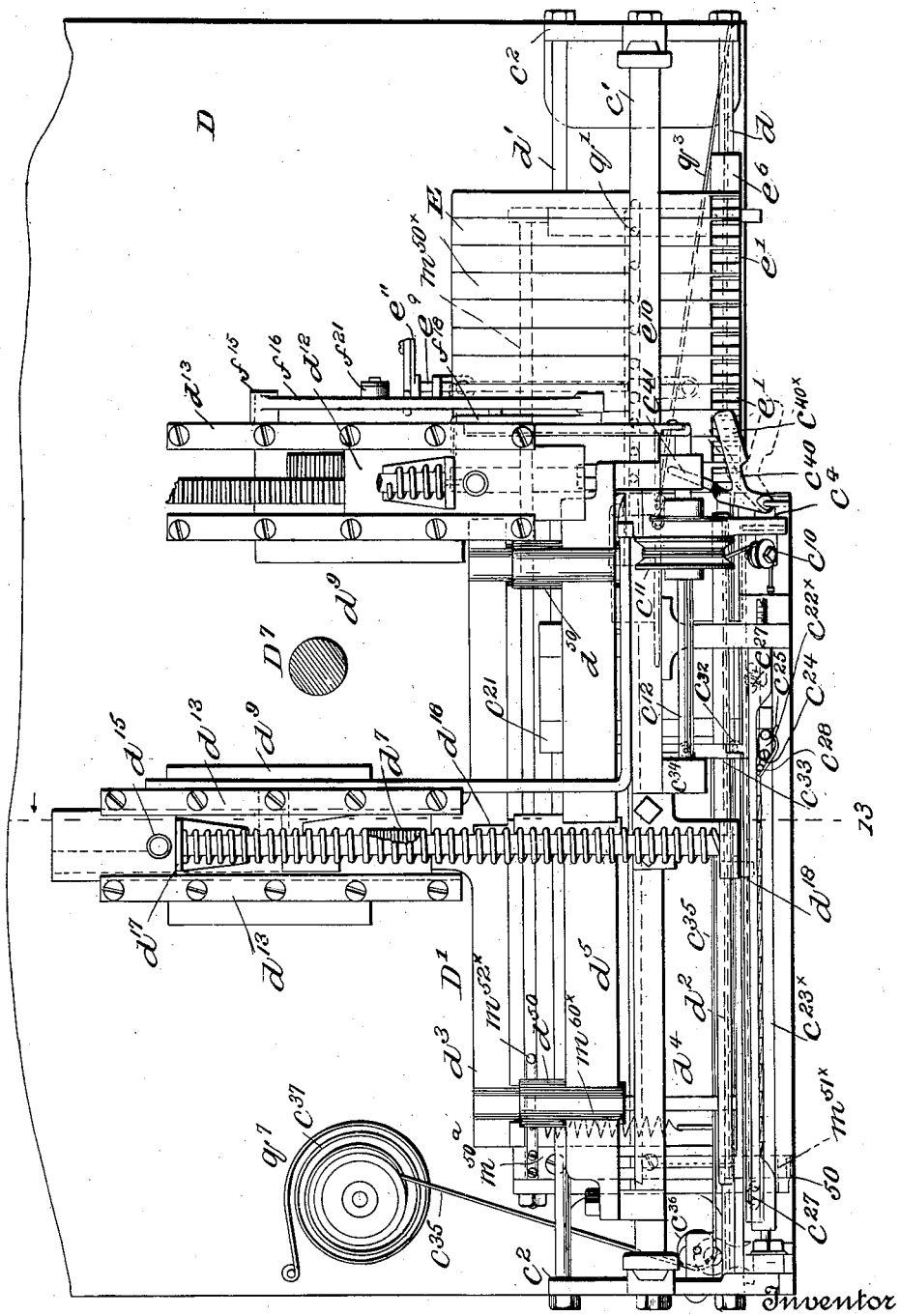

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 7.
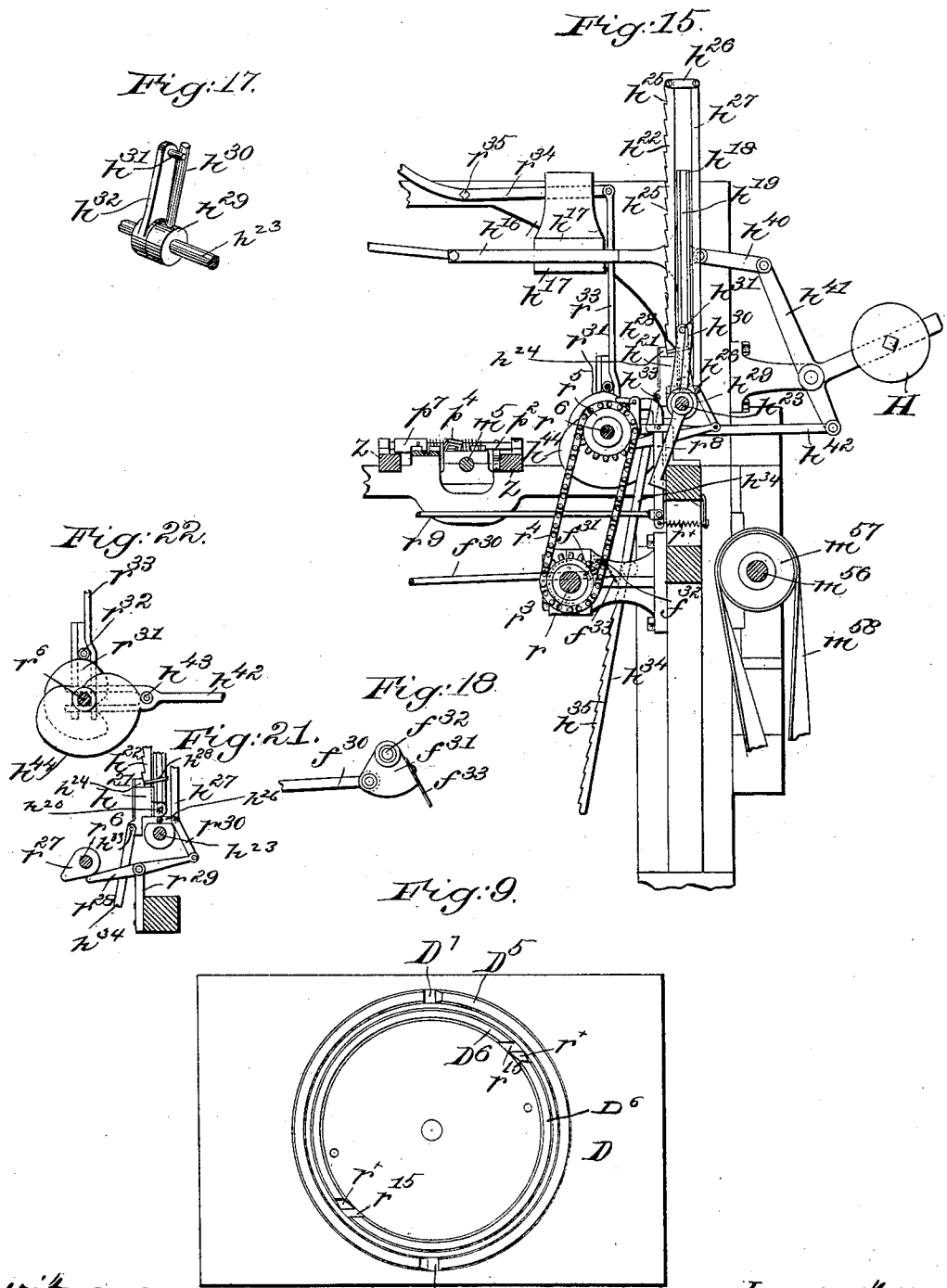

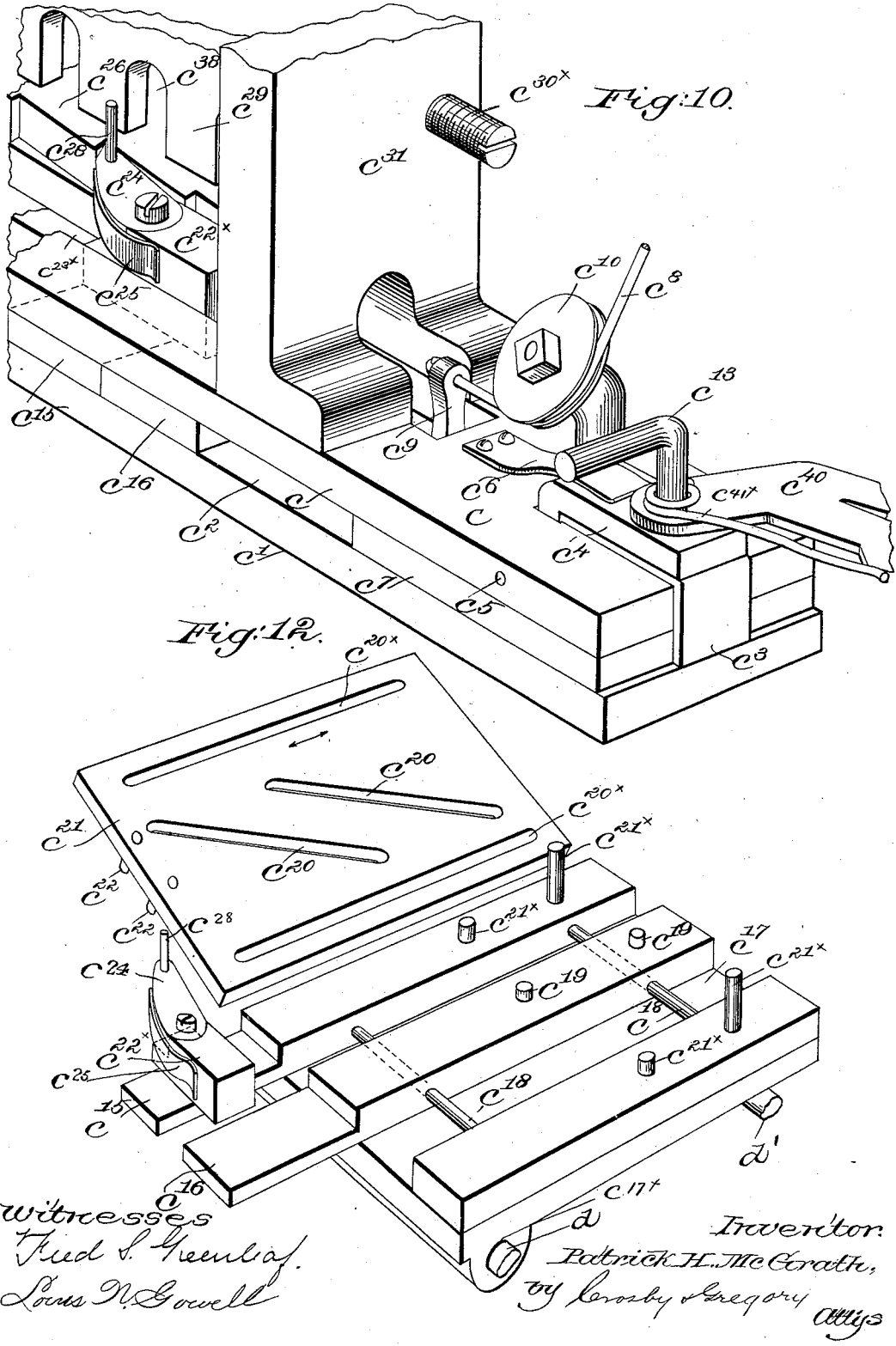

No. 608,997.  
P. H. McGRATH.  
TYPE SETTING AND JUSTIFYING MACHINE.  
(Application filed Oct. 8, 1891.)  
(No Model.)  
Patented Aug. 9, 1898.  
27 Sheets—Sheet 9.
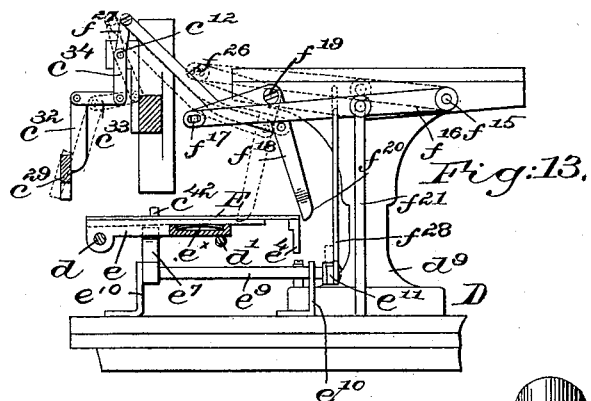
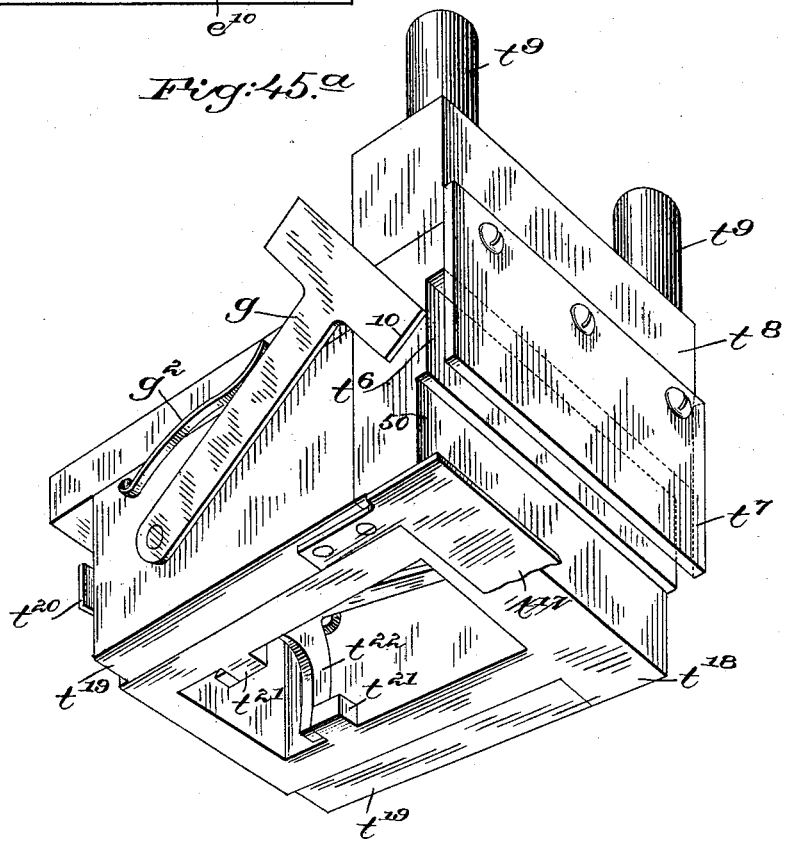
Witnesses.  
Fred S. Greenleaf  
Edward F. Allen
Inventor.  
Patrick H. McGrath  
by Crosby & Gregory  
attys.

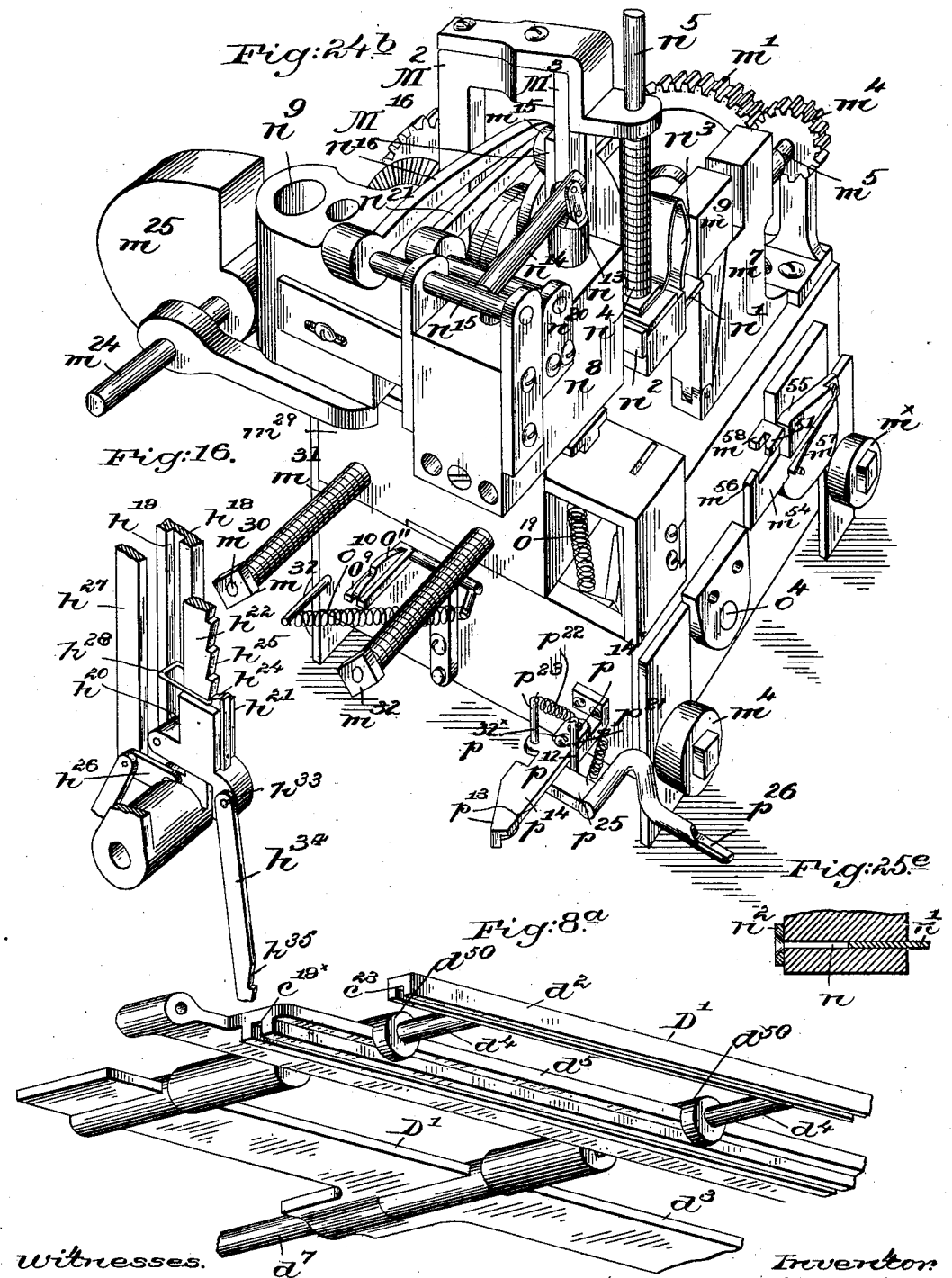

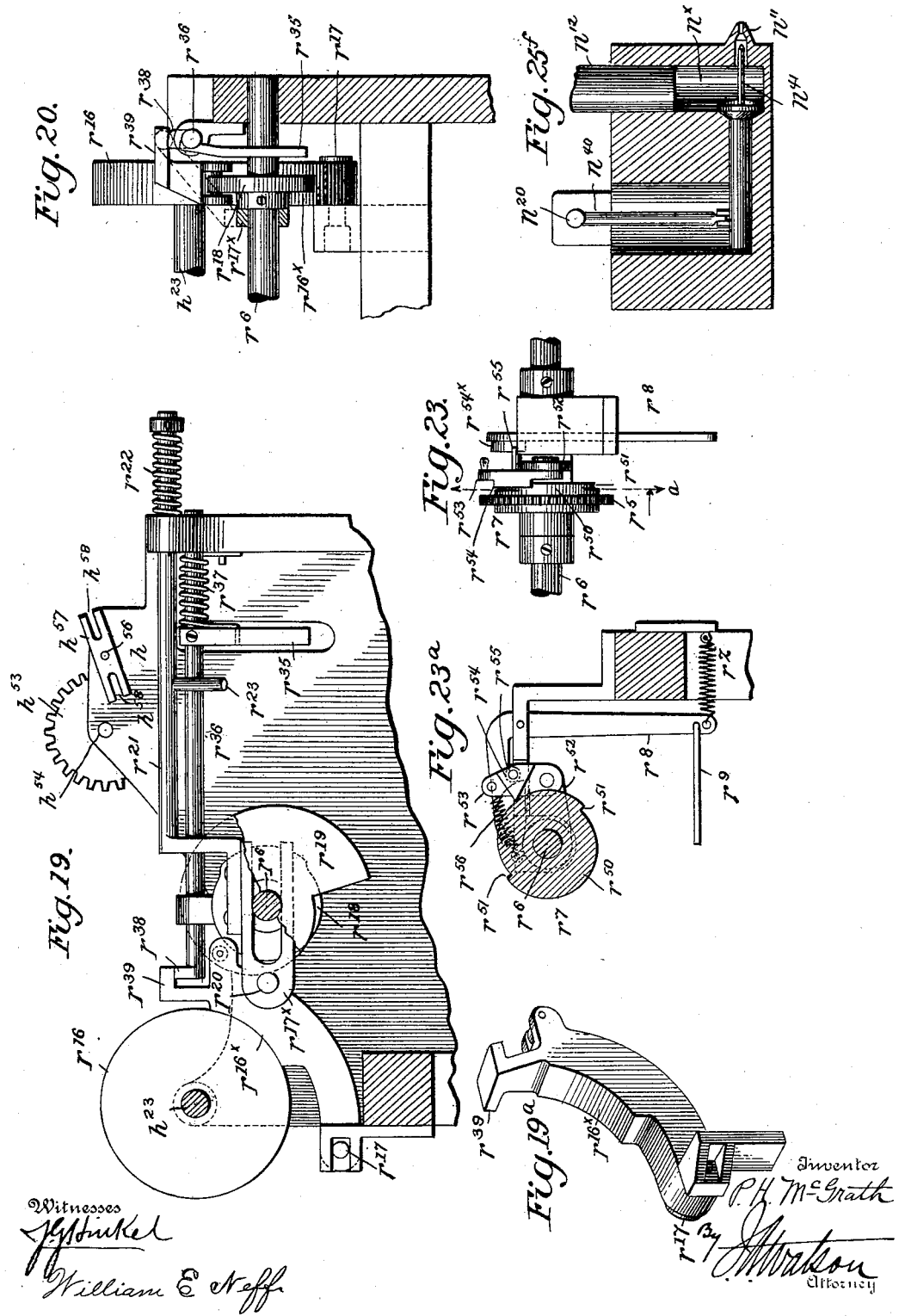
No. 608,997.
P. H. McGRATH.
TYPE SETTING AND JUSTIFYING MACHINE.
(Application filed Oct. 8, 1891.)
Patented Aug. 9, 1898.
(No Model.)
27 Sheets—Sheet 11.

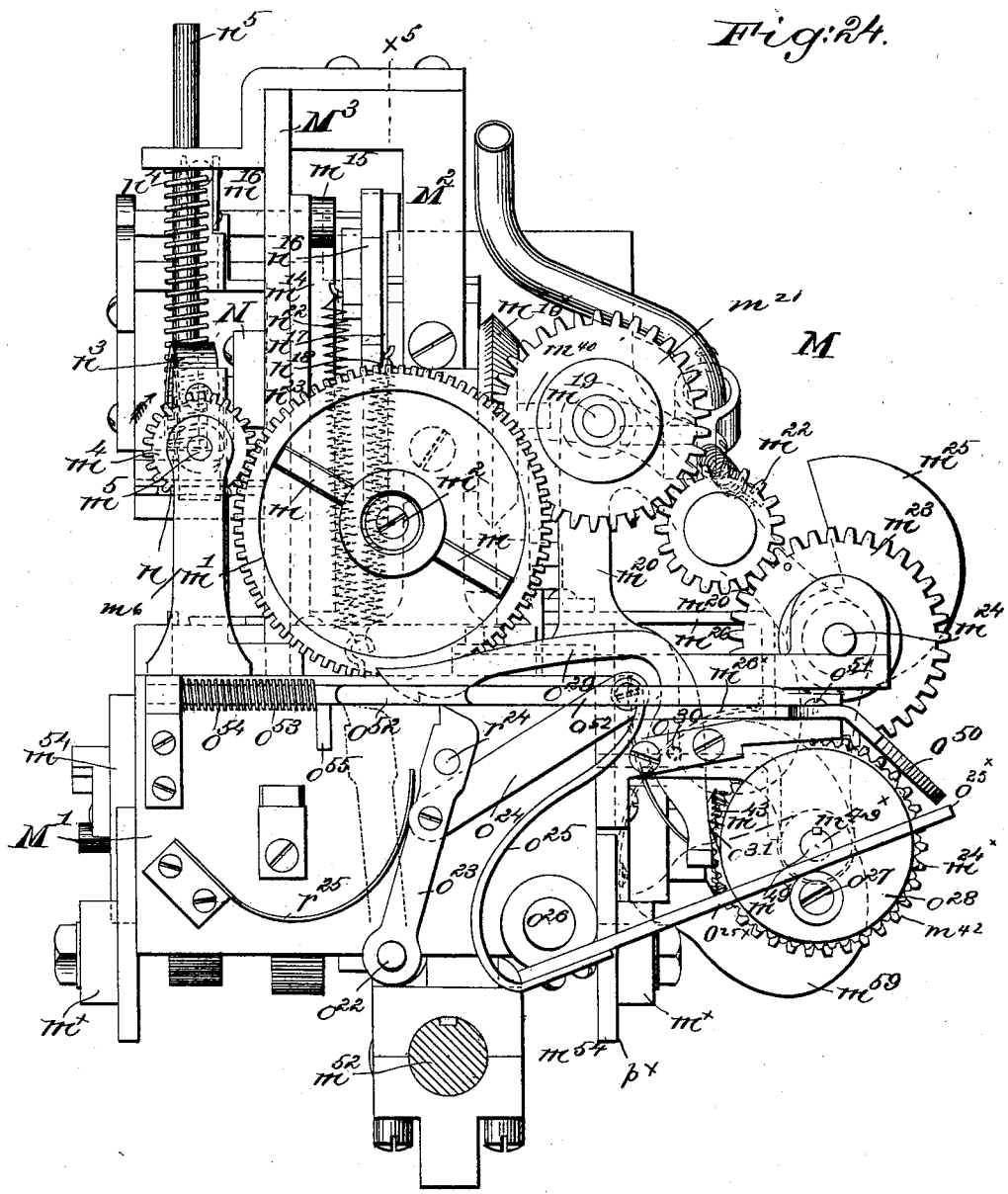

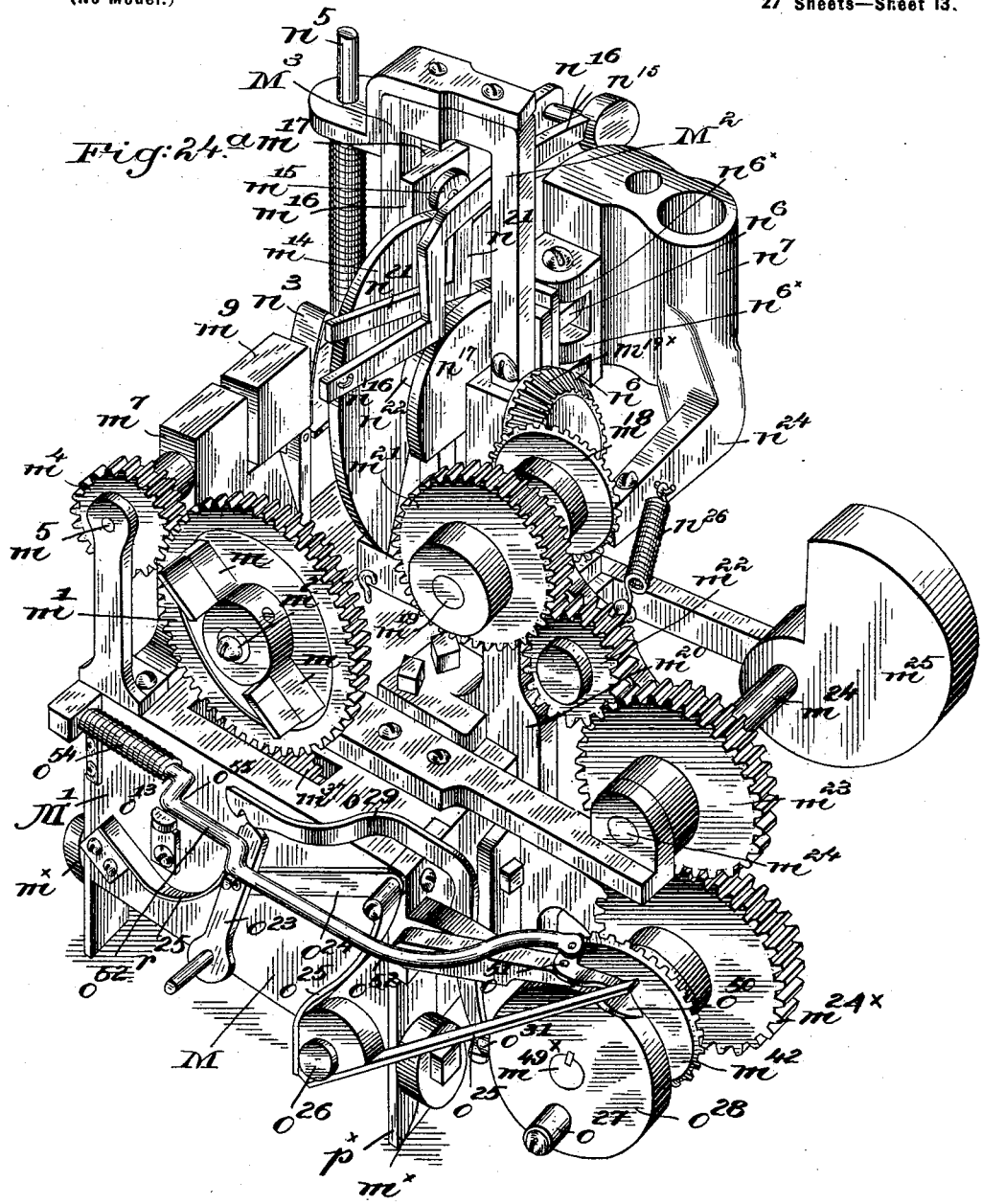

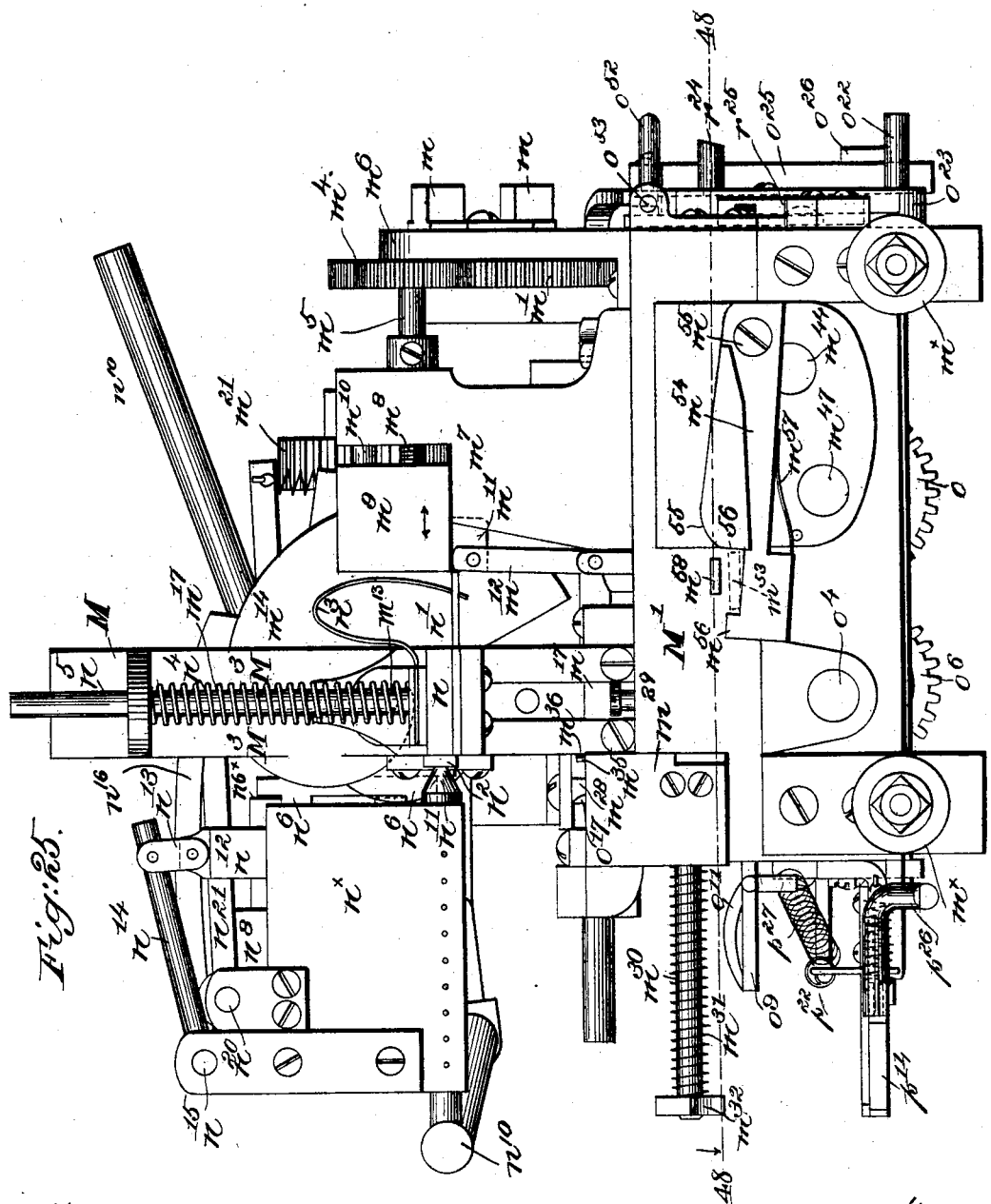

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 15.
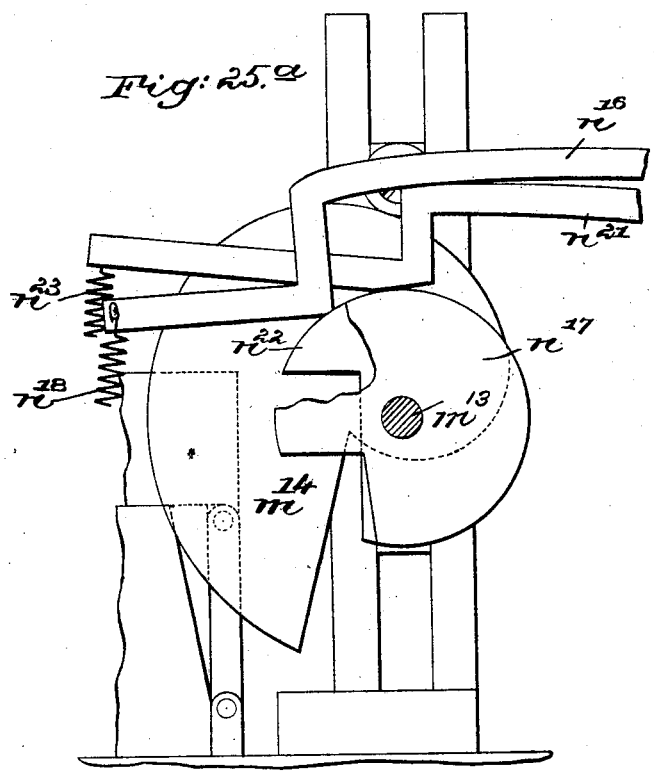
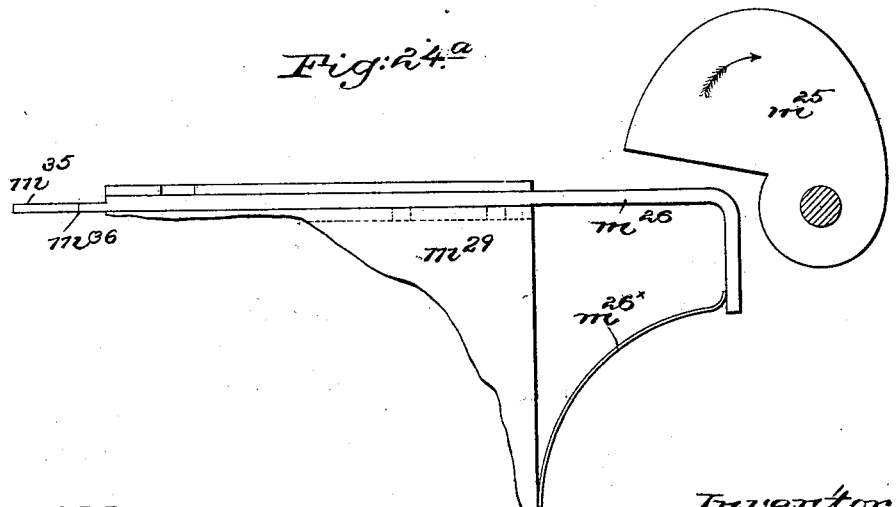
Witnesses.
Fred A. Greenleaf.
Edward F. Allen.
Inventor.
Patrick H. McGrath,
by Crosby Gregory
attys.

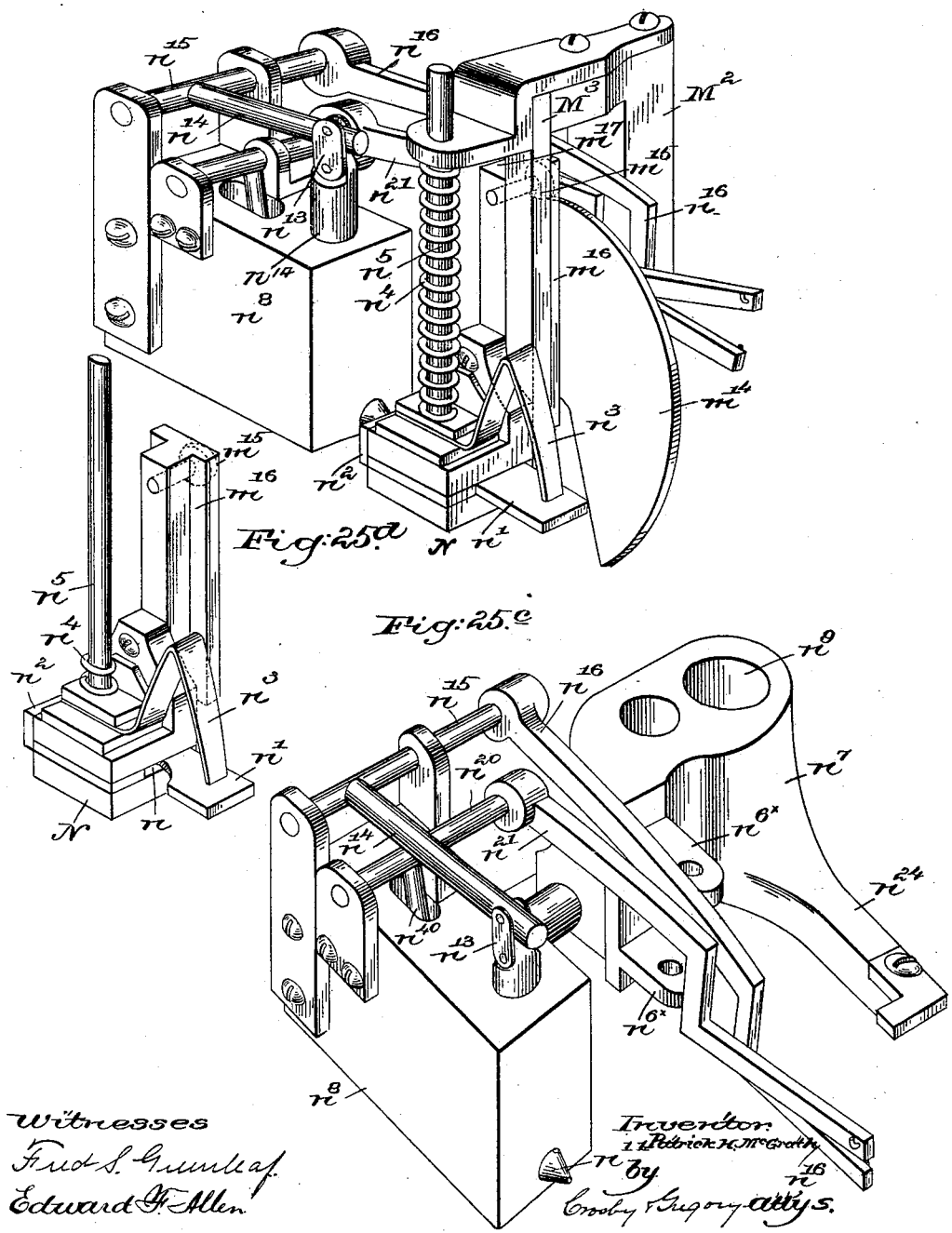

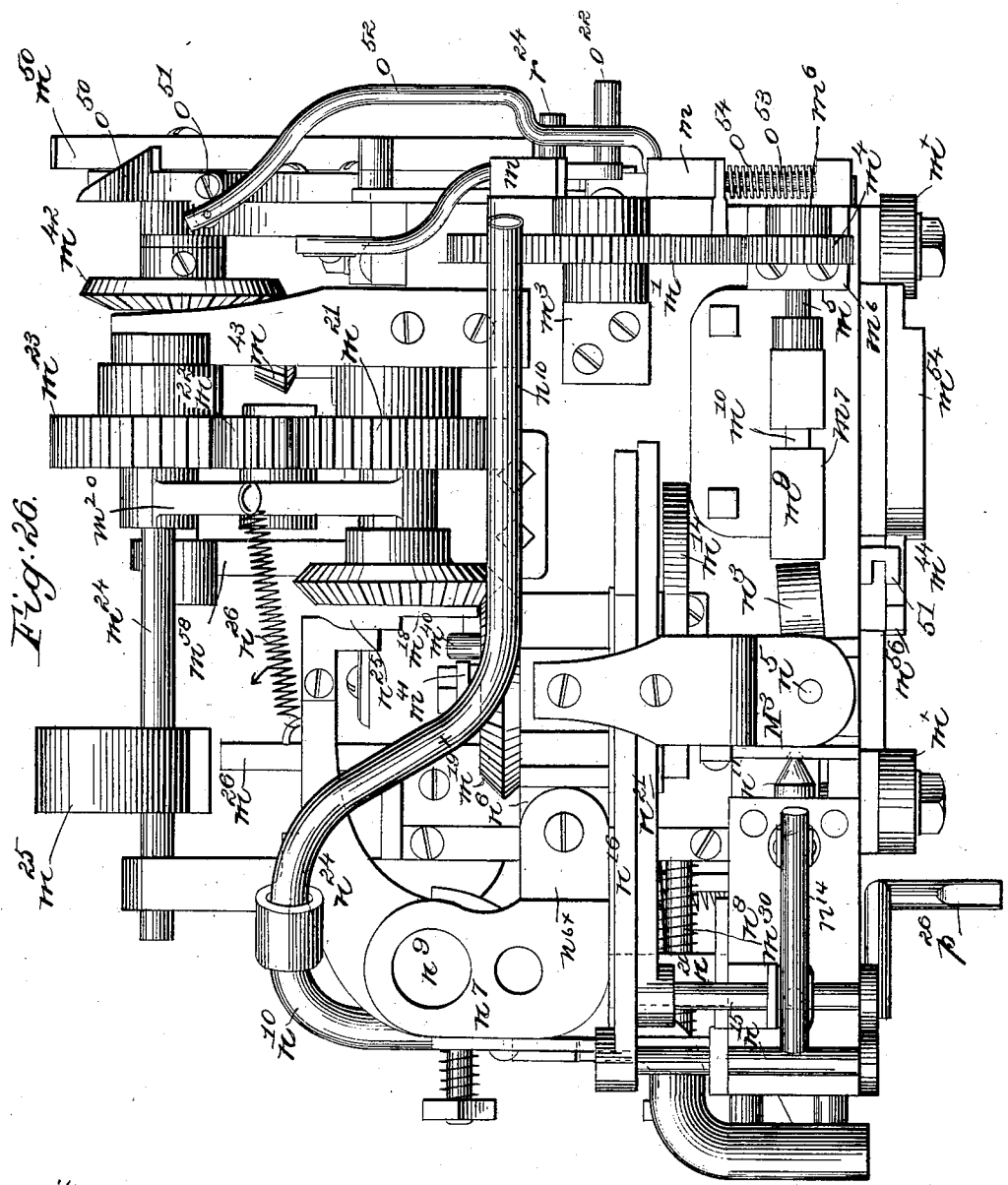

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 18.

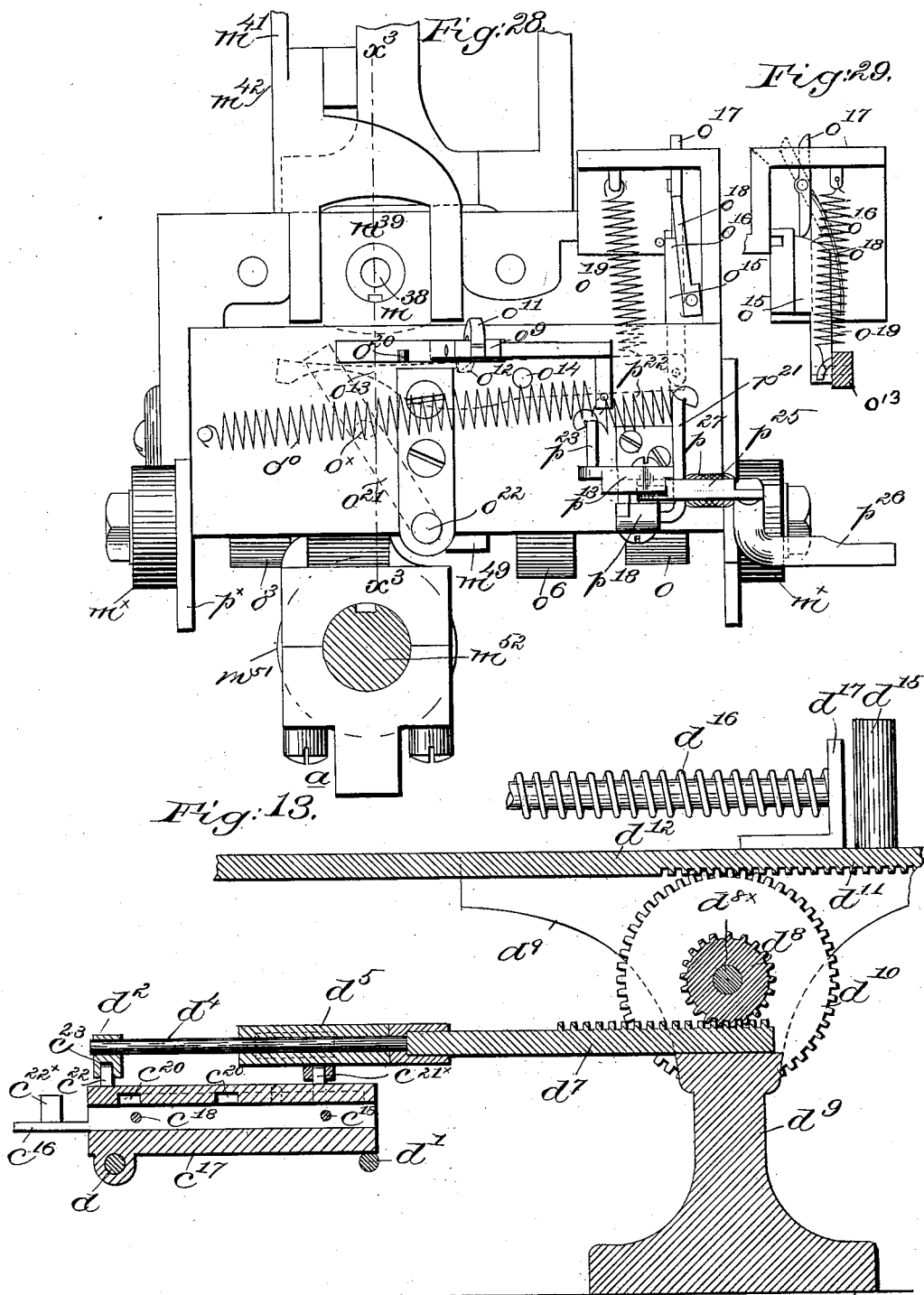

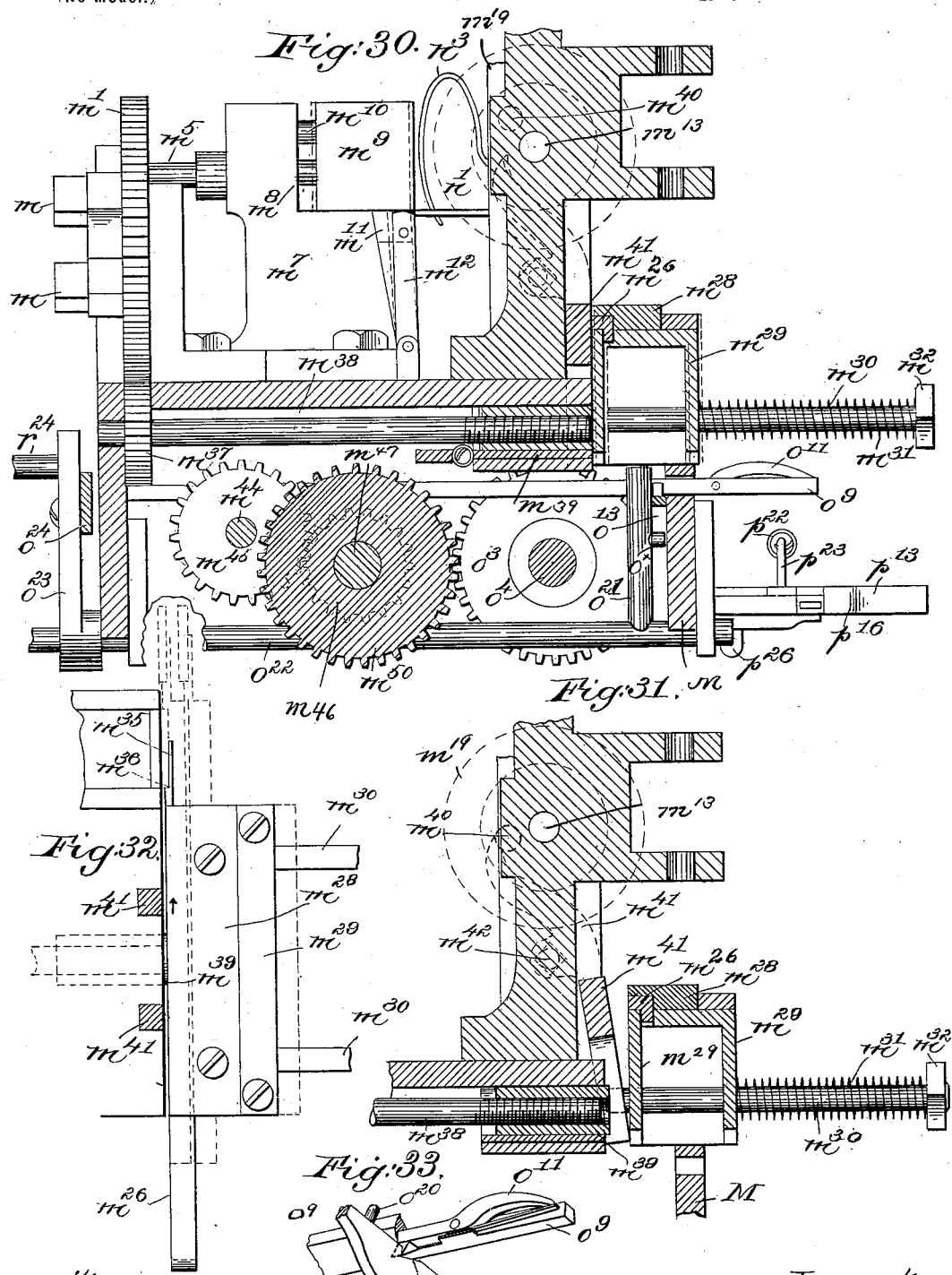

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 21.
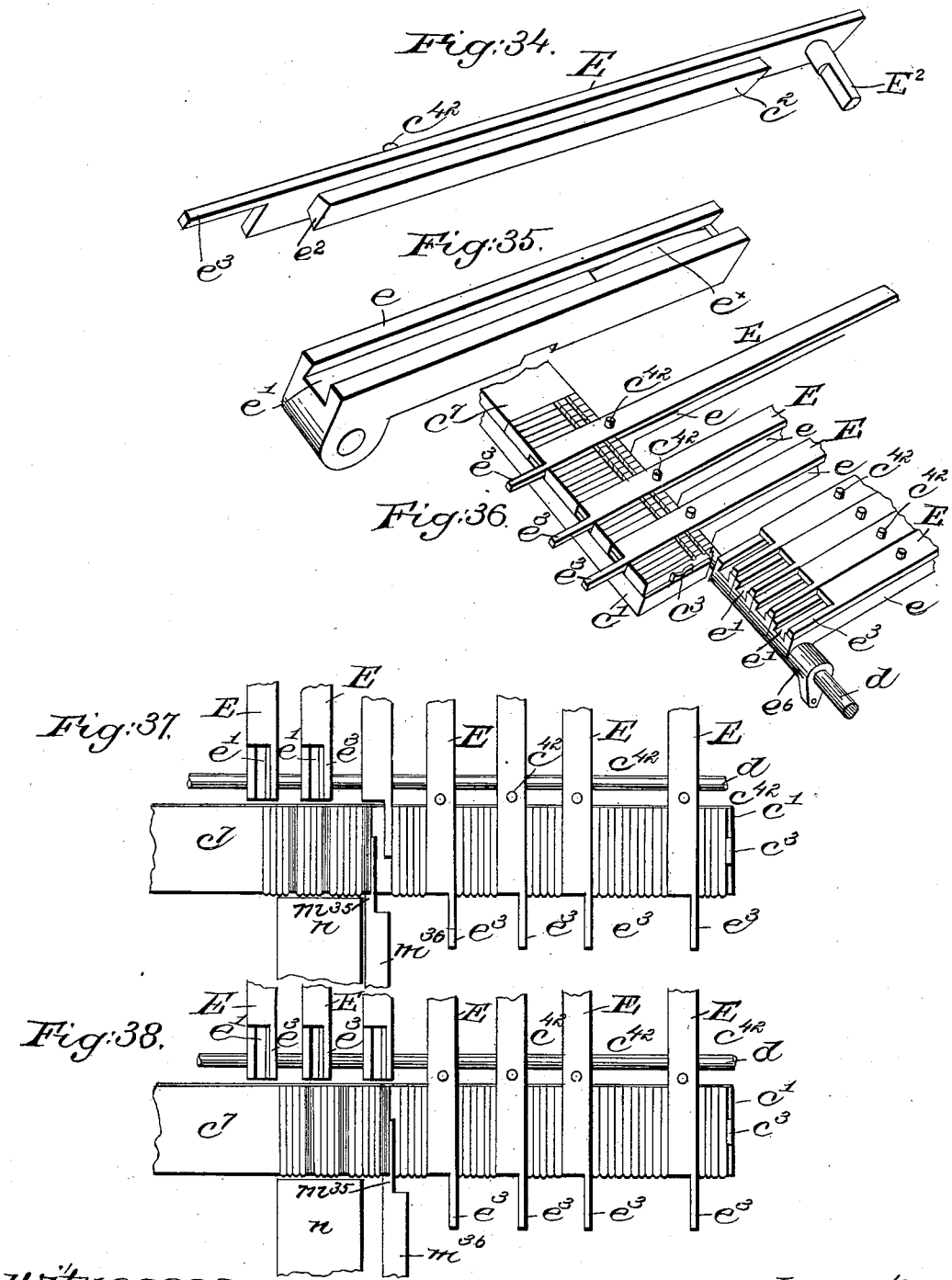
Witnesses.
Fred S. Greenleaf
Louis N. Gowell
Inventor.
Patrick H. McGrath,
by Crosby & Gregory
Attys.

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 22.
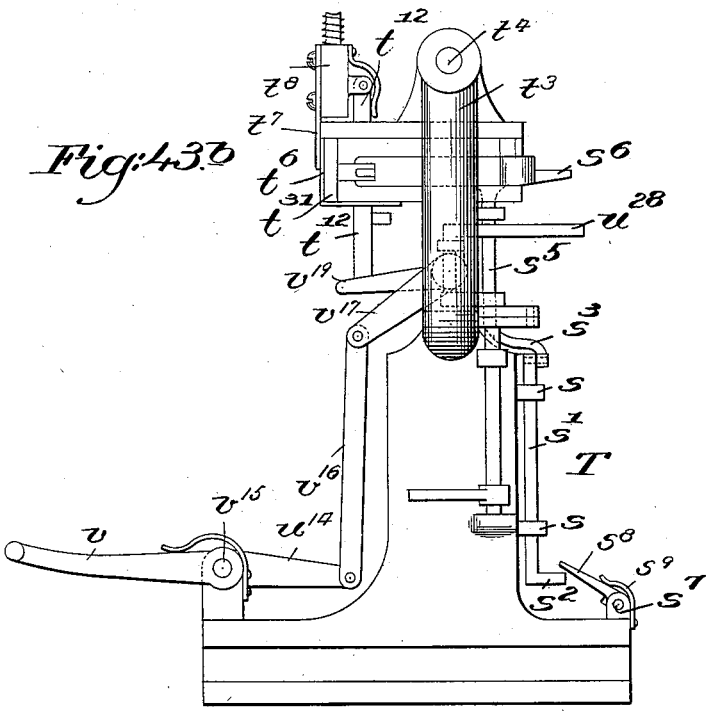
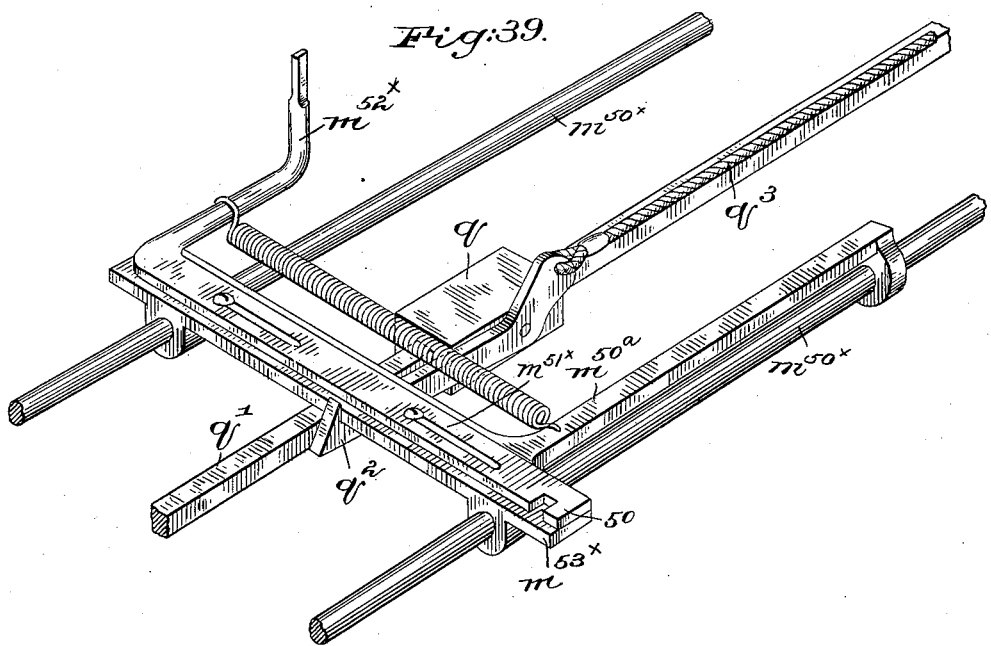

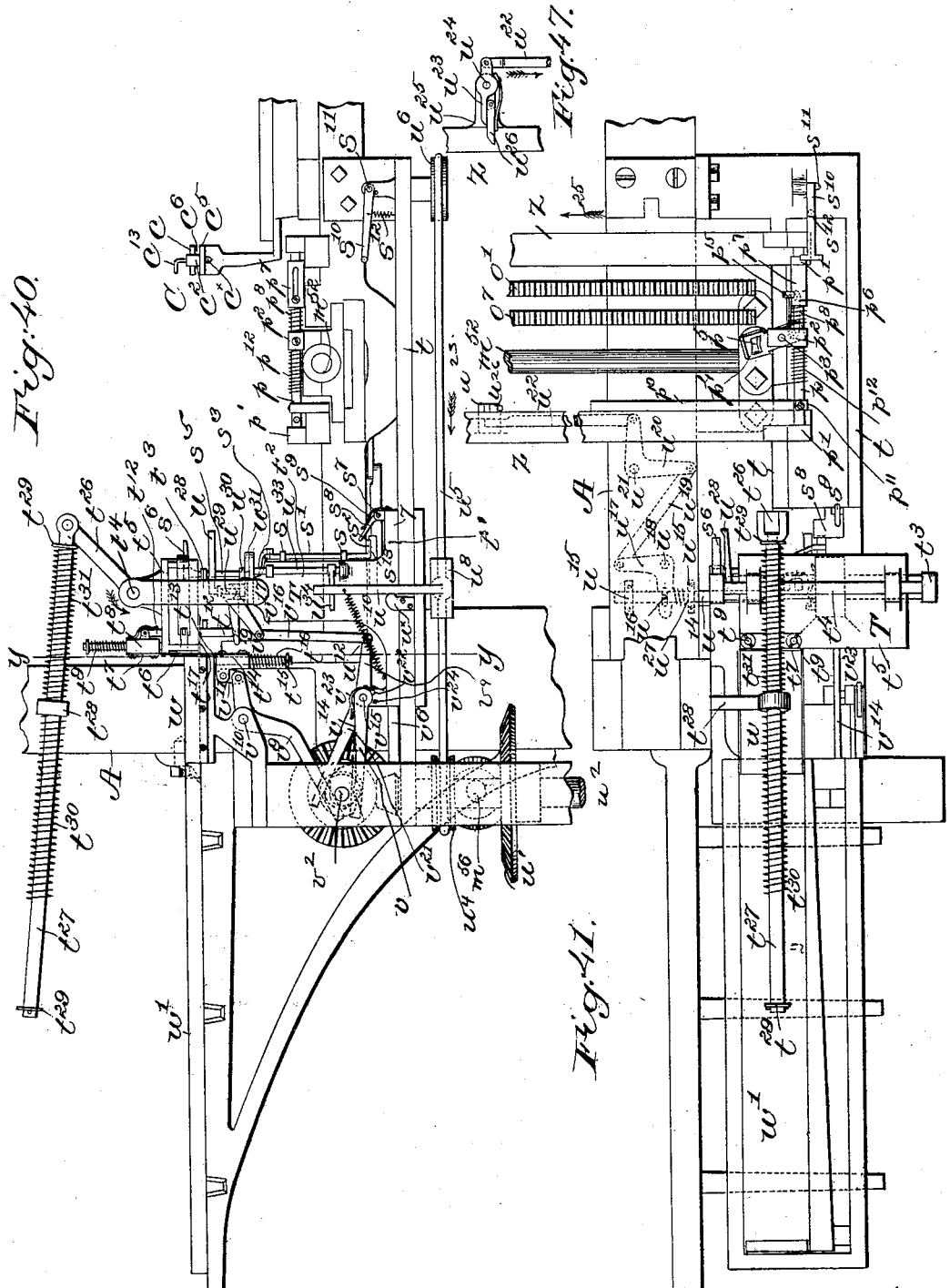

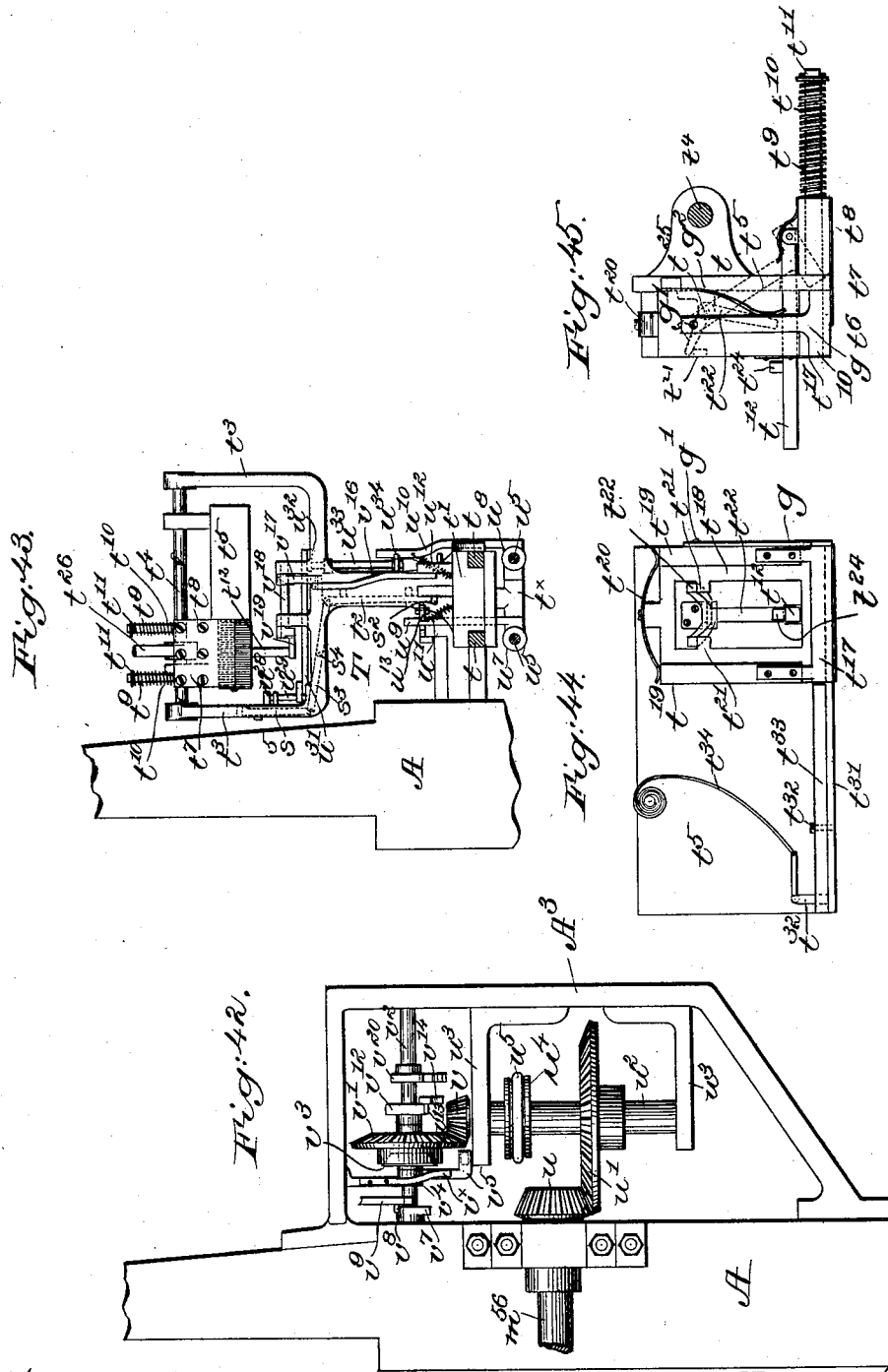

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 25.
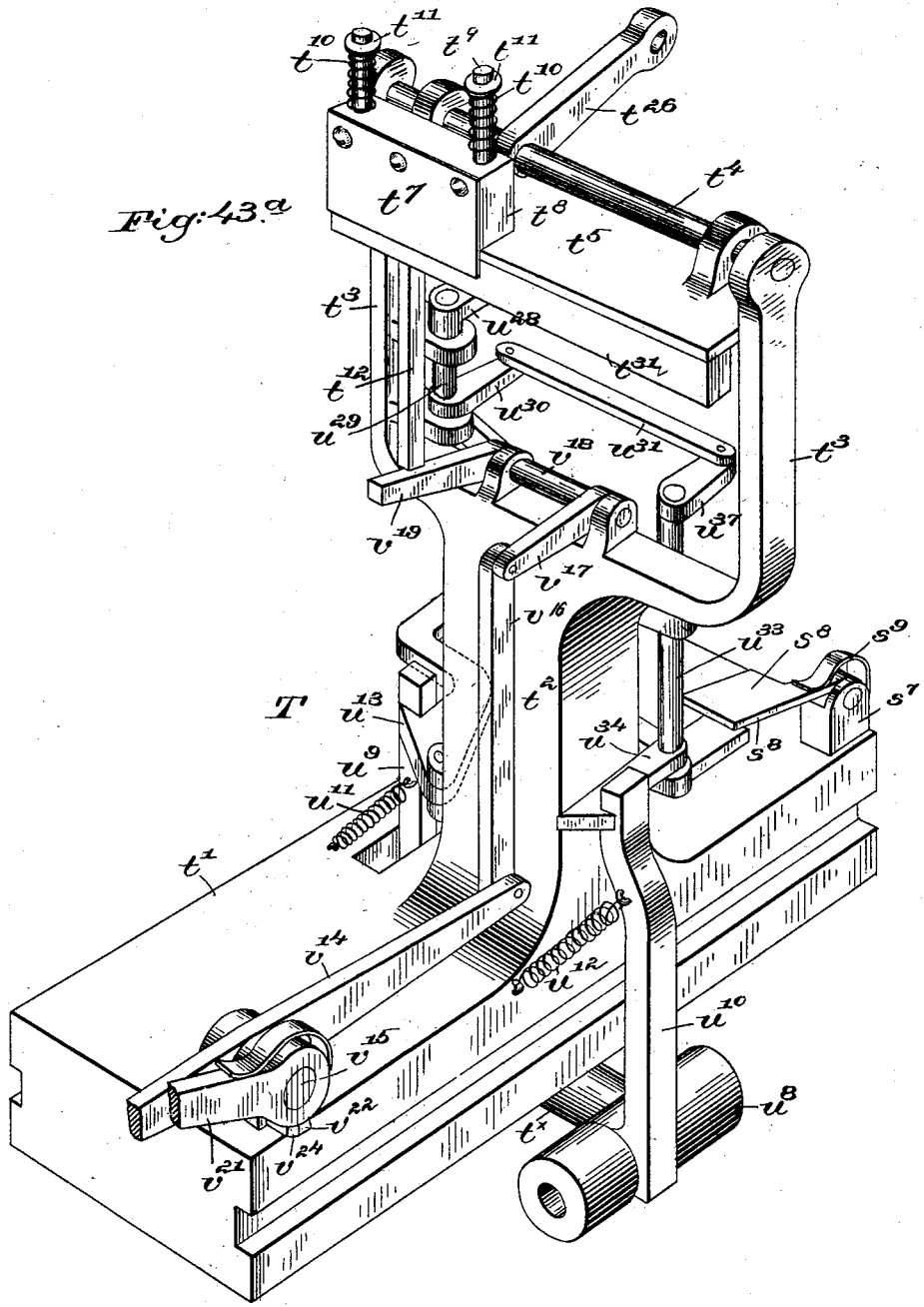
Fig. 43.ª
Witnesses.
Fred S. Greenleaf.
Edward F. Allen.
Inventor:
Patrick H. McGrath
by Crosby & Gregory
attys.

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 26.
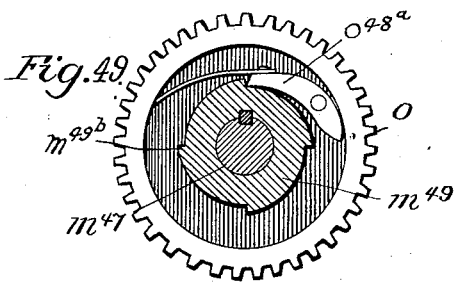
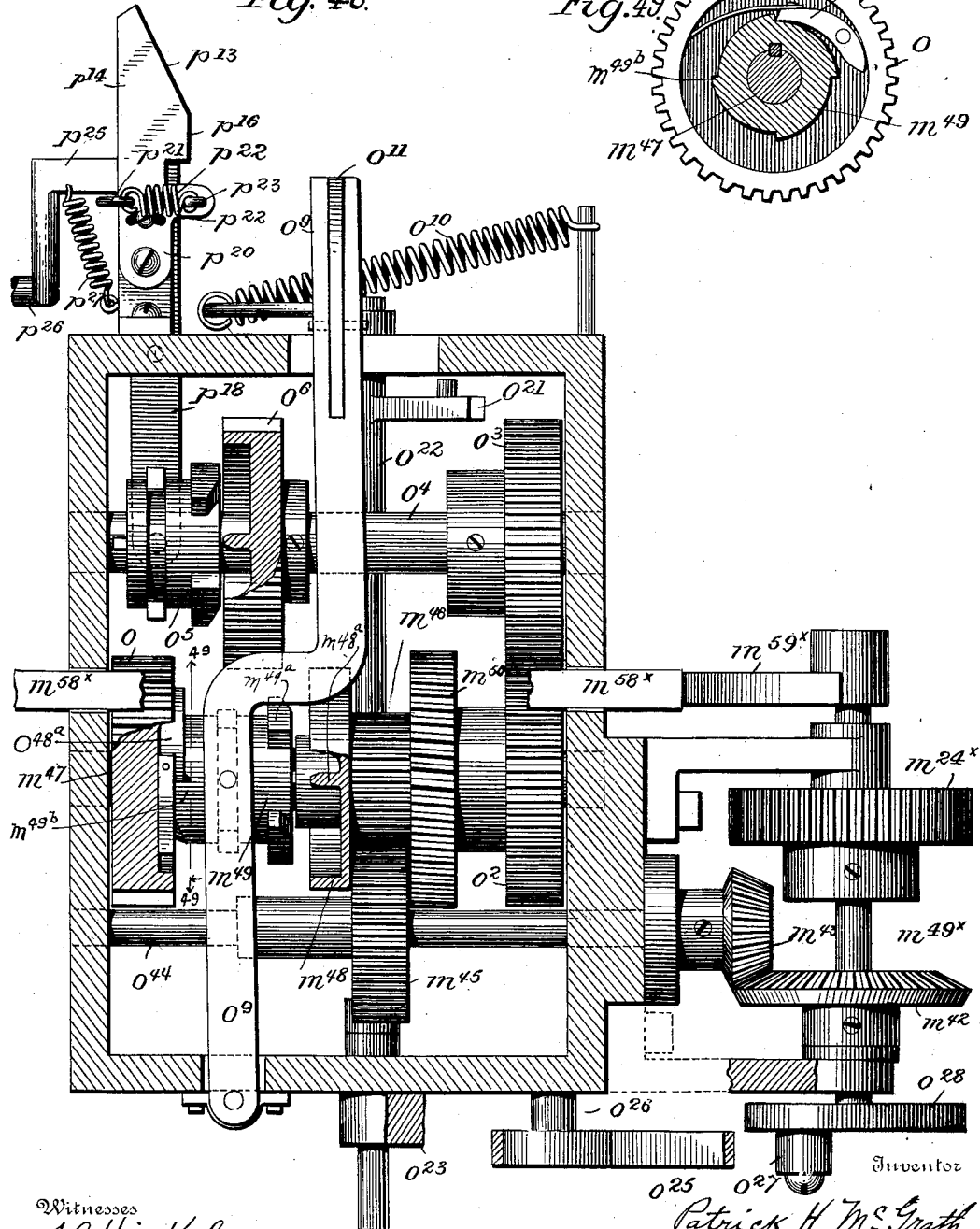

No. 608,997. Patented Aug. 9, 1898.
P. H. McGRATH.
TYPE SETTING AND JUSTIFYING MACHINE.
(Application filed Oct. 8, 1891.)
(No Model.) 27 Sheets—Sheet 27.

UNITED STATES PATENT OFFICE.

PATRICK H. McGRATH, OF RANDOLPH, MASSACHUSETTS, ASSIGNOR, BY MESNE ASSIGNMENTS, TO THE JOHNSON TYPESETTER COMPANY, OF PORTLAND, MAINE.

TYPE SETTING AND JUSTIFYING MACHINE.

SPECIFICATION forming part of Letters Patent No. 608,997, dated August 9, 1898.

Application filed October 8, 1891. Serial No. 408,147. (No model.)

*To all whom it may concern:*

Be it known that I, PATRICK H. McGRATH, of Randolph, county of Norfolk, State of Massachusetts, have invented an Improvement in Type Setting and Justifying Machines, of which the following description, in connection with the accompanying drawings, is a specification, like letters and figures on the drawings representing like parts.

This invention consists in mechanism for justifying lines of type. It is adapted for use in connection with any form of composing-machine capable of selecting type to form words.

The product of the present invention is a line of type perfectly justified.

In some forms of justifying mechanism heretofore used ready-made justifying-spaces have been selected from magazines or holders and inserted between words to effect justification. It is found that accurate justification cannot be obtained by the use of ready-made spaces for the reason that the openings vary almost infinitely on account of imperfections in the type and the innumerable variety of combinations of type and spaces which may occur in a line and no practicable amount or variety of ready-made spaces can be provided and utilized to meet all of the conditions arising.

The present invention comprises a novel justifying mechanism which measures an assembled line of type and manufactures or forms spaces suitable to exactly justify the line and inserts said spaces between the words of the line.

Considered more in detail, my invention comprises a plurality of sticks, in each of which a line of type and temporary spaces may be assembled, the sticks circulating between the assembling mechanism and the mechanism which inserts the justifying-spaces. The machine is arranged so that while type are being assembled in one of the sticks the line previously assembled in another stick is being justified. The operations of assembling and justifying may therefore be carried on continuously and simultaneously. The type are assembled with temporary spaces, which I term "space-blanks," which are preferably wider than the final spaces. As each space-blank is inserted the stick is lengthened to provide for the excess of width of the space-blank over the normal word-space. The operation of assembling type and space-blanks is carried on until there is not sufficient room remaining in the stick for another word or syllable. The stick, with the line thus provisionally spaced, is then carried to the device for inserting the justifying-spaces, and another stick is brought into position to receive a new line.

In the present machine the justifying-spaces are cast in a mold, being preferably formed of ordinary type-metal. The width of the mold is adjusted for each line. To accomplish this adjustment, a measuring device is used which accurately measures the amount of space to be filled to justify the line, and a second device divides this space by the number of word-spaces in the line, the adjustable member of the mold being set or adjusted by this second device. After the mold is adjusted suitable automatic mechanism withdraws the space-blanks from between the words, and upon the withdrawal of each space-blank a justifying-space is cast and inserted in lieu of it. A separate group or magazine of space-blanks is preferably used for each stick, and said space-blanks are automatically returned to their magazines when replaced by justifying-spaces.

The device for dividing the shortage in the line by the number of word-spaces I shall term a "justifying-lever." The lever and its connections are capable of use in various kinds of justifying mechanisms and in the various kinds of composing-machines. The lever has adjustable connections with the space-key, a fulcrum or operative part being adjusted from the space-key with relation to the lever for each line composed. The lever also has a connection which is moved in proportion to the shortage of the line to be justified and a second connection to the movable part of the mold or such other device as may be used to determine the width of the justifying-spaces.

The invention will be described in detail in the following specification and with reference to the accompanying drawings, in which—

Figure 50:
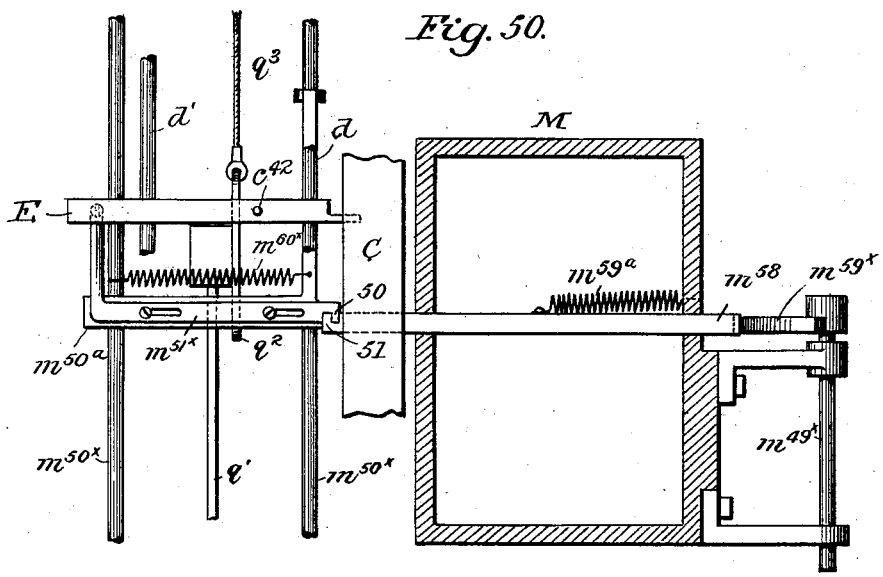
Figure 51:
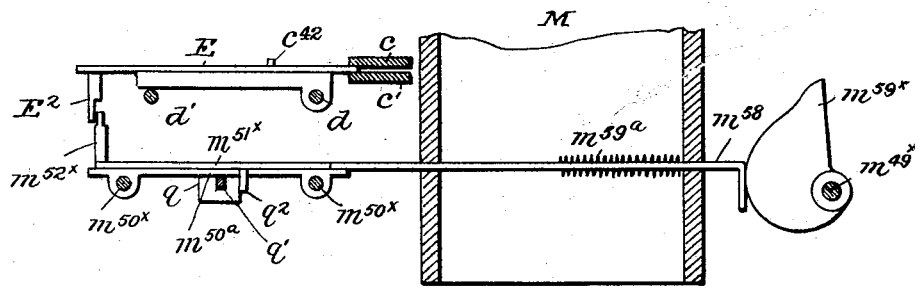

Figure 1 is a plan view of a type setting and justifying machine embodying this invention, the transferring mechanism, however, being omitted; Fig. 2, a right-hand end elevation of the machine shown in Fig. 1, a portion of the type-setting mechanism being in this view omitted for the sake of clearness; Fig. 3, a left-hand end elevation of the machine shown in Fig. 1; Fig. 4, an enlarged detail showing the type-setting arm and its cooperating parts; Fig. 4$^a$, a rear side sectional view of Fig. 4, showing the manner of actuating the type-setting arm; Fig. 5, an enlarged detail showing the manner of depositing the type in the type-setting arm; Fig. 6, a perspective detail showing the brake which holds the type back and the end of the type-setting arm holding a type ready to be set; Fig. 7, a front edge view of the revolving table and one of the sticks carried thereby; Fig. 8, a plan view of Fig. 7; Fig. 8$^a$, an under side perspective showing a part of the measuring-frame; Fig. 9, an under side view of the revolving table D; Fig. 10, a perspective view of the end of one of the sticks; Fig. 11, a plan view of the measuring device by itself; Fig. 12, an enlarged perspective view of the same, the cam-groove plate being laid back to expose the cam-grooves; Fig. 13, a partial end view of the table, showing one of the standards $d^9$ and the mechanism for moving the space-blanks forward prior to their being forced into the stick. Fig. 13$^a$ is a vertical section through the measuring devices on the line 13 13, Fig. 8; Fig. 14, a detail of the supporting-latch $h^6$; Fig. 15, a sectional detail taken on the dotted line $x\,x$, Fig. 1, showing the variable adjustment of the space-mold-setting mechanism; Fig. 16, a perspective detail of a part of the mechanism shown in Fig. 15; Fig. 17, a perspective detail showing the clutch $h^{29}$; Fig. 18, a detail of the triangular-shaped plate $f^{31}$, showing the finger $f^{33}$, which lifts the rod $h^{35}$; Fig. 19, a section on the line $x'\,x'$, Fig. 1, looking to the right. Fig. 19$^a$ is a perspective view of the brake; Fig. 20, a sectional detail on the dotted line $x^2$, Fig. 19, showing the manner of supporting the brake-shoe; Figs. 21, 22, and 23, details to be referred to. Fig. 23$^a$ is a section on the line $a\,a$, Fig. 23. Fig. 24 represents the rear end of the carriage M on an enlarged scale; Fig. 24$^a$, a perspective view of the carriage, looking downwardly from the left, Fig. 24; Fig. 24$^b$, also a perspective of the carriage, looking from the rear side of Figs. 24 and 24$^a$; Fig. 24$^c$, a detail showing the cam $m^{25}$ and the slide-bar $m^{26}$, actuated thereby for positioning the needle to receive a space-blank ejected from the mold; Fig. 25, a face view of the carriage; Fig. 25$^a$, a section in detail, taken on the dotted line $x^5$, Fig. 24; Fig. 25$^b$, a perspective detail of the melting-pot and type-mold, together with their actuating levers and cams, the view being taken from the right, Fig. 25; Fig. 25$^c$, a similar view showing the melting pot and chamber by themselves. Fig. 25$^d$ shows in perspective the space-mold with its guide detached from the guideways, Fig. 25$^b$; Fig. 25$^e$, a sectional detail of the space-mold, showing its movable wall; Fig. 25$^f$, an enlarged sectional detail of the melting-pot, showing the pump and devices for ejecting and controlling the escape of the melted lead from the melting-chamber into the space-mold; Fig. 26, a top or plan view of the carriage; Fig. 27, an under side view of the carriage, a portion of the gearing upon the exterior of the carriage being omitted to avoid confusion; Fig. 28, a front end elevation of the carriage M, the movable head $m^{29}$ being removed; Fig. 29, a detail of a portion of the carriage, showing in side elevation the trigger $o^{17}$ and its manner of operation; Fig. 30, a vertical longitudinal section of the carriage M, taken on the dotted line $x^3$, Fig. 28; Fig. 31, a detail showing the head $m^{29}$ moved forward; Fig. 32, a plan view of the head, the various positions of the needle $m^{35}$, carried thereby, being represented by dotted lines; Fig. 33, a perspective detail of the latch-lever $o^{18}$ and clutch-lever $o^9$. Fig. 34 shows one of the space-blanks detached; Fig. 35, one of the space-blank carriers. Fig. 36 is a perspective view showing a portion of a line of type as it will appear when set, with some of the space-blanks in the line and others in position to be inserted. Figs. 37 and 38 are views to illustrate the manner of substituting the spaces for the space-blanks in the line. Fig. 39 is a perspective view of the carriage $m^{50}$, carrying the slide-bar $m^{51}$ for withdrawing the space-blanks from the line. Fig. 40 represents a portion of the end of the machine, on an enlarged scale, to show the transferring device and its manner of operating; Fig. 41, a top or plan view of the same; Fig. 42, a left-hand end view of a portion of the mechanism represented in Fig. 40; Fig. 43, a section on the dotted line $y\,y$, Fig. 40; Fig. 43$^a$, an enlarged perspective detail of the frame T; Fig. 43$^b$, an enlarged side view of the frame and mechanism shown in Fig. 43; Figs. 44 and 45, details of the transferring-carriage, to be referred to; Fig. 45$^a$, an enlarged perspective detail of the parts shown in Figs. 44 and 45; Fig. 46, a detail showing the manner of inserting the type into the stick; Fig. 47, a detail to be referred to. Fig. 48 is a sectional view of the crank, looking down from the line 48, page 25. Fig. 49 is a section on the line 49, Fig. 48. Fig. 50 is a skeleton plan view showing the devices for removing the space-blanks from the lines, and Fig. 51 is a side elevation of the devices shown in Fig. 50.

The frame A is of suitable shape and construction to sustain the working parts, it having at one side, as herein represented, a bracket A', in an arm A$^2$ of which (see Figs.

4 and 4ᵃ) is journaled a vertical shaft $a$, provided with a pulley $a'$, driven by a belt $a^2$ from a shaft $a^3$, journaled in the bracket A', having a pulley $a^{11}$, Fig. 3, driven by a belt $a^{12}$ from a pulley $a^{13}$ on a counter-shaft A⁵, the said shaft $a$ carrying at its upper end the revolving disk or table $a^\times$.

L represents any suitable type-setting mechanism—such, for instance, as that shown and described in United States Patent No. 372,187, dated October 25, 1887, to which reference may be had—the type selected in the manner therein described being delivered upon an endless belt or carrier 3, Fig. 1, which in the present instance delivers the type upon the surface of the revolving disk $a^\times$, which by the aid of the lateral guide-walls $a^4$ turns the direction of movement of the type and deposits it between the ears $a^8$ on the arm $a^9$, carried by the plate $a^6$, carried by the bracket A', as best represented in Figs. 5 and 6.

A rubber or other yielding cushion $a^7$ is provided, against which the end of the type will strike to stop it, the action of the revolving table being to move the type around the turn between guide-walls $a^4$ and up to and against the cushion $a^7$ (see Fig. 5) as fast as they are selected by the mechanism L.

The ends of the type when lying in the position Fig. 5, abutting against the cushion $a^7$, overhang the arm $a^9$ at either side to be picked off by the forked end of the type-setting lever $b$, Figs. 4 to 6, pivoted to and fast on the shaft $b^\times$, journaled in a bracket A$^\times$, bolted or otherwise secured to the frame A, (see Fig. 4,) said lever $b$ having pivoted to it at $b^2$ the yielding guards $b^3$, provided with ears $b^4$, (see Figs. 4 and 6,) said ears, as the type-setting arm $b$ rises, rising at opposite sides of the type, as best represented in Fig. 6, to hold the same in position upon the end of the arm $b$ as the latter is turned up to place the type in the stick, as will be described.

The shaft $b^\times$, on which the type-setting arm $b$ is pivoted, is provided with a crank-arm $b^5$, (see Fig. 4ᵃ,) provided at its outer end with a pin $b^6$, which latter is engaged by a U-shaped hook $b^7$, formed in a lever $b^8$, pivoted on a stud $b^9$ on the toothed wheel $b^{10}$, journaled on the stud $b^{11}$ on the bracket A', (see Figs. 4 and 4ᵃ,) the said toothed wheel $b^{10}$ being in mesh with and driven by a pinion $b^{12}$ on the rotating shaft $a^3$, referred to. As the toothed wheel $b^{10}$ is revolved in the direction of the arrow, Fig. 4ᵃ, the pin or stud $b^9$ thereon will draw the lever or arm $b^8$ to the left and turn the crank-arm $b^5$ and shaft $b^\times$ so as to cause the type-setting arm $b$, holding the type between the ears $b^4$, as shown in Fig. 6, to be turned on its pivot into a vertical position to deliver the type to the stick C, as represented in Fig. 46, to be hereinafter referred to.

Referring to Fig. 6, as the type-setting arm $b$ rises the brake-lever $b^{13}$, pivoted at $b^{14}$ in suitable ears on the plate $a^6$ and normally held depressed by the lever $b$, is released and is raised by a spring $b^{16}$, causing the brake-shoe $b^{15}$, formed upon the opposite end of the lever, to grip the type lying next to the one removed by the type-setting arm to thereby hold the same and prevent it from moving forward to take the place of the one removed while the type-setting arm is being moved into a vertical position to insert the type carried by it. The type-setting arm having inserted one type in the stick will be returned to its first position, and as it reaches the end of its movement it will depress the arm $b^{13}$ and lift the brake-shoe $b^{15}$ to thereby release the type held beneath it, permitting the disk $a^\times$ by its constant rotative action to move the line of type confined between the guide-walls $a^4$, Fig. 5, forward to thus place a new type in position between the ears $a^8$ on the arm $a^9$ in readiness to be caught by the type-setting arm $b$ as it is again moved into a vertical position to set another type.

The stick C, which receives the type from the type-setting arm $b$, is mounted upon a revolving table D, to be described, the said stick, as represented in Figs. 7, 8, and 10, consisting of two parallel plates or bars $c\,c'$, arranged with an opening $c^2$ between them for the reception and justification of the type, the entrance to said opening at one end of the stick being normally closed by a plate $c^3$ on the dog $c^4$, pivoted at $c^5$ and maintained in its lowermost normal position by a spring $c^6$. The opening $c^2$ in the stick receives the sliding block $c^7$, normally held in its extreme position at the right against the plate $c^3$, as indicated in Figs. 7 and 10, by means of a cord $c^8$, attached at one end to a bracket $c^9$ on the block $c^7$ and passing about a pulley $c^{10}$, thence to a drum $c^{11}$ upon a shaft $c^{12}$, journaled in brackets $c^{13}$, mounted on the upper frame-bar C' of the table D, which carries the stick, said drum $c^{11}$ being acted upon and rotated to draw the cord $c^8$ and the block $c^7$ toward the right, as represented in Fig. 7, by a coiled spring $c^{14}$. The two plates $c\,c'$, forming the stick, are supported at one end by the brackets $c^\times$ and $c^{31}$ and at the other end by a bracket standing out from one of the end supports C² for the frame-bars C C' on the table D.

As the arm $b$ is turned up to deliver the type to the stick C a cam or wedge-shaped projection $b^{16a}$, pivoted on the end of the arm $b$ (see Figs. 6 and 46) and held in its normal position against a stop-pin $b^{16\times}$ by a suitable spring $b^{17}$, passes under the hook $c^{13}$ on the pivoted dog $c^4$, as shown, and acts to lift the hook and the dog, together with the plate $c^3$, attached to the dog, to uncover the end of the opening $c^2$ in the stick in order to permit the type on the end of the arm $b$ to be inserted.

The guards $b^3$ are held in position on the arm $b$ with their ears $b^4$ holding a type, as in Fig. 6, by a suitable spring $b^{20}$. (See Fig. 46.) As the arm $b$ reaches its uppermost position the ears $b^4$ on the guards $b^3$ will move the type into position, Fig. 46, in front of the opening $c^2$ in the stick to prevent the sliding block $c^7$ from being pushed out from the stick when the plate $c^3$ is lifted. Further movement of the arm $b$ in and with relation to the guards will lift the plate $c^3$ to uncover the end of the stick and act upon the type held by the guards to push the same therefrom into the stick, pushing the sliding block $c^7$ before it, as represented in Fig. 46. As the arm $b$ is withdrawn the lost motion between it and the guards will permit the latter to remain in their forward positions against the end of the stick and holding the type in the stick until the arm has moved sufficiently to permit the plate $c^3$ to drop in front of the type, and thereby prevent its being forced out by the block $c^7$. When the lost motion has thus been taken up, further movement of the arm back to its normal position will carry with it the guards $b^3$. The guards thus convey the type into position in front of the opening in the stick, where they are stopped or prevented from further movement by the end of the stick, further movement of the type-setting arm with relation to the now stationary guards acting to push the type out from the guards and into the stick. When the arm $b$ is withdrawn or returned to its normal position, it first moves back with relation to the guards until the lost motion between it and the guards is taken up to thus leave the guards in position to prevent the type being expelled from the stick until the arm has been withdrawn sufficiently to drop the plate $c^3$ over and to close the end of the stick, when further movement of the arm toward its normal position will carry the guards with it into their horizontal positions, leaving the type retained in the stick by the plate $c^3$. The opening $c^2$ between the bars $c\ c'$ of the stick also receives the measuring device, which, as herein represented, consists of two plates or bars $c^{15}\ c^{16}$, carried by a carriage $c^{17}$, (see Figs. 11 and 12,) said carriage at one end having a hole $c^{17\times}$ through which the guide-rod $d$, Fig. 13, is extended, said guide-rod being supported at its opposite ends in the upright brackets $C^2$ on the table D, while the opposite end of the said carriage $c^{17}$ rests upon another guide-rod $d'$, similarly mounted in the standards $C^2$.

The member $c^{15}$ of the measuring device is fixed to and movable with the carriage $c^{17}$, while the member $c^{16}$ of the measuring device which forms the adjustable end of the stick is made movable with relation to the carriage, it being, as herein represented, mounted to slide laterally on two guide-rods $c^{18}$, (see Fig. 12,) the movable member $c^{16}$ having on its upper surface two projecting pins $c^{19}$, which enter the diagonal or cam grooves $c^{20}$ in the plate $c^{21}$, which latter has two upwardly-extended studs $c^{22}$, which enter the longitudinal groove $c^{23}$ in the bar $d^2$, forming part of the measuring-frame D', (shown separately in Fig. 8ª, Sheet 13,) the said groove $c^{23}$ permitting the carriage $c^{17}$ to be moved longitudinally along the stick C; but while the carriage $c^{17}$ is free to be moved longitudinally on the guide-rods $d\ d'$ and along the stick still whenever the measuring-frame D' is moved back at right angles to the stick the groove $c^{23}$ will act on the studs $c^{22}$ to move the plate $c^{21}$ also back, causing its grooves $c^{20}$ to act on the pins $c^{19}$ and move the movable member $c^{16}$ of the measuring device bodily to the left until it is stopped by striking against the sliding block $c^7$ in the stick.

The plate $c^{21}$ is guided in its movements by the slots $c^{20\times}$, through which are extended the studs $c^{21\times}$ on the carriage $c^{17}$, two of the studs $c^{21\times}$ being of sufficient length to enter the longitudinal slot $c^{19\times}$ in the under side of the fixed frame-bar $d^5$, secured to depending ears $d^6$ on the frame C' to assist in holding the carriage $c^{17}$ firmly in position while the plate $c^{21}$ is being moved back. (See Figs. 7, 8, 8ª, and 11.)

The measuring-frame D' consists, as shown best in Figs. 8 and 8ª, of the bars $d^2\ d^3$, connected by the guide-rods $d^4$, which latter slide in suitable bearings $d^{50}$ on the frame-bar $d^5$, the said frame D' being provided with a rack $d^7$, (see Figs. 8 and 13ª,) in mesh with a pinion $d^8$, mounted in the standard $d^9$ on the revolving table D, said pinion $d^8$ being fast on the same shaft $d^{8\times}$ with a larger toothed wheel $d^{10}$, in mesh with a rack $d^{11}$ on the under side of the sliding plate $d^{12}$, mounted to slide in suitable guideways $d^{13}$ (see Fig. 8) in the upper end of the standard $d^9$, referred to, and having a projecting roll or other stud $d^{15}$, the stud and plate being normally held in their extreme position to the right, Fig. 13ª, away from the stick by means of a spring $d^{16}$, interposed between a bracket $d^{17}$ on the sliding plate and an ear $d^{18}$, carried by the frame-bar C', (see Figs. 7 and 8), so that movement of the stud $d^{15}$ in the opposite direction will act through the plate $d^{12}$ and its rack $d^{11}$, toothed wheel $d^{10}$, pinion $d^8$, and rack $d^7$ to draw the measuring-frame D' back from the front of the machine, drawing back with it the plate $c^{21}$ of the measuring device, which plate, through its cam-groove $c^{20}$, moves the member $c^{16}$ of the measuring device laterally in the stick, as described, until stopped by contact of the said member with the block $c^7$ referred to.

The member $c^{15}$ of the measuring device, which is fast to and movable only with its carriage $c^{17}$, has fast to its upper side a block $c^{22\times}$, (see Fig. 12,) which enters and slides in a slot $c^{23\times}$, Figs. 8, 10, and 11, in the upper bar $c$ of the stick, said block $c^{22\times}$ having pivoted to it a pawl $c^{24}$, which, acted upon by a spring $c^{25}$, is kept in engagement with one or another of the ratchet-teeth on the bar $c^{26}$, Figs. 8 and 10, having slots at each end through which are passed screws or bolts $c^{27}$ to adjustably secure the said ratchet-toothed bar to the upper bar $c$ of the stick. The pawl $c^{24}$ has a projecting pin $c^{28}$, to be acted upon by the swinging releasing-plate $c^{29}$, pivoted at one end at $c^{30}$ in one of the end standards $C^2$ and at its opposite end at $c^{30\times}$ in a bracket $c^{31}$, extended between the upper bar of the stick and the upper frame-bar C', the said swinging plate $c^{29}$ being provided with an arm $c^{32}$, (shown in Fig. 7 and best in Fig. 13,) connected by a link $c^{33}$ with an arm $c^{34}$, depending from the shaft $c^{12}$, previously referred to.

The carriage $c^{17}$ of the measuring device is normally drawn toward the left of the machine away from that end of the stick at which the type are inserted by means of a cord $c^{35}$, Figs. 8 and 11, extended about a pulley $c^{36}$, (shown in dotted lines, Fig. 7,) and acted upon by a coiled spring $c^{37}$, mounted on the table D, as best represented in Fig. 8, the said carriage being restrained from movement toward that end of the table by the pawl $c^{24}$, in engagement with one or another of the ratchet-teeth of the bar $c^{26}$, referred to.

By tilting the swinging plate $c^{29}$ on its pivot it will engage the projecting pin $c^{28}$ on the pawl $c^{24}$ and move the latter to disengage it from the particular tooth of the ratchet-toothed bar $c^{26}$ with which it was in engagement, permitting the carriage $c^{17}$ to be drawn by its spring $c^{37}$ and cord $c^{35}$ toward the left of the table until again stopped by engagement of the pawl with the next ratchet-tooth.

The swinging plate $c^{29}$ is preferably provided with a series of openings $c^{38}$, arranged substantially opposite the middle of the several ratchet-teeth of the bar $c^{26}$ to permit the pin $c^{28}$, which projects from the pawl and which holds the same from engagement with the ratchet-teeth of the bar $c^{26}$, to pass through one or another of these openings $c^{38}$ to the opposite side of the plate in order that the pawl may engage the next succeeding tooth of the ratchet-toothed bar $c^{26}$. Were it not for these openings $c^{38}$ in the swinging plate referred to, unless the said plate were returned again to its normal position before the pawl on the carriage $c^{17}$ had reached the next tooth, the pawl, being still held from engagement with any of the teeth on the bar $c^{26}$, would permit the carriage to run clear to the end of its travel instead of being stopped by the next succeeding ratchet-tooth.

A series of space-blank carriers $e$, one of which is shown in perspective, Fig. 35, is mounted upon the guide-rods $d$ $d'$ at or near the end of the stick at which the type are inserted, the outer or front ends of the said space-blank carriers having holes through which the rod $d$ passes to thus always hold them in proper position, the rear or inner ends of the said carriers, however, merely resting upon the rod $d'$, said space-blank carriers being provided upon their upper faces with dovetailed grooves $e'$, which receive the dovetailed ribs or projections $e^2$ on the under sides of the space-blanks E, one of which is shown separately in Fig. 34. Each space-blank is preferably provided at its front end with a projecting finger $e^3$ and at its rear end with a downwardly-extended pin or stud $e^4$. A sleeve or collar $e^6$ is also mounted to slide on the guide-rod $d$, said collar bearing against the extreme right-hand space-blank carrier $e$, as best shown in Fig. 36, said collar being acted upon and drawn to the left, Fig. 7, by a spring $e^7$, attached at its opposite end to the endmost bracket $C^2$, said spring for the greater part of its length being represented by two parallel dotted lines only for the sake of clearness. This spring tends to push all of the space-blank carriers and their space-blanks toward the left or entrance end of the stick, (see Figs. 7 and 13,) such movement being restrained by a hooked latch $e^8$, pivoted on a shaft $e^9$, journaled in suitable brackets $e^{10}$ on the table D, the said shaft $e^9$ having at its opposite end a crank-arm $e^{11}$, to be hereinafter referred to. A flat spring $e^\times$ is interposed between the bottom of the dovetailed groove in which the space-blank carriers slide and the space-blanks themselves to prevent unnecessary rattle during the operation of the machine and to provide sufficient friction for proper working of the parts.

While I have herein described but one stick, together with its connecting attachments, the table D carries at its opposite side another similar stick fitted with similar attachments and operating in similar manner, as will hereinafter be described. Therefore it will be unnecessary to further describe the same at this point.

The table D is provided on its under side with two concentric rings $D^5$ $D^6$, (see Fig. 9,) the outer ring $D^5$ being provided with two diametrically opposite notches $D^7$ $D^8$, which coöperate with a stop, herein shown as a projection $f$ (see Fig. 3) on the lever $f'$, pivoted at $f^2$ and provided with a slot at its outer end, through which is extended a pin $f^3$ on the horizontally-movable rod $f^4$, jointed at its outer end to the controlling-lever $f^5$, pivoted at $f^{5\times}$ to the frame A and shaped to provide a suitable handle at its upper end. The rod $f^4$ is further extended beyond the lever $f'$ and jointed to one end of the clutch-lever $f^6$, pivoted at its upper end to the frame at $f^7$ and operating a clutch F on a shaft F', having a loose pulley $F^2$, driven by a belt $F^{2\times}$ from a pulley $F^3$ on the main driving-shaft $A^5$, (see Fig. 3,) the rod $f^4$, together with the levers $f^5, f'$, and $f^6$, all of which are moved together, being normally held in the extreme left-hand position, as represented in Fig. 3, by a spring $f^8$.

The shaft F' at one end has fast upon it a bevel-pinion $F^4$ in mesh with a bevel-gear $F^5$ on the lower end of the vertical shaft $D^{7\times}$, journaled in the frame A and also in the overhanging bracket or arm $A^6$, (see Fig. 3,) said shaft $D^{7\times}$ forming the pivotal center, about which is revolved the table D. The controlling-lever $f^5$ at or near its upper end is provided with a slot $f^9$ to receive the pin $f^{10}$ on the end of the bell-crank lever $f^{11}$, pivoted to the frame at $f^{12}$, and having its end $f^{13}$ lying directly under the outer end of the lever or arm $b^8$, (see Figs. 3 and $4^a$,) previously referred to as operating the type-setting arm $b$, so that when the lever $f^5$ is moved to the right, Fig. 3, to disengage the projection $f$ on the lever $f'$ from one of the openings $D^7 D^8$ in the ring $D^5$ on the under side of the table D and to throw the clutch F into operative connection with the rotating pulley $F^2$ to cause the shafts $F'$ $D^{7\times}$ to be rotated and rotate the table D through one-half a revolution the bell-crank lever $f^{11}$ will by the same movement of the lever $f^5$ be moved to raise the lever or arm $b^8$ sufficiently to disengage its U-shaped recess or bearing $b^7$ from the pin $b^6$ on the crank-arm $b^5$, which operates the type-setting arm $b$. This is necessary for the reason that as the pinion $b^{12}$ and gear-wheel $b^{10}$ rotate continuously the arm $b$ would operate continuously, going through the motions of delivering type while the table was being rotated, and might thereby come in contact with the rotating table and be broken; but by disengaging the arm $b^8$ from the pin $b^6$ movement of the type-setting arm $b$ is stopped during the time in which the table D is being rotated. While the table is being rotated by the shafts $F'$ and $D^{7\times}$, the projection $f$ bears against the under side of the ring $D^5$, and as soon as the table has rotated through one-half a revolution one of the diametrically opposite notches $D^7 D^8$ in the ring $D^5$ will arrive in position over the projection $f$, when the projection actuated by the spring $f^8$ will immediately spring into said notch and check the rotative movement of the table and hold the latter fixedly in position. The same movement of the lever $f'$ by the spring $f^8$ which causes the projection $f$ to spring into the notch in the ring $D^5$ also moves the clutch-lever $f^6$ to disengage the clutch F from the rotating pulley $F^2$ to thereby stop the rotation of the shafts $F'$ and $D^{7\times}$ immediately as the projection $f$ stops rotation of the table. When the spring $f^8$ returns the levers $f'$, $f^6$, and $f^5$ to their normal left-hand positions in checking the rotation of the table and shafts, the bell-crank lever $f^{11}$ is thereby dropped into its normal position to permit the arm $b^8$ to drop again into engagement with the pin $b^6$ on the crank $b^5$ to cause the type-setting arm $b$ to resume its regular movement from the carrier to the stick. From this it will be seen that so long as the hand-lever $f^5$ and the levers $f'$ and $f^6$ moved by it are in their normal positions to the left, Fig. 3, the table D is locked against rotation and the type-setting arm $b$ is permitted to move regularly to and from the stick; but when the hand-lever $f^5$ is moved to the right, Fig. 3, the projection $f$ is withdrawn from the notch in the ring on the under side of the table, the clutch F is moved into engagement with the pulley $F^2$ to cause rotation of the table, and at the same time, through the bell-crank $f^{11}$, the type-setting arm is thrown out of action until such time as the table again comes to a period of rest, when the movements of the type-setting arm are resumed.

Each of the standards $d^9$ (see Fig. 2) has pivoted to it at $f^{15}$ one end of a lever $f^{16}$, having a slot at its outer end to receive the pin $f^{17}$ on one end of the bell-crank lever $f^{18}$, pivoted at $f^{19}$ also to the standard, the end $f^{20}$ of the said bell-crank lever normally lying directly back of and in a position to strike against the space-blank E, which is in a position nearest the end of the stick at which the type are inserted, (see Figs. 2, 7, and 8,) so that when the lever $f^{18}$ is moved it will push one of the space-blanks E forward across the open end of the stick into position to be pushed into the stick by the type-setting arm $b$ at its next upward movement.

The length of the wedge-shaped finger $b^{16\times}$ on the end of the type-setting arm $b$ is sufficient to overreach a type carried on the end of the arm and to lift the plate $c^3$ and uncover the entrance to the stick before the type reaches a position to be pushed into the stick; but in practice the wider space-blanks are of such width that when they are pushed forward into position in front of the stick the wedge-shaped finger $b^{16\times}$ on the arm $b$ when the latter rises to push the space-blank into the stick is not of sufficient length to reach over the wide space-blank and lift the plate $c^3$ before the arm begins to push the space-blank toward the end of the stick, and it is therefore necessary to provide some means by which the plate $c^3$ may be raised before the arm begins to push the space-blank into the stick. Such means are furnished by a lever $c^{40}$, (see Figs. 8 and 10,) pivoted on the block $c^4$, which carries the plate $c^3$, said lever $c^{40}$ having its outer end $c^{40\times}$ bent slightly upward, as shown in Fig. 7, a finger $c^{41}$ on the lever normally lying in such a position that when a space-blank is pushed forward a pin $c^{42}$ on the blank will strike the finger $c^{41}$ and throw the end $c^{40\times}$ of the lever into its dotted position, Fig. 8, said lever being of sufficient length to overreach a space-blank when pushed into position in front of the entrance to the stick and to project beyond the blank, so as to be acted upon and lifted by the outer end of the type-setting arm $b$ just before the latter in rising reaches the blank, said arm thereby lifting the block $c^4$ and its plate $c^3$ to uncover the entrance to the stick, further movement of the arm after raising the block and plate pushing the space-blank before it into the stick in the same manner in which it pushes a type into the stick. A spring $c^{41\times}$, Fig. 10, returns the lever $c^{40}$ to its normal position as soon as the arm $b$ is withdrawn from beneath it in order to be in readiness to be acted upon and again turned by the pin $c^{42}$ on the next space-blank pushed forward for insertion.

The friction between the end of the arm $b$ and the lever $c^{40}$ when raised by the arm is sufficient to retain the lever in the position into which it has been moved by the pin on the space-blank after the latter has been inserted in the line, so that the lever is not returned to its normal position until the friction is relieved by withdrawal of the arm.

Each of the levers $f^{16}$ on the standards $d^9$ has a depending rod $f^{21}$, terminating a short distance below the table D, Figs. 2 and 7, one of which rods, according to the position of the table D, is always in position directly over the upturned end $f^{22}$ of the bell-crank lever $f^{23}$, (see Fig. 2,) said bell-crank lever being pivoted on a shaft $f^{24}$, journaled in a suitable bearing on the frame A, said shaft at its opposite end being provided with a spacing-handle $f^{25}$. (See Figs. 2 and 4.)

Whenever it is desired to introduce a space between two words being set up in a stick, the spacing-lever $f^{25}$ is depressed, lifting the end $f^{22}$ of the lever $f^{23}$, which will act through the levers $f^{16}$ and $f^{18}$ to push the space-blank into position in front of the stick, to be pushed into place by the arm $b$ as it rises.

If the space-blanks were of a width equal only to that of a normal space, the length of the line might be fixed beforehand and not changed until full; but when the space-blanks are abnormally wide, as shown, if the length of the line were permanently fixed the insertion of a few space-blanks would fill the line, leaving no room for the type. To obviate this, every time a space-blank is inserted in the line the limit or end of the line, which is the measuring device described, is moved bodily farther away from the end of the stick to lengthen the line a distance equal to the width of the space-blank inserted less the width of a normal space, so that however wide the space-blanks may be the length of the line is increased by the same amount less a normal space every time one is inserted, thus providing the same amount of space between the blanks to be filled with type as there would be were the space-blanks of the normal width and the line fixed. It is thus necessary to advance the measuring device, which, as described, consists of the fixed and movable members $c^{15}$ $c^{16}$, Figs. 7 and 8, along the stick a distance equal to one tooth of the ratchet-bar $c^{26}$ every time a space-blank is inserted. To accomplish this, the bell-crank lever $f^{18}$ (see Fig. 13) is connected by a rod or bar $f^{26}$ with a crank-arm $f^{27}$ on one end of the shaft $c^{12}$, previously referred to, connected with and rocking the plate $c^{29}$, which effects the release of the pawl, so that whenever the lever $f^{18}$ is rocked by depression of the spacing-lever $f^{25}$ to insert a space-blank in the stick the lever $f^{27}$ will also be rocked sufficiently far to tilt the swinging plate $c^{29}$ to disengage the pawl $c^{24}$ from the tooth of the ratchet-bar with which it was in engagement and permit the measuring device to advance a distance equal to one tooth along the stick.

The space-blank carriers $e$ are restrained from movement along the guide-bars $d$ $d'$ by the latch $e^8$, referred to, but as the space-blanks E are pushed one by one into the stick it is necessary to feed the space-blank carriers along to bring a new space-blank into proper position opposite the end of the stick to take the place of the one inserted. To accomplish this, the lever $f^{16}$, Figs. 7 and 8, is connected by a rod $f^{28}$, Fig. 13, with the crank-arm $e^{11}$ on the shaft $e^9$, previously referred to, and which turns the latch $e^8$, so that whenever the lever $f^{16}$ is moved to insert a new space-blank and to advance the measuring device one tooth the latch $e^8$ is depressed to permit the series of space-blank carriers to be moved along by the spring $e^7$ to bring the next space-blank into proper position. Assuming the block $c^7$ to be at the front or right-hand end of the stick, the measuring device $c^{15}$ $c^{16}$ is moved to the left along the stick until the distance between the adjacent edges of the movable member $c^{16}$ and the block $c^7$ is equal to the length of the line to be set up. When the length of the line thus fixed has in the process of setting up the type been so far filled with types that the edge of the block $c^7$ approaches so near the movable member $c^{16}$ of the measuring device that the operator sees he cannot set up another complete word or syllable, he will move the lever $f^5$ toward him or to the right, Fig. 3, causing the table D, carrying the stickful of type, to be swung around through one-half of a revolution, bringing the now empty stick upon the opposite side of the table into proper position to in like manner receive a line of type. The table D, carrying the line of type properly set with the space-blanks E inserted between the various words, having been rotated through one-half a revolution, it now remains to withdraw the said space-blanks and cast or mold from metal a space of the proper size to be inserted in the place of each and to close the line up to the proper required size, the mechanism for doing which will now be described. The pivotal shaft $D^7$, on which the rotating table D is pivotally mounted, projects through to the upper side of the overhanging bracket $A^6$ to receive a cam $h$, Figs. 1 and 3, having two diametrically opposite shoulders $h'$, said cam coöperating with a pin 5 on the inner side of the hooked end of the bar $h^2$, slotted at its rearmost end to straddle the guide-pin $h^3$, which latter holds one end of a spring $h^4$, attached at its outer end to the hooked end of the bar $h^2$, thus tending to draw said bar constantly rearward (see Figs. 1 and 2) and keep the pin 5 in operative contact with the surface of the cam $h$. The bar $h^2$ has a slot $h^{2\times}$ (see Fig. 14) to receive a pin $h^5$, standing out from the lower end of the pivoted latch $h^6$, acted upon by a spring $h^7$, which tends to move the upper end of the latch to the left, so that its shoulder $h^9$ may support a pin or stud $h^8$ on the bar $h^{10}$, mounted to slide in suitable vertical guideways $h^{11}$, to the back of one of which the latch $h^6$ is pivoted, said slide-bar at its lower end being swiveled to a sleeve $h^{12}$, Fig. 2, through which is extended a rod $h^{13}$, having at its outer end a yoke $h^{14}$, in which is journaled a roll $h^{15}$, to act as will be described, the said rod $h^{13}$ at its opposite end being jointed to one end of the slide-bar $h^{16}$, supported in a suitable dovetailed guideway in the bracket $h^{17}$, carried by the overhanging arm $A^6$, said slide-bar $h^{16}$ at its rear end carrying a vertical bar $h^{18}$, Figs. 2 and 16, having a vertical groove $h^{19}$ to receive the end of a pin $h^{20}$ on the sliding block $h^{21}$, Fig. 16, mounted to slide on the radial arm $h^{22}$, loosely pivoted at its lower end on the shaft $h^{23}$, journaled in suitable bearings carried by the frame, said sliding block $h^{21}$ containing a spring-controlled pawl $h^{24}$, adapted to engage one or another of a series of ratchet-teeth $h^{25}$, cut upon the front edge of the radial arm $h^{22}$. Sliding movement of the slide-bar $h^{16}$ in either direction acts through the vertical groove $h^{19}$ of the grooved bar $h^{18}$ and pin $h^{20}$ on the sliding block $h^{21}$ to rock the radial ratchet-toothed rod $h^{22}$. The radial arm $h^{22}$ at its top and bottom has jointed to it the links $h^{26}$, jointed at their outer ends to the releasing-bar $h^{27}$, which when moved vertically with relation to the radial arm $h^{22}$ is drawn in nearer to the radial arm $h^{22}$ by the parallel links $h^{26}$, so as to act upon a hook or projection $h^{28}$ on the pawl $h^{24}$ and push the latter back to disengage it from the ratchet-teeth of the radial arm when desired. The radial arm $h^{22}$, described as loosely mounted on the shaft $h^{23}$, is connected with to rotate the latter by means of a clutch arrangement $h^{29}$, (shown separately in Fig. 17,) controlled by an arm $h^{30}$, which stands in the path of movement of the laterally-projecting pin $h^{31}$ on the arm $h^{32}$, fast to and movable with the radial arm $h^{22}$, referred to, so that whenever the said radial arm is pushed toward the rear of the machine said pin will engage the arm $h^{30}$ to operate the clutch and cause the shaft $h^{23}$ to be rotated with it for a purpose to be hereinafter described.

The sliding block $h^{21}$, as herein shown, has jointed to it at $h^{33}$, Figs. 15 and 16, a depending rod $h^{34}$, having a series of ratchet-teeth $h^{35}$ cut upon its front face, which teeth are equal in number and length to the ratchet-teeth $h^{25}$ on the radial arm $h^{22}$, previously referred to.

The depending arm $f^{23\times}$ of the bell-crank lever $f^{23}$, Fig. 2, which is operated by the spacing-lever $f^{25}$, has jointed to it one end of a rod $f^{30}$, jointed at its opposite end to the triangular-shaped plate $f^{31}$, Figs. 15 and 18, pivoted at $f^{32}$ to the frame and carrying a projection $f^{33}$, arranged to engage one or another of the ratchet-teeth $h^{35}$ on the depending arm $h^{34}$ whenever the triangular-shaped plate is rocked by movement of the rod $f^{30}$, depression of the spacing-lever $f^{25}$ causing engagement of the finger or projection $f^{33}$ with one or another of the teeth $h^{35}$, acting to lift the bar $h^{34}$ and the sliding block $h^{21}$ a distance equal to the length of one of the ratchet-teeth each time a space-blank is inserted, the pawl $h^{24}$ in the sliding block $h^{21}$ dropping in behind the next succeeding ratchet-tooth of the radial arm $h^{22}$, all as clearly shown in Fig. 15, so that whenever the spacing-lever $f^{25}$ is depressed to insert a space-blank in the line of type being set up the sliding block $h^{21}$, with its pin $h^{20}$, is moved upwardly on the radial arm $h^{22}$ one tooth. Every downward movement of the spacing-lever $f^{25}$ therefore acts to move the sliding block $h^{21}$ upward one tooth on the toothed arm $h^{22}$—that is, one tooth farther away from its center of oscillation—so that though the horizontal movement of the block $h^{21}$ by its pin $h^{20}$ in the vertical slot $h^{19}$ be the same, which is always the case, yet the rotative or oscillating movement given to the radial-toothed rod $h^{22}$ by such movement of the pin $h^{20}$ is less, owing to the greater distance of the block from the center of oscillation. As the horizontal movement of the block $h^{21}$ by the bar $h^{18}$ is always the same, it follows that the greatest oscillating movement of the toothed arm $h^{22}$ is had only when the block is in its lowermost position before it has been raised a single tooth, the movement of the arm $h^{22}$ and the shaft $h^{23}$, to which it is connected by the clutch $h^{29}$, being gradually less as the block $h^{21}$ is moved farther away from the center of oscillation one tooth every time a space-blank is inserted. The bar $h^{18}$, together with the rod $h^{13}$ and roll $h^{15}$, Fig. 2, is acted upon through a link $h^{40}$ and lever $h^{41}$ by a weight H, which latter tends to move the said parts toward the rear of the machine, such movement, however, being restrained by a rod $h^{42}$, jointed to the lower extended end of the lever $h^{41}$, Fig. 15, and provided at its opposite end with a roll or other stud $h^{43}$, (see Fig. 22,) which rests against the periphery of the heart-shaped cam $h^{44}$, fast on the shaft $r^6$, said cam, when rotated at the proper time by its shaft, acting to permit the weight H to drop, and thereby move the bar $h^{18}$ bodily and in its vertical position to the right, Fig. 15. A sprocket-wheel $r^5$, loosely mounted on the shaft $r^6$, (see Fig. 15,) is continuously rotated by a sprocket-chain $r^4$ from a sprocket-wheel $r^3$ on a shaft $r$ below the shaft $r^6$ and journaled in the frame, the said sprocket-wheel $r^5$ being connected with its shaft $r^6$ by a clutch mechanism. (Shown separately in Fig. 23.) The continuously-rotating sprocket-wheel $r^5$ has its left face, Figs. 1 and 23, provided with a hub or boss $r^{50}$, in which are cut two diametrically opposite shoulders $r^{51}$ $r^{51}$, connected by curved faces, as shown. Immediately at the left of or in front of the hub $r^{50}$ is the arm $r^{52}$, fast on the shaft $r^6$ and having jointed to its outer end the block-plate $r^{53}$, carrying the clutch-block $r^{54}$. A pin $r^{55}$ at the back of the block-plate $r^{53}$ normally stands behind and against the cam-lug $r^{54\times}$ on the overturned upper end of bell-crank lever $r^8$, jointed at its lower end to one end of a rod $r^9$, extended across the machine and to be hereinafter referred to. A spring $r^{56}$, attached to the upper end of the block-plate $r^{53}$ and to the hub of the arm $r^{52}$, maintains the pin $r^{55}$ always in contact with the cam-surface $r^{54\times}$ referred to when the said block-plate is not in motion. A spring $r^2$, attached to the lower end of the bell-crank lever $r^8$, retains the latter normally in its position, Figs. 23 and 23ª.

The operation of the clutch is as follows, viz: The sprocket-wheel $r^5$ and its shoulders $r^{51}$ $r^{51}$ are rotated continuously, said shoulders clearing the block $r^{53}$, held back by the pin $r^{55}$ behind the cam $r^{54\times}$. When the rod $r^9$ is moved quickly to the left and again released, as will be described, the bell-crank lever is thrown back to the right, Fig. 23ª, about its pivot to raise the cam $r^{54\times}$ above and to release the pin $r^{55}$, thereby permitting the block-plate to be drawn to the left by the spring $r^{56}$ into the path of movement of the shoulders $r^{51}$ to be caught by one of the latter and, with its attached arm $r^{52}$ and shaft $r^6$, carried round by and with the said shoulder through one complete revolution. As the block-plate near the close of one revolution rises at the left, Fig. 23, its pin $r^{55}$ will ride upon the cam $r^{54\times}$ (returned to its normal position again immediately after it was moved to release the pin) and will pass over and down back of said cam, as in Fig. 23, thereby throwing said block-plate to the right to disengage its block from the shoulder which rotated it and stop the shaft $r^6$. The shaft $r^6$ is thus rotated once only, such rotation taking place only when the rod $r^9$ is moved to the left. The shaft $r$ has a fast pulley $r'$, belted to and driven by a pulley $r^2$, Figs. 1 and 2, fast on the counter-shaft $m^{56}$, having a pulley $m^{57}$, driven by a belt $m^{58}$ from and by a pulley $m^{59}$, fast on the shaft $A^5$, Figs. 1 and 2. The shaft $r$ is therefore rotated continuously, while the shaft $r^6$ is rotated therefrom only when its clutch $r^7$ is operated, when the said shaft $r^6$ will then be rotated through one complete revolution and automatically stopped, for a purpose to be hereinafter described.

The end of the rod $h^{42}$ is forked to straddle the shaft $r^6$, and thereby guide the rod in its movements.

The shaft $h^{23}$, on which the radial arm $h^{22}$ is loosely mounted and connected thereto by means of the clutch $h^{29}$ referred to, has at its outer end an arm $h^{45}$, (see Figs. 1 and 2,) in which is cut a slot $h^{46}$ for the reception of a block $h^{47}$, mounted on the threaded rod or screw $h^{48}$, rotation of which by a suitable thumb-screw $h^{48\times}$ varies the distance of said block from the axis of the shaft $h^{23}$, said block having a stud $h^{49}$, to which is jointed one end of the connecting-rod $h^{50}$, jointed at its opposite end to a block $h^{51}$, adjustably mounted on an arm $h^{52}$, fast on and movable with a toothed wheel $h^{53}$, journaled on a stud $h^{54}$, carried in the frame, said toothed wheel meshing with and operating a pinion $h^{55}$, fast to one end of a shaft $h^{56}$, also journaled in the frame and carrying at its inner end a head $h^{57}$, Figs. 1 and 19, provided at opposite sides of its axis with two diametrical grooves or recesses $h^{58}$, to be referred to. After the table D has been rotated the space-blanks are withdrawn from the line of type and spaces of the proper size and shape inserted in their place by mechanism mounted on a carriage M. (Shown in detail in Figs. 24 to 27, inclusive.) This carriage carries a mold for the casting of the spaces, which mold is automatically adjustable, as will be hereinafter more fully described, so that the spaces will each be of such size that the line of type will be properly filled and of the proper length when the spaces are inserted in place of the space-blanks, the carriage in its operations moving down in front of the line of type, withdrawing the space-blanks one at a time, and casting and inserting the spaces of proper size in their place, the carriage afterward returning to its normal position preparatory to again moving down in front of the next line of type for a similar operation when a new line has been placed in position by rotation of the table D, as described.

The diametrically opposite grooves $h^{58}$ in the head $h^{57}$ referred to, Figs. 1 and 19, are adapted to receive the diametrically opposite ears or projections $m$, Fig. 24, on the toothed wheel $m'$, loosely journaled on a stud $m^2$, mounted in a standard $m^3$, Fig. 26, carried by the hollow box-like casting M', which forms the bed or framework of the carriage M, the said toothed wheel $m'$ being in mesh with a pinion $m^4$, fast on a shaft $m^5$, journaled in suitable bearings $m^6$ $m^7$, carried by the bed M', said shaft $m^5$, at its end opposite the pinion $m^4$, being threaded, as at $m^8$, (see Fig. 25,) to enter a threaded hole in the sliding block $m^9$, which latter is provided with the guide-pin $m^{10}$ and guide rib or ear $m^{11}$ to guide it in its sliding movements, the guide rib or ear $m^{11}$ having jointed to it one end of a link $m^{12}$, pivoted at its lower end to the casting M', said link $m^{12}$ forming an inclined face which acts upon the movable member $n'$ to force the molded space from the mold at the proper time as the mold is dropped, as will be described.

The bed M' has erected upon it a frame (see Fig. 24) consisting of two uprights $M^2 M^3$, joined together at their upper ends, one of said uprights $M^2$ having a suitable bearing for the horizontal shaft $m^{13}$, Fig. 25, having fast upon it between the uprights $M^2 M^3$ a cam $m^{14}$, which acts at its upper side upon a roll or other stud $m^{15}$, Figs. 24 and 24ª, carried upon the upper end of a slide-bar $m^{16}$, Fig. 25ᵈ, fitted to slide in the vertical guideway $m^{17}$, formed in the upright $M^3$ and extended through said upright to the front side thereof, as best shown in Fig. 25ᵇ, said slide-bar having secured to it the type-mold N, Figs. 25ᵈ and 25ᵉ, herein represented as consisting of a block through which is cut a horizontal slot $n$ (see Fig. 25ᶜ) of a height equal to the width of the type to be employed in the machine, said slot being fitted with a sliding wall or plate $n'$, which coöperates with the fixed wall $n^2$ to form the mold into which the type-metal is forced to mold the space. The movable wall or plate $n'$ is acted upon by a spring $n^3$, which keeps the said wall normally in its outermost position, with one end resting against the sliding block $m^9$, mounted on the threaded end of the shaft $m^8$ described, as shown in Fig. 25. The mold N is acted upon by a spring $n^4$, surrounding the guide-rod $n^5$, which tends to force the mold downward and keep the roll $m^{15}$ in operative contact with the surface of the cam $m^{14}$, the position of the mold, whether elevated or depressed, being determined by the said cam. The upright $M^2$ is provided with two ears $n^6$, arranged one above the other upon the back of the upright, as shown in Fig. 24$^a$, to which is pivoted by its ears $n^{6\times}$ the molding-kettle $n^7$ and type-casting mechanism $n^8$, said molding-kettle and type-casting mechanism, as shown in Fig. 25$^c$, both being of a construction common in type-molding machines and practically constituting one device, the cold metal being placed in the receptacle $n^9$, where it is melted by gas-jets issuing from suitable burners supplied with gas through a pipe $n^{10}$, the melted metal flowing from the molding-kettle to the casting-chamber $n^\times$, Fig. 25$^f$, whence it is forced into the space-mold N through a nose $n^{11}$, which enters a corresponding opening in the fixed wall $n^2$ of the mold N.

Referring to Fig. 25$^f$, the type-casting mechanism is provided with the usual pump $n^{12}$, connected by a link $n^{13}$ with the arm $n^{14}$, fast on the shaft $n^{15}$, which latter is fitted with a long arm $n^{16}$, extended between the two uprights $M^2$ $M^3$ and at its outer end rests upon and is actuated by a cam $n^{17}$, (see Fig. 25$^a$,) so that as the shaft carrying the cam is rotated the long arm $n^{16}$ will at the proper time be depressed by the spring $n^{18}$, coöperating with the cam $n^{17}$ to force the pump $n^{12}$ into the type-casting chamber $n^\times$ to force a quantity of the molten metal therefrom through the nose $n^{11}$ into the mold N. The nose $n^{11}$, Fig. 25$^f$, is fitted with the usual "choker" $n^{41}$, which normally closes the orifice in the nose. This choker is connected with an arm $n^{40}$ of the shaft $n^{20}$, which latter is rocked by a long arm $n^{21}$, Figs. 25$^a$ to 25$^c$, which arm is held in contact with a cam $n^{22}$, Figs. 25$^a$ and 24$^a$, by means of a spring $n^{23}$, so that when the arm $n^{16}$ is moved by its cam to force the pump $n^{12}$ into the chamber $n^\times$ the cam $n^{22}$ will at the same time move the arm $n^{21}$ to withdraw the choker from the orifice in the nose to permit the metal to be expelled from the chamber into the mold.

The molding-kettle $n^7$ has an arm $n^{24}$, Figs. 24$^a$ and 26, extending nearly at right angles to it and shaped at its outer end to be acted upon by a face-cam $n^{25}$ on the bevel gear-wheel $m^{18}$, in mesh with a driving or bevel wheel $m^{19\times}$, fast on the inner end of the shaft $m^{13}$, which carries the cams $m^{14}$, $n^{17}$, and $n^{22}$, the said arm $n^{24}$ of the molding-kettle being held in operative contact with the face of the cam $n^{25}$ by a spring $n^{26}$, (see Fig. 26,) the action of the said cam $n^{25}$ in its rotation being to turn the melting-pot and casting mechanism on their pivot in the direction of arrow, Fig. 26, to insert the nose $n^{11}$ of the type-casting mechanism tightly into the opening in the fixed wall $n^2$ of the mold N for the casting of a space, the nose in such case projecting slightly beyond the inner wall of the type-mold and into the mold itself in order to prevent the formation of any bur or projection on the space when cast, the said nose $n^{11}$ being withdrawn by the cam $n^{25}$ as soon as the space is cast, in order that the completed space may be removed from the mold.

The bevel gear-wheel $m^{18}$ is mounted on one end of a shaft $m^{19}$, Fig. 24$^a$, journaled in the triangular-shaped bracket or support $m^{20}$, rising from the bed M' of the carriage, said shaft $m^{19}$ at its opposite end carrying a spur-wheel $m^{21}$, in mesh with the idle-pinion $m^{22}$, also carried by said bracket, said pinion being driven by a spur-wheel $m^{23}$, fast on the shaft $m^{24}$, which latter carries a cam $m^{25}$, adapted to act on the downturned end of a rod or bar $m^{26}$, (see Figs. 24, 24$^c$, 26, 31, and 32,) in a suitable guideway formed by the upper surface of the movable head $m^{29}$ and the block $w^{28}$, attached thereto, the said head being mounted to slide horizontally on two guide-rods $m^{30}$, surrounded by springs $m^{31}$, which act at their outer ends against stops $m^{32}$ and at their inner ends upon the said head $m^{29}$, tending to force the latter back against the bed M' of the carriage.

The front end of the bar $m^{26}$, Fig. 32, is formed in the shape of a needle or spindle $m^{35}$, which presents a seat $m^{36}$ to receive the molded space as it is thrust from the mold by the movable wall $n'$, the said needle being thereafter moved longitudinally in the direction of arrow, Fig. 32, to push the space received by the needle forward or endwise into the line of type, as will be hereinafter described.

Since the seat $m^{36}$ in the needle $m^{35}$ receives the molded space thrust from the mold and pushes the space endwise into the line of type, it is necessary that the needle should occupy such a position in front of the mold that the space when ejected from the mold shall fit and rest in the seat in the needle—that is, the needle and its seat must be farther from the mold to receive wide spaces than to receive narrow ones—which necessitates a lateral movement of the needle to accommodate spaces of varying widths, as well as a subsequent longitudinal movement to push the space into the line of type. In order that the needle may be thus moved laterally toward and from the mold N, the head $m^{29}$, which carries the needle, is made bodily movable and is so connected with the adjusting mechanism for the mold that whenever the mold is adjusted for a space of different width the head $m^{29}$ is at the same time moved bodily to carry the needle to such a distance in front of the mold that it will receive the molded space ejected from the mold. To accomplish this, the toothed wheel $m'$, previously described as in mesh with the pinion $m^4$ on the shaft $m^5$, is also in mesh with a pinion $m^{37}$ of the same diameter as the pinion $m^4$ and fast on a shaft $m^{38}$, located within the box-like bed M' of the carriage, said shaft $m^{38}$ at its opposite end or near the left end of the carriage, adjacent the needle $m^{35}$, being provided with a left-hand thread of equal pitch to the thread $m^8$ on the shaft $m^5$, said left-hand thread entering and moving a sliding block $m^{39}$, which lies directly behind the movable head $m^{29}$, carrying the slide-bar $m^{26}$ and its needle $m^{35}$. Whenever the wheel $m'$ is rotated, it causes like but opposite rotation of the two similar pinions $m^4$ and $m^{37}$ and their respective shafts $m^5$ and $m^{38}$, the threaded shaft $m^4$ causing movement of the movable wall $n'$ of the mold to adjust the latter, the threaded shaft $m^{38}$ causing movement of the sliding block $m^{39}$ and the head $m^{29}$ in front of it, and as the threads on the two shafts $m^5$ and $m^{38}$ are of the same pitch it follows that a rotative movement of the wheel $m'$ in either direction will cause an equal longitudinal movement of the adjustable wall $n'$ to adjust the mold and of the movable head $m^{29}$ to carry the needle $m^{35}$ into just the proper position in front of and away from the mold to receive the molded space as it is forced out from the mold.

After the space has been pushed into the line of type it is necessary, as will hereinafter appear, to move the head $m^{29}$ and its needle $m^{35}$ laterally away from the mold to permit the line to close up against the inserted space, which is narrower than the space-blank which it replaced. This movement is accomplished by a stud $m^{40}$ on the bevel-wheel $m^{19\times}$, Fig. 26, which stud, as the wheel rotates, acts upon the upper cam-shaped end of the lever $m^{41}$, pivoted at $m^{42}$, (see Fig. 31,) said lever at its lower end straddling the block $m^{39}$, as shown, the action of the pin $m^{40}$ upon the upper end of the lever being to throw the lower forked end outward and force the head $m^{29}$, carrying the needle $m^{35}$, and the molded or finished space outwardly or away from the mold into its dotted position, Fig. 32.

The shaft $m^{24}$, Fig. 24, which carries the cam $m^{25}$ and the spur-wheel $m^{23}$ is driven by a spur-gear $m^{24\times}$ on a shaft $m^{49\times}$ and in mesh with the spur-gear $m^{23}$, the shaft $m^{49\times}$ being rotated by the bevel-gear $m^{42}$, in mesh with the bevel-gear $m^{43}$, fast on the cross-shaft $m^{44}$, Figs. 26 and 27, located within the hollow casting M' of the carriage, said shaft $m^{44}$ at substantially its middle (see Figs. 27 and 30) having fast upon it a spur-wheel $m^{45}$, in mesh with a spur-wheel $m^{46}$, (shown in dotted lines, Fig. 30, and in Fig. 27,) loose on a cross worm-wheel shaft $m^{47}$, but fast to the clutch member $m^{48}$, which coöperates with a double clutch-piece $m^{49}$, splined to the worm-wheel shaft $m^{47}$, carrying the worm-wheel $m^{50}$, in mesh with the worm $m^{51}$, splined on the worm-shaft $m^{52}$, (see Figs. 1, 27, and 28,) journaled in suitable bearings in the frame and carrying at one end, outside the frame, a pulley $m^{53}$, Fig. 1, driven by a belt $m^{54}$ from a pulley $m^{55}$ on one end of the shaft $m^{56}$, also having fast to it a pulley $m^{57}$, driven by a belt $m^{58}$ from the pulley $m^{59}$, fast on the main driving-shaft $A^5$ of the machine.

The double clutch-piece $m^{49}$, at its end opposite the clutch member $m^{48}$, is formed to engage the spur-wheel $o$, loosely mounted on the worm-wheel shaft $m^{47}$ and in mesh with the rack $o'$, Fig. 1, supported in the frame A of the machine, and by means of which the carriage M, mounted on suitable rolls or wheels $m^\times$, which run on the tracks $z$, Fig. 1, is caused to travel down its track along the front of the line of type held in the stick for the purpose of withdrawing the space-blanks and inserting molded spaces in their places.

The double clutch-piece $m^{49}$ when in its position shown in Fig. 27 of the drawings engages the spur-wheel $o$ to rotate the latter to cause the carriage to travel down the front of the type; but when moved to its other extreme position it will be disengaged from the spur-wheel $o$ to stop the movement of the carriage, but will immediately engage the member $m^{48}$, fast to the pinion $m^{46}$, to rotate the latter and operate through the mechanism described the pump $n^{12}$ to mold a space and insert it in the opening left by the withdrawal of a space-blank. The worm-wheel shaft $m^{47}$ also has fast to it a spur-wheel $o^2$, in mesh with a spur-wheel $o^3$, fast on the cross-shaft $o^4$, journaled in the hollow portion of the bed M', said shaft $o^4$ having splined upon it a movable clutch member $o^5$, adapted to engage the spur-wheel $o^6$, loosely mounted on the shaft $o^4$ and adapted to mesh with a rack $o^7$, arranged parallel with and close to the rack $o'$ described, said wheel $o^6$ and rack $o^7$ coöperating to return the carriage M to its normal position after having passed down the track.

The double clutch-piece $m^{49}$ is provided with a circumferential groove to receive the fork $o^8$ on the forward clutch-operating lever $o^9$, which latter is held against the action of the spring $o^{10}$ in the position shown in Fig. 27 of the drawings, with the clutch member $m^{49}$ in engagement with the wheel $o$ to cause the carriage to travel forward by a spring-controlled latch $o^{11}$, pivoted on the clutch-lever $o^9$, which latch drops into a recess $o^{12}$ in the latch-bar $o^{13}$, Figs. 28, 30, and 33, pivoted at $o^{14}$ and having jointed to its outer right-hand end an upright sliding bar $o^{15}$, (see Figs. 28 and 29,) the upper cam-face $o^{16}$ of which bears against the lower end of the releasing-trigger $o^{17}$, pivoted to the movable head $m^{29}$ and controlled by the spring $o^{18}$, the end of the latch-lever $o^{13}$ being acted upon by a spring $o^{19}$, which tends to depress the forward end of the lever (see Fig. 28) to disengage the recess $o^{12}$ in the latch-bar $o^{13}$ from the latch $o^{11}$ on the clutch-lever $o^9$ to release the latter and permit the spring $o^{10}$ to move it to cause the clutch member $m^{49}$ to become locked with the member $m^{48}$ on the pinion $m^{46}$ and throw the space-molding mechanism into operation, such movement, however, being prevented by the position of the releasing-trigger $o^{17}$, which prevents upward movement of the slide-bar $o^{15}$ and movement of the latch-lever $o^{13}$. The clutch member $m^{49}$ has projections $m^{49a}$, which engage a tooth $m^{48a}$ on the member $m^{48}$, and teeth $m^{49b}$, which engage a spring-pawl $o^{48a}$ on the wheel $o$. (See Figs. 48 and 49.)

The upper end of the releasing-trigger $o^{17}$ projects above the top of the carriage M, as shown, and lies directly in the path of the projecting fingers $e^3$ of the several space-blanks in the line of type and which are to be withdrawn for the insertion of the molded spaces, so that as the carriage M is moved down the line of type the projecting end of the releasing-trigger $o^{17}$ will strike against the projecting finger $e^3$ on the first space-blank it reaches and will be thrust back into its dotted-line position thereby, (see Fig. 29,) which will permit the spring $o^{19}$ to lift the inner end of the latch-lever $o^{13}$, depress the forward end to disengage its recess $o^{12}$ from the latch $o^{11}$ on the clutch-lever $o^9$, and permit the spring $c^{10}$ to move the clutch member $m^{49}$ out of engagement with the spur-wheel $o$ to stop the carriage in front of the first space-blank and to immediately engage the clutch member with the member $m^{48}$, fast to the pinion $m^{46}$, to set in motion the mechanism necessary for molding a space and inserting it in the opening left by the withdrawal of the space-blank.

When the molded space has been inserted in position and the carriage is ready to move forward to the next space-blank, the clutch-lever $o^9$ is moved to disengage the clutch member $m^{49}$ from the member $m^{48}$ to stop the casting or molding mechanism into engagement with the wheel $o$ to again feed the carriage forward by means of an arm $o^{21}$, Figs. 28 and 30, on the shaft $o^{22}$, journaled in the lower part of the carriage and provided at its opposite end with an arm $o^{23}$, Figs. 24 and 24$^a$, actuated by a link $o^{24}$, connected at its outer end with the outer end of the spring $o^{25}$, secured at its inner end to an arm $o^{25\times}$, pivoted upon a stud $o^{26}$ and resting against a stud $o^{27}$ on the disk $o^{28}$, mounted on the shaft $m^{49\times}$, Fig. 24, rotation of the disk and stud acting to compress or relieve the spring, as will be described.

The spring $o^{25}$ is prevented from moving the arm $o^{23}$ and shaft $o^{22}$ by a latch $o^{29}$, pivoted at $o^{30}$, Fig. 24, and acted upon at its lower end by a wedge-shaped pin or projection $o^{31}$ on the periphery of the disk $o^{28}$ referred to. The disk $o^{28}$ being fast on and movable with the shaft $m^{49\times}$, which latter controls the movement of the various parts of the space-casting mechanism, will at the proper time, through its projection $o^{31}$, move the latch $o^{29}$ to release the arm $o^{23}$ on the shaft $o^{22}$ and permit the spring $o^{25}$, previously compressed by rotation of the disk and its stud $o^{27}$, to expand and move the arm $o^{23}$ to rotate the shaft $o^{22}$ sufficiently far to cause its arm $o^{21}$ to push the clutch-lever $o^9$ back, (see Figs. 27, 28, and 30,) against the action of the spring $o^{10}$, into engagement with the wheel $o$ to start the carriage along toward the next space-blank, a pin $o^\times$, Figs. 28 and 30, on the arm $o^{21}$ acting against the curved under side of the depressed latch-bar $o^{13}$ to lift said latch-bar, so that its recess $o^{12}$ will catch the latch $o^{11}$ on the clutch-bar $o^9$ and hold it until the releasing-trigger $o^{17}$ is struck by the finger $e^3$ on the next succeeding space-blank, when the parts will go through with the same operation as described, casting a second space and inserting it in the place of the blank to be removed.

The mechanism for casting or molding the space, together with the mechanism for inserting it, has now been described; but it is necessary to remove the space-blank from the line of type in order to make room for the new space to be inserted. A small auxiliary carriage $m^{50a}$ (shown separately in Fig. 39) is mounted to slide on two parallel guide-rods $m^{50\times}$, supported on the table D and below the rods $d$ $d'$, said carriage having bearings for a slide-bar $m^{51\times}$, having at its front outer end a hook 50 and at its inner end a projecting upturned finger $m^{52\times}$, which latter as the carriage $m^{50a}$ is moved along the guide-rods $m^{50\times}$ will pass immediately in front of the downwardly-projecting pins $e^4$ on the under sides of the space-blanks E, the said carriage $m^{50a}$ having at its front end a projecting arm $m^{53\times}$, by means of which the said carriage may be moved along the guide-rods $m^{50\times}$. The carriage M on its front side, Figs. 24$^b$ and 25, adjacent the line of type has a dog $m^{54\times}$, pivoted at $m^{55\times}$ and having a hook $m^{56\times}$ at its front end, said dog being normally maintained in its elevated position, as shown in Fig. 25, by a spring $m^{57\times}$. The carriage M also has a slide-bar $m^{58\times}$ extending through the carriage from side to side, having on its front end which protrudes through the side of the carriage, as shown in Figs. 24$^b$, 26, and 27, a hook 51 and its rear end turned down to be acted upon by a cam $m^{59\times}$, (see dotted lines, Fig. 24,) fast on the shaft $m^{49\times}$, forming part of the needle-operating mechanism. As the carriage M starts down the track in front of the line of type the inclined face 55 of the pivoted dog $m^{54\times}$, Fig. 25, will strike against a fixed pin or projection 60 on the side of the table D, (see Fig. 7,) which will depress the said dog, so that its hook $m^{56\times}$ will drop below and pass under the end of the projection $m^{53\times}$ on the frame $m^{50a}$ on the guide-rods $m^{50\times}$ $m^{50\times}$, and as the pin or stud 60 moves along the inclined upper face of the said dog toward its pivotal center it will permit the dog to rise with its hook $m^{56\times}$ and face 56, lying at opposite sides of the projection $m^{53\times}$, as represented in Fig. 25, so that as the carriage continues its movement the dog $m^{54\times}$, acting upon the projecting arm $m^{53×}$, will push the carriage $m^{50a}$ with it along the guide-rods $m^{50×}$, causing the finger $m^{52×}$ on the slide-bar $m^{51×}$ to travel in front of the downwardly-extended pins $E^2$ on the space-blanks E. At the same time that the dog $m^{54×}$ sprang up and embraced the projecting arm $m^{53}$ of the carriage $m^{50a}$ the movement of the carriage M brought the hook 51 on the end of the slide-bar $m^{58×}$ into engagement with the hook 50 on the slide-bar $m^{51×}$ on the carriage $m^{50a}$, so that thereafter the carriage $m^{50a}$ is moved by and with the carriage M, and when the latter is stopped in front of the successive space-blanks by the tripping of the latch $o^{17}$ by the projecting fingers on the space-blanks, as described, the carriage $m^{50a}$ is also stopped with its vertical finger $m^{52×}$ in position immediately in front of the depending pin $e^4$ on the space-blank opposite which the carriage is stopped.

As the latch $o^{17}$ on the carriage M is moved by the finger on the space-blank to stop movement of the carriage, it at the same time operates, as described, to move the clutch-lever $o^9$ to set in operation the mechanism which molds and inserts the spaces, and the cam $m^{59×}$ on the shaft $m^{49×}$ will act upon the slide-bar $m^{58×}$ and force the same, together with the slide-bar $m^{51×}$ on the carriage $m^{50a}$, to which it is coupled, outwardly from the said carriage M, causing the finger $m^{52×}$ on the slide-bar $m^{51×}$ to strike against the pin $E^2$ on the space-blank and push the latter back and out from the line of type at the same time that the needle $m^{35}$ pushes the molded space into the space left by the withdrawal of the space-blank. After the space-blank has been thus withdrawn from the line of type the cam $m^{59×}$ permits the slide-bar $m^{58×}$ to be returned to its normal position by a spring $m^{59×}$, (shown only in Fig. 27,) while a spring $m^{60×}$, Fig. 8, assists in returning the slide-bar $m^{51}$ to its normal position, the two slide-bars being, however, still coupled together end to end by their hooks 50 51 and operating as one piece. As the shaft $m^{49×}$ nears the end of a single revolution, having caused the withdrawal of a space-blank and the insertion in its place of a molded space, the projection $o^{31}$ on the disk $o^{28}$ moves the latch $o^{29}$ and permits the spring $o^{25}$ to rotate the shaft $o^{22}$ and shift the clutch-lever $o^9$ to cause the carriage M to again move forward to the next space-blank, the smaller carriage $m^{50a}$, carrying the slide-bar $m^{51}$, being moved with it until again stopped by and in front of the next space-blank to withdraw the same in similar manner, as described.

As the space-blanks are inserted one at a time in the line of type, they and their carriers $e$ are moved or scattered along the guide-rods $d$ $d'$ while the line of type is being filled, and after these space-blanks have been withdrawn from the line of type and replaced therein by molded spaces of the proper size they and their carriages must be returned again to their former positions, grouped at the entrance to the stick, in order to be in proper positions to be placed in the next line set up. Accordingly a slide-block $q$ is mounted to slide on a guide-rod $q'$, lying between the guide-rods $m^{50×}$, as shown in Fig. 39, said slide-block having pivoted to it a hook $q^2$, normally kept in its most elevated position by the cord $q^3$, passing about a pulley $q^4$, Fig. 7, thence back through an eye in a depending ear on the sleeve $e^6$, through an ear $e^×$ on the first of the series of space-blank carriers $e$, and also through a depending ear $q^5$ on the under side of the measuring device, thence about a pulley $q^6$, Fig. 7, to a coiled spring $q^7$, similar to and coiled about the same post as the coiled spring $c^{37}$ referred to.

As the auxiliary carriage $m^{50}$, moved by the carriage M, draws near the end of its travel along the front of the line of type it will depress the hook $q^2$ and pass over it, the hook springing up behind it, so that when the auxiliary carriage $m^{50}$ is returned again to its original normal position at the left, Fig. 7, it will pull the hook $q^2$ and the cord $q^3$ after it, the said cord $q^3$ having two hubs or lugs $q^8$ $q^9$. The lug $q^8$ is smaller than the lug $q^9$, so that the lug $q^8$ will pass through the opening in the ear $q^5$, depending from the measuring device, and will strike against the ear $e^×$ on the first of the space-blank carriers and draw the said carrier and those in front of it back to their normal positions at the end of the stick, where they are caught and retained by the hook $e^8$, as described. The larger lug $q^9$ on the cord $q^3$ will strike the ear $q^5$ on the measuring device and draw that also back in the stick to its position immediately behind the slide-block $c^7$ at the entrance of the stick. If desired, the lug $q^9$ may be made adjustable on the cord $q^3$, so that the measuring device will be drawn to exactly the required position for the proper length of line to be set up.

As the carriage M and auxiliary carriage $m^{50}$ draw near the end of their return movement, having drawn the space-blank carriers and the measuring device back to their normal positions, the inclined upper face of the dog $m^{54}$ will pass under the pin 60 on the table D and will be depressed thereby to release the arm $m^{53}$ from the dog, so that the carriage M may continue farther to the end of its movement without the auxiliary carriage $m^{50}$.

The inclined end of the hook $q^2$ on the slide-block $q$, which has been drawn back with the auxiliary carriage in order to return the space-blanks and the measuring device to their normal positions, enters a slot in the end of the frame and is depressed to thereby disengage it from the carriage $m^{50}$, when the spring $q^7$, acting through the cord $q^3$, immediately draws the same back to its position, Fig. 7.

A short distance beyond the ends of the racks $o'$ and $o^7$ a horizontal shaft $p$ is journaled in suitable bearings $p'$, Figs. 1, 3, 40, and 41, on which shaft is fixed a radial arm $p^2$, Fig. 41$^a$, having pivoted to it at $p^3$ the vibrating head $p^4$, provided with an opening $p^5$ of sufficient size for the end of the clutch-lever $o^9$ which projects beyond the front of the carriage M to enter the said head $p^4$, having its shank connected by a link $p^6$ with the sleeve $p^7$, mounted to slide on the shaft $p$, a spring $p^8$ being interposed between the sleeve $p^7$ and the fixed arm $p^2$, which spring tends to force the said sleeve away from the arm and tip the head $p^4$ into the inclined position shown in Fig. 1.

An upwardly-inclined lever $p^{10}$, Fig. 41$^a$, is arranged on the inside of one of the guide-rails $z$, (see Figs. 1 and 41,) said lever having secured to it one end of a strap $p^{11}$, which encircles the shaft $p$, so that if the said lever is depressed it will rotate the shaft $p$ in the direction of the arrow, Figs. 1 and 41$^a$, to turn the fixed arm $p^2$, carrying the vibrating head $p^4$, into a vertical position, as shown by dotted lines, Fig. 3, and full lines, Fig. 41$^a$, against the action of a coiled spring $p^{12}$. As the carriage M, having stopped at the last space-blank and inserted its space, continues to move toward the end of its travel a depending lug $p^×$ on the said carriage (see Figs. 24$^a$ and 28) strikes against the inclined lever $p^{10}$, depresses the same to rotate the shaft $p$ and lift the arm $p^2$ and inclined head $p^4$ into their upright positions, and at the same time the inclined face $p^{13}$ on the projecting arm $p^{14}$, Fig. 24$^b$, on the said carriage strikes against the pin $p^{15}$ on the sleeve $p^7$, which controls the position of the tipping head $p^4$ and now turned into a vertical position, and slides the said pin and its sleeve to the right (see Fig. 1) and acts through the link $p^6$ to throw the head $p^4$ into a vertical position, Fig. 41$^a$, so that the end of the clutch-lever $o^9$ as the carriage nears the end of its movement will enter the slot or opening $p^5$ in the said head, the outer end of the latch $o^{11}$ in the end of the said clutch-lever being depressed as it is forced into the opening $p^5$ to thereby lift its inner end out of the recess $o^{12}$ in the latch-bar $o^{13}$. As the pin $p^{15}$ on the sleeve $p^7$ moves off the flat face $p^{16}$ on the arm $p^{14}$ into the recess $p^{17}$ the spring $p^8$, encircling the shaft $p$, will immediately cause the pin 15 to enter said recess, and thereby throw the head $p^4$, holding the end of the clutch-lever $o^9$, over into its former inclined position, as shown, thereby moving the clutch-bar $o^9$ to the left, Figs 27 and 28, until it strikes a pin $o^{20}$ on the upper side of the latch-bar $o^{13}$, which stops the clutch-bar in an intermediate position—that is, with its clutch member $m^{49}$ moved out of engagement with the wheel $o$ to check the travel of the carriage and yet not moved far enough to come into engagement with the member $m^{48}$ and start the type casting and inserting mechanism—so that the carriage is free to be moved back along its track. The forward movement of the carriage having been stopped, the clutch mechanism controlling the clutch $o^5$ must now be operated to start the return movement of the carriage back along the track to its starting-point preparatory to the beginning of an entirely new movement. The clutch $o^5$, Fig. 27, is controlled by the lever $p^{18}$, pivoted at $p^{19}$ and having its outer end $p^{20}$ provided with a projecting upturned arm $p^{21}$, which is connected by a spring $p^{22}$ (see Figs. 27 and 28) with a fixed stud $p^{23}$, carried by an ear on the arm $p^{14}$, the said spring tending to normally keep the lever $p^{18}$ in the position shown in the drawings, with its clutch $o^5$ disengaged from the wheel $o^6$, which produces the return movement of the carriage, so that the normal position of the clutch is idle or disengaged from its wheel; but the movement of head $p^4$ as it is moved by the spring $p^8$ to throw the clutch-lever $o^9$ into its intermediate position to stop the forward movement of the carriage also strikes against the end $p^{20}$ of the lever $p^{18}$ and moves the same to the left, Figs. 1 and 27, to thereby move the clutch $o^5$ into engagement with the backward-feed wheel $o^6$, which is immediately caused to rotate with the clutch and with the shaft $o^4$ and return the carriage to its original normal position, Fig. 1, the lever $p^{18}$ being held in its operative position by the upturned arm $p^{21}$ catching behind the inclined projection $p^{24}$ on the latch $p^{25}$, pivoted at $p^{25×}$ and having a releasing-arm $p^{26}$, the latch being maintained in operative position by a spring $p^{27}$. The clutch $o^5$ is thus held in operative contact with the wheel $o^6$, causing the return movement of the carriage until the latter has nearly completed its return movement, when the releasing-arm $p^{26}$ will strike against a stop $p^{28}$, which moves it to the right, Fig. 1, to disengage the projection $p^{24}$ from the upturned arm $p^{21}$ and permits the spring $p^{22}$ to throw the lever $p^{18}$ back to its normal position to throw the clutch out and stop the return movement. As the carriage begins its backward or return movement the pin $p^{15}$ on the sleeve $p^7$, which had dropped into the recess $p^{17}$, and thereby thrown the head $p^4$ into its inclined position to stop the forward movement of the carriage, will move out from the recess behind the inclined face or projection $p^{13}$, as clearly shown in Fig. 27, the arm $p^{14}$, which carries the projection, being hinged at $p^{14×}$, so that it will readily yield before the pin to permit the latter to be withdrawn. As the carriage moves back the inclined lever $p^{10}$ will be permitted to rise again, permitting the spring $p^{12}$ to turn the shaft $p$ and the arm $p^2$ and head $p^4$ down into their horizontal positions, this being necessary to prevent the head being struck by the table D as the latter is rotated. The shaft $r^6$, previously referred to and having mounted upon it the continuously-rotating sprocket-wheel $r^5$, driven from the shaft $r$, is connected with and rotated by the said sprocket-wheel $r^5$ at the proper times by a clutch mechanism, Fig. 23, described, and controlled by a lever $r^8$, jointed to a rod $r^9$, extended under and across the machine and provided with an upturned end $r^{10}$, adapted to be engaged by the spring-controlled pivoted finger $r^{11}$, Fig. 2, on the lower end of the bell-crank arm $r^{12}$, pivoted at $r^{13}$ and having a projection $r^{14}$ normally resting in one or another of the recesses $r^{15}$ in the inner annular ring $D^6$ on the under side of the table D. When the table is rotated, the projection $r^{14}$ will be depressed by the inclined face $r^×$ of the recess in which it lay, the end of the finger $r^{11}$ being moved back to catch behind the upturned projection $r^{10}$ on the rod $r^9$, so that when the table has been rotated through one-half a revolution to carry a line of type into position to be acted upon by the various mechanisms on the carriage M, moving along its track, the projection $r^{14}$ will spring into the opposite recess now brought into position above it, and thereby move the rod $r^9$ to the left, which movement of the rod will throw into gear the clutch mechanism $r^7$, which will rotate the shaft $r^6$ through one revolution, when it will disengage itself, a spring $r^2$ serving to return the rod $r^9$ to its former position. The shaft $r^6$ is thus set in rotation immediately upon completion of each rotative movement of the table D to bring a line of type into position for the removal of its space-blanks and the substitution therefor of molded spaces of the proper width, the first operation which the shaft, by its rotation, accomplishes being through its cam $h^{44}$, Figs. 1, 15, and 22, which permits the weight H to drop and pull the arm $h^{18}$ and its connected radial toothed arm $h^{22}$ to the left to cause the said arm, through its clutch $h^{29}$, to rotate the shaft $h^{23}$ a distance corresponding to the movement of the arm $h^{22}$, such rotation being greater or less, according to the distance of the block $h^{21}$ from the axis of the shaft. This rotation of the shaft $h^{23}$ by the radial toothed arm $h^{22}$ acts to turn the head $h^{57}$ and wheel $m'$ to adjust, in the manner hereinbefore described, the size of the mold to that required for the spaces which are to be substituted for the space-blanks already in a line of type, such movement of the wheel $m'$ also acting to adjust the position of the needle $m^{35}$, so that the needle will receive the molded spaces as they are discharged from the mold prior to the movement of the needle for insertion of the spaces in the line. This movement of the arm $h^{18}$ by the weight H also moves with it the slide-bar $h^{16}$ and rod $h^{13}$ rearward, (see Figs. 2 and 15,) the roll $h^{15}$ in the rod $h^{13}$ catching the roll-stud $d^{15}$ and drawing that also back to move the movable member $c^{16}$ of the measuring device toward the sliding block $c^7$, the weight being permitted to fall to rock the arm $h^{22}$ and its shaft until stopped by contact of the movable member of the measuring device with the sliding block $c^7$, so that the distance through which the movable member of the measuring device may move before striking the sliding block $c^7$ determines the distance through which the shaft $h^{23}$ and the wheel $m'$ are rotated by the weight H.

Having now adjusted the mold through the head $h^{57}$ and wheel $m'$, the carriage is soon to start down the track; but it is necessary to retain the said head $h^{57}$ in its present position in order that when the carriage returns the projections $m$ on the wheel $m'$ may again enter the grooves in the head for the further operation of the mechanism. To hold the parts in this position during the forward and return movements of the carriage, I have provided a brake mechanism consisting of a disk $r^{16}$, fast on the shaft $h^{23}$, opposite the periphery of which is arranged a brake-shoe $r^{16×}$, mounted on a lever pivoted at $r^{17}$, said brake-shoe being moved against the periphery of the disk by a cam $r^{18}$ on the shaft $r^6$, so that the said shaft as soon as it has released the weight H to adjust the size of the mold immediately acts through the cam $r^{18}$ to actuate the brake to hold the parts rigidly in position until the return of the carriage, Figs. 1, 2, and 19. The next operation which the shaft $r^6$ performs in its rotation is the release of the carriage M to permit it to start down the track, which release is effected as follows: The shaft $r^6$, adjacent to the cam $r^{18}$, which actuates the brake previously described, is also provided with another cam $r^{19}$, which is shaped as shown in Fig. 19, having a gradual inclined rising face terminating in a sudden shoulder or drop, the said shaft previous to beginning its rotation leaving the cam in substantially the position shown in said Fig. 19. Rotation of the shaft through substantially one-quarter of a revolution will permit the pin $r^{20}$ on the slide-bar $r^{21}$, actuated by a spring $r^{22}$, to spring off from the shoulder on the cam referred to and move the slide-bar to the right in Fig. 19 or to the left in Fig. 2, an arm or projection $r^{23}$ on the said slide-bar $r^{21}$, striking against a pin $r^{24}$ on the arm $o^{23}$ on the shaft $o^{22}$ on the carriage, throwing the said arm $o^{23}$ to the left, Fig. 24, into its dotted-line position against the action of the spring $r^{25}$ and causing the arm $o^{21}$ on the said shaft $o^{22}$ to be moved to throw the clutch-lever $o^9$ back again from the pin $h^{20}$, which held it into its position, Fig. 16, to engage the clutch member $m^{49}$ with the toothed wheel $o$ and cause the carriage to begin its forward movement down the track, the latch $o^{11}$ on the clutch-lever $o^9$ springing into and being held by the recess $o^{12}$ in the latch-bar $o^{13}$. Immediately as the carriage begins its forward movement and the pin $r^{24}$ becomes disengaged from the arm $r^{23}$, which moved it, the spring $r^{25}$ will throw the arm $o^{23}$ back again into its full-line position, Fig. 24. As the shaft $r^6$ continues its revolution the cam $r^{27}$ thereon (shown in detail, Fig. 21) will depress the end of the lever $r^{28}$ pivoted in the support $r^{29}$ and lift its opposite end, which is connected by a link $r^{30}$ with the movable bar $h^{27}$, connected with the radial arm $h^{22}$ previously referred to, and will lift the said bar $h^{27}$ to disengage in the manner described the pawl in the sliding block $h^{21}$ from the ratchet-tooth on the radial arm with which it was in engagement, permitting the said block to drop quickly to its normal position ready to be readjusted for the next line of type. Instantly after the sliding block $h^{21}$ has dropped to its lowermost normal position the cam $h^{44}$ will return the weight H, the bars $h^{18}$ $h^{16}$, and rod $h^{13}$ to their normal positions, acting through the block $h^{21}$ to throw the radial arm $h^{22}$ also back into its vertical position, leaving, however, the shaft $h^{23}$ and its connected head $h^{57}$ in their former abnormal positions to be returned later, they being held by the brake $r^{16\times}$ described. Practically at the same time that the cam $r^{27}$ acts to drop the sliding block $h^{21}$ the heart-shaped cam $r^{31}$ on the shaft $r^6$, Figs. 2, 15, and 22, will be brought into position to permit the stud $r^{32}$ on the end of the rod $r^{33}$ to drop and lower the end of the lever $r^{34}$ pivoted at $r^{35}$ in the overhanging arm $A^6$ and lift the opposite end of the said lever to raise the slide-bar $h^{10}$, rod $h^{13}$, and roll $h^{15}$ to their original normal positions, where they are caught and held by the latch $h^6$.

Referring to Fig. 19, $r^{36}$ is a horizontal shaft having an upturned end $r^{38}$, which is normally retained in a vertical position beneath and holding the brake-shoe $r^{16\times}$ against the disk $r^{16}$, Figs. 19 and 20, to hold the various parts from displacement by means of a spring $r^{37}$, which acts against an arm $r^{35}$, depending from the said shaft, said upturned end $r^{38}$ retaining the brake-shoe against its disk after the complete rotative movement of the shaft $r^6$ and during the time that the carriage M is traveling down its track and back. Were it not for this upturned end $r^{38}$ a complete rotation of the shaft $r^6$ would apply the brake and again release it before the carriage had started down its track. When, however, the carriage approaches the end of its return movement, the extended end of the shaft $o^{22}$, Fig. 24, strikes the depending arm $r^{35}$ and pushes the same inwardly before it, turning the upturned end $r^{38}$ of the shaft down to permit the brake-shoe to drop away from its friction-disk, when the shaft $h^{23}$, which is now free to rotate independently of the weight owing to the clutch $h^{29}$ described, is returned to its original position by a counterweight H', Fig. 1, and by means of the head $h^{57}$ and wheel $m'$, which have been again placed in engagement with each other by the return of the carriage to its original position, acts to return the mold and the needle $m^{35}$ also to their original positions, as shown in the drawings preparatory to the commencement of a new cycle in the operation of the machine. As soon as the carriage starts on its movement down the new line of type the spring $r^{37}$ returns the shaft $r^{36}$ to its normal position, supporting the brake-shoe $r^{16\times}$. It will now appear why the clutch $h^{29}$ was provided between the radial arm $h^{22}$, having the ratchet teeth, and the shaft $h^{23}$, on which it is mounted. It was necessary to move the radial toothed arm $h^{22}$ back to its normal position before the carriage had begun its movement down the line of type in order that the sliding block $h^{21}$ might, by the operation of setting up the new line of type, which takes place during the movements of the carriage, be moved upwardly on the said radial arm to set the mechanism for a proper adjustment of the mold to cause spaces for the new line when the latter is brought into position upon the return of the carriage; but it was equally essential that the head $h^{57}$ be held fixedly in position until the return movement of the carriage has been completed, in order that the projections or ears $m$ on the wheel $m'$ may properly enter the grooves in the head, so that while the radial arm and its shaft are moved together in one direction it is necessary to return them independently of each other back to their normal position, the shaft being returned after the carriage has completed its movements and just in time to be turned down again by the radial arm $h^{22}$ for a new line of type.

The operation of the machine is as follows: The operator first moves the measuring device $c^{15}$ $c^{16}$ down the stick such a distance that the distance between the adjacent edges of the movable member $c^{16}$ and the block $c^7$ will be equal to the length of the line to be set up, the screws $c^{27}$ permitting any adjustment desired finer than the teeth of the bar $c^{26}$. The operator will then select the type by the selecting mechanism L, as fully set forth in the Patent No. 372,187, referred to, the type being taken by the revolving disk $a^\times$, as previously described, and laid on the end of the type-setting arm $b$ in the recesses between the ears $b^4$ in the guards $b^3$, and the continuous rotation of the wheel $b^{10}$ will cause the type-setting arm $b$ to be raised, the ears $b^4$ on the end of the guards carrying the type against the end of the stick, where it is held until further movement of the arm $b$ acts through its finger $b^{17}$ to lift the hook $c^{13}$ and plate $c^3$ to uncover the end of the stick, when the arm $b$ will push the type into the stick, after which the arm will be withdrawn, the lost motion between it and the guards, as previously described, permitting the arm to first move sufficiently far to release the plate $c^3$ and permit the latter to drop to close the end of the stick before the guards are moved, the said arm and guards being thereafter returned to their original positions preparatory to setting a new type. A number of types are inserted in this manner until a word is completed, when the operator depresses the spacing-lever $f^{25}$, causing a space-blank E to be moved forward, as previously described, the pin $c^{12}$ on the space-blank striking against the tail $c^{41}$ of the arm $c^{40}$, pivoted on the top of the block $c^4$, throwing the said arm around into its dotted-line position, Fig. 1, so as to be acted upon and lifted by the end of the type-setting arm $b$, to thus lift the plate $c^3$ to uncover the opening in the stick, the arm $b$ pushing the space-blank into the stick, it in turn pushing the types and block $c^7$ before it. (See Fig. 36.) Every time a space-blank is thus inserted the measuring device $c^{15}$ $c^{16}$ is by the same movement pushed one notch farther down the stick on the ratchet-bar $c^{26}$, to thus preserve the same relative amount of space for the types as if the wide space-blank had not been inserted. Now the space at the end of a line of type to be filled by justification must be taken up by increasing the width of each space in the line until the entire line is filled, and the greater the number of words in a line of type the greater will be the number of space-blanks inserted in setting up the line, and as there can be only a given amount of space at the end of a line to be filled by justification it follows that the greater the number of spaces among which the space to be justified may be subdivided the less will be the proportionate increase in width which it will be necessary to give to each space, and the less the number of spaces in the line the greater will be the increase in width which it will be necessary to give to each space in order to fill out the line. As the member $c^{16}$ of the measuring device moves through the entire space to be filled by justification, it is necessary to so vary the connections between it and the space-mold that the greater the number of space-blanks in the line the less will the mold be adjusted or enlarged for a given space to be filled by justification. Thus if only one space-blank is in the line the entire space to be filled by justification will have to be filled by an addition to the width of that space equal in width to the width of the space to be filled; but if there are four space-blanks in the line the mold will have to be moved or enlarged only one-fourth of the entire space to be filled by justification. Therefore not only is the measuring device moved one notch farther down every time a space-blank is inserted, but, through the rod $f^{30}$, the ratchet-bar $h^{34}$ is raised one notch each time a space-blank is inserted, it in turn raising the sliding block $h^{21}$ one notch on the radial arm $h^{22}$ for every space-blank, so that as the number of space-blanks inserted in the line increases the sliding block $h^{21}$ is moved up on the radial arm $h^{22}$ one notch at a time to thus proportionately decrease the movement of the same to lessen the size to which the mold will be enlarged or adjusted. This operation of setting the type is continued until the operator sees that the space between the movable member $c^{16}$ of the measuring device and the end of the block $c^7$ is such that he cannot get another word or syllable into the line, when he will draw the lever $f^5$ toward him, which will release the table, throw into operative position the clutch F, and cause the table to be rotated through one-half a revolution until stopped by the projection $f$ springing into the recess in the opposite side of the table and disengaging the clutch. The table as it begins its rotative movement throws the latch $r^{11}$ on the arm $r^{12}$ down behind the projection $r^{10}$ on the rod $r^9$, coupled to and controlling the clutch $r^7$ on the shaft $r^6$, and as the table is brought to a stop, having swung the line of type from the front to the back side of the machine adjacent to and parallel with the line of movement of the carriage, the arm $r^{12}$ will again spring back to its former position, but into the opposite notch, moving the rod $r^9$ to the left, Fig. 2, to throw the clutch $r^7$ into operative connection with the shaft $r^6$ and cause the latter to be rotated through one revolution, as described. In the meantime as the table is rotated the cam $h^5$ on the upper end of the pivotal shaft $D^7$ will release the rod $h^2$, permitting the latter to move to the right, Fig. 1, disengage the latch $h^6$, Fig. 2, and drop the rod $h^{13}$, yoke $h^{14}$, and roll $h^{15}$ in front of the roll-stud $d^{15}$ on the standard $d^9$, carried by the table D. The shaft $r^6$ as it finishes its rotation acts through its cam $h^{44}$ to release the weight H and permit the same to drop, pulling the vertical bar $h^{18}$, rod $h^{13}$, roll $h^{15}$, roll-stud $d^{15}$, and plate $d^{12}$ with it against the tension of the spring $d^{16}$, said plate $d^{12}$ acting, through the intermediate gears $d^{10}$ $d^8$ and rack $d^7$, described, to move the measuring-frame $D^7$ toward the center of the table, thereby acting through the mechanism shown in Fig. 9 to separate the fixed and movable members $c^{15}$ $c^{16}$ of the measuring device, the distance through which the movable member $c^{16}$ will be moved before coming into contact with and being stopped by the block $c^7$ determining the distance through which the weight H will fall and the amount of movement given to the bar $h^{18}$. As the weight H falls and pulls the bar $h^{18}$ with it said bar, acting through its slot $h^{19}$ on the pin $h^{20}$ on the rear side of the sliding block $h^{21}$, which has been moved upward on the radial arm as many teeth as there are spaces to be filled, acts through the clutch $h^{29}$ to rotate the shaft $h^{23}$, which in turn, acting through the head $h^{57}$ and the wheel $m'$, will move the movable wall of the type-mold outwardly a sufficient distance to adjust the mold to the proper size for each space to be inserted. Further movement of the shaft $r^6$ will apply the brake-shoe to the disk $r^{16}$ to prevent the various parts from further movement, release the slide-bar $r^{21}$ to permit the spring $r^{22}$ to move the bar to throw into operation the forward clutch movement of the carriage, and start the same down the track, the carriage as it leaves permitting the shaft $r^{36}$ to be rotated to catch and hold the brake-shoe in position against its disk, said shaft $r^6$ as it continues its rotation acting through the cam $r^{27}$ to release the sliding block $h^{21}$ and permit the same to drop to its lowermost position, the cam $r^{31}$ acting to lift the rod $r^{23}$ and raise the rod $h^{13}$, its yoke $h^{14}$, and the roll $h^{15}$ to their uppermost normal position while the cam $h^{44}$ is returning the weight H and radial arm $h^{22}$ to their normal elevated positions. The carriage continues its travel down the track until the releasing-trigger $o^{17}$ strikes against the projecting finger $e^3$ of the first space-blank encountered in the line of type now lying beside it, which throws the trigger back and releases the latch-bar $o^{13}$, permitting it to be drawn up by its spring $o^{19}$ to release the clutch-lever $o^9$ and permit it to be thrown over to throw out the forward feed, stop the carriage, and throw into operation the mechanism controlled by the wheel $o$ for molding and inserting a new space, the latch-bar $o^{13}$ being drawn up sufficiently far to drop the pin $o^{20}$ thereon below the path of movement of the clutch-lever $o^9$, so that the latter will not catch thereon and be thereby held in an intermediate inoperative position. The shaft $m^{49\times}$ of this mechanism will as it begins its rotation act to force the slide-bar $m^{58\times}$ out from the inner side of the carriage adjacent to the line of type, said slide-bar as it is forced out pushing before it the slide-bar $m^{51\times}$ on the auxiliary carriage $m^{50a}$, with which it had become hooked or connected at the beginning of its forward movement, as hereinbefore fully described, and will cause the finger $m^{52\times}$ to strike against the pin $E^2$ on the space-blank and push the same back out from the line of type to make room for the molded space. While the space-blanks are being removed by the slide-bar $m^{51\times}$ and its finger $m^{52\times}$, the type molding and inserting mechanism, which was set in operation at the time the carriage was stopped, is operated to bring the nose $n^{11}$ of the chamber $n^\times$ on the melting-kettle up to the fixed wall $n^2$ of the mold, the pump $n^{12}$ operated to force a quantity of molten type-metal into the mold, the nose withdrawn, the mold permitted to be forced down by the spring $n^4$ and cam $m^{14}$ to a position directly opposite the needle $m^{35}$, previously adjusted to proper position by the same operation which set the mold to the required size, the movable wall $n'$ of the mold, as the latter is dropped, moving down against the inclined face of the link or bar $m^{12}$, Fig. 25, which acts to force the movable wall to the left, Fig. 25°, to push the completed or molded space out from the mold into position directly in front of the needle $m^{35}$ and in front of its seat $m^{36}$, the said needle being then moved forward by the cam $m^{25}$, pushing the space with it directly after and into the space left by the retreating space-blank E, which is being withdrawn, as previously described, as shown in Fig. 37. The space-blank removed is considerably wider than any space which would be cast by the machine, so that an opening is left wider than the space inserted, which opening must be closed up. When the completed space is inserted in the line, it is inserted at that side of the opening left by the withdrawal of the space-blank which is next adjacent to the spring-actuated sliding block $c^7$, so that, although there will be a space between the opposite side of the needle and the type formerly next to the space-blank, still the needle, with its completed space, will prevent the spring-actuated block $c^7$ from moving forward, the type on the opposite side of the space being retained in position by the projecting finger $e^3$ on the space-blank, which is not fully withdrawn until the withdrawal of the needle, as in Fig. 37. In this position the head $m^{29}$, in which the needle $m^{35}$ moves, is carried bodily forward or to the right, Fig. 38, away from the type-mold $n$, carrying the needle and the space held thereby forward up to the type in front of it, and permitting the block $c^7$ to close up the type behind it, as in Fig. 38, thus closing up the space left by the withdrawal of the space-blank, after which the needle is withdrawn, permitting the spring-actuated block $c^7$ to further close the space left by the withdrawal of the needle. By this time the roll-stud $o^{27}$ on the disk $o^{28}$ has lifted the arm $o^{25\times}$ and moved the same to compress the spring $o^{25}$, said lifted arm catching under the hook $o^{50}$, Figs. 24 and 26, pivoted at $o^{51}$ to the bed M' and connected by a rod $o^{52}$ with the sliding rod $o^{53}$, acted upon by a spring $o^{54}$, which tends to keep the said hook normally in its operative position shown, while the projection $o^{31}$ on the periphery of the said disk will move the latch-bar $o^{29}$ to release the arm $o^{23}$ on the shaft $o^{22}$, permitting the free end of the spring $o^{25}$, through the link $o^{24}$, to throw the said arm $o^{23}$ to the left, Fig. 24, and rotate the shaft $o^{22}$ to cause its arm $o^{21}$ and pin $o^\times$ to move the clutch-lever $o^9$ back again to cause the clutch member $m^{49}$ to be again engaged with the wheel $o$ and cause the carriage to move forward again and to stop the type-molding mechanism from operation. As the arm $o^{23}$ is moved to the left by the spring $o^{25}$ it will strike against the projection $o^{55}$ on the sliding rod $o^{53}$ and move the same and the hook $o^{50}$, to which it is connected, to release the arm $o^{25\times}$, permitting it to again drop onto the stud $o^{27}$ on the disk $o^{28}$, so that no resistance will be offered to the return of the arm $o^{23}$ back to its normal position by the spring $r^{25}$, which holds the arm in this position until the carriage again stops and the rotation of the disk $o^{28}$ permits the latch $o^{29}$ to drop and hold it positively while the stud $o^{27}$ again compresses the spring. The parts are now in precisely the same position as when the carriage first began its movement, the operation of the various parts being precisely the same as each space-blank is reached, when the carriage is stopped by the engagement of the releasing-trigger $o^{17}$ with the projecting finger of the space-blank, a new space is cast, the next space-blank is withdrawn, and the new space is inserted, all in the same manner as described. This operation is continued until all the spaces have been filled and the line closed up, when the carriage, reaching the end of its movement, will be acted upon, as previously described, by the head $p^4$ and started upon its return movement. The line of type has now been set up and spaces of the proper width inserted between every two words, thus leaving the line of the length required, but on the revolving table D. It is therefore necessary to provide suitable mechanism for transferring this line of type from the revolving table to the usual galley employed by printers. Such a mechanism is illustrated in Figs. 40 to 46, inclusive, and is constructed as follows: The main frame A at the left in Fig. 1 supports the two guide rods or tracks $t$, between and on which slides the transferring-carriage T, (shown best in Fig. 43$^a$,) said transferring-carriage consisting of a base $t'$, on which is erected a standard $t^2$, its upper forked end presenting two arms $t^3$, in which is journaled the horizontal shaft $t^4$, from which hangs the transferring-block $t^5$, having a recess $t^6$ formed in one end, as shown at the left in Fig. 45$^a$, of a proper size to receive the line of type, said recess being partially closed at its front side by a thin plate or gate $t^7$, fastened to the block $t^8$, mounted to slide on the two guide-rods $t^9$, said block being held in its lowermost position, Figs. 40, 43$^a$, and 43$^b$, in contact with the block $t^5$ by springs $t^{10}$, encircling the guide-rods and bearing against suitable washers $t^{11}$ on the ends thereof. The block $t^8$, carrying the upper gate $t^7$, has hinged to its rear side, Fig. 43$^b$, a bar $t^{12}$, which extends down through the transferring-block $t^5$, Fig. 43$^b$, it being acted upon from below at the proper time and lifted, to thereby lift the block $t^8$ and gate $t^7$ to permit the removal of the type. The lower part of the recess $t^6$ is closed by a lower gate $t^{13}$, (see Fig. 40,) fast to a block $t^{14}$, mounted to slide on the fixed depending guide-rods $t^{15}$, encircled by springs $t^{16}$, tending to keep said block $t^{14}$ and gate $t^{13}$ in their normal elevated positions, as shown, to thus completely close the entrance to the recess $t^6$, the said block and its gate $t^{13}$ being moved and dropped at the same time the gate $t^7$ is raised for the withdrawal of the type, as will be described. The gate $t^{13}$ not only serves to close the lower part of the recess $t^6$, but also acts as a gate to retain the type in the galley. The bottom of the recess is formed by a thin plate $t^{17}$, upon which slides an ejecting-frame $t^{18}$, (see Figs. 44 and 45$^a$,) fitted to slide between suitable guides $t^{19}$, to which the bottom plate $t^{17}$ is attached, the front of said ejecting-frame forming the rear wall of the recess $t^6$, said frame being acted upon from the rear by a spring $t^{20}$, tending to keep the frame in its rearmost position with the recess $t^6$ of its maximum width. The ejecting-frame $t^{18}$ is provided with two inwardly-extended ears $t^{21}$, acted upon by the forked end of the bell-crank lever $t^{22}$, (see Figs. 44 and 45$^a$,) the end of the said lever being struck by a lug $t^{24}$, Fig. 45$^a$, on the bar $t^{12}$, referred to, when said bar is lifted to raise the upper gate $t^7$ of the recess $t^6$, causing the said bell-crank lever $t^{22}$ to be tipped on its pivot $t^{25}$, the forked end acting against the ears $t^{21}$ to move the ejecting-frame $t^{18}$ forward to eject the entire line of type from the recess $t^6$, as will be described. The shaft $t^4$ has fast to it an arm $t^{26}$, to which is jointed the rod $t^{27}$, extending through the ear $t^{28}$ on the frame A of the machine, said rod $t^{27}$ being fitted at its opposite ends with washers $t^{29}$, between which and the ear $t^{28}$ are interposed spiral springs $t^{30}$ $t^{31}$, the combined length of the two springs when expanded being slightly less than the length of the rod $t^{27}$, permitting the latter to be moved some distance in either direction before acting upon the springs. The shaft $m^{56}$, previously referred to, at the left-hand end of the machine has fast upon it a beveled pinion $u$, Fig. 42, which meshes with the bevel-wheel $u'$, fast on the vertical shaft $u^2$, journaled in suitable brackets or bearings $u^3$, secured to and carried by the portion A$^3$ of the main frame A, (see Fig. 42,) said shaft $u^2$ being therefore rotated continuously, it having fast upon it a pulley or sheave $n^4$, about which is extended an endless belt or cord $u^5$, passed at its opposite end about a similar pulley $u^6$, as best shown in Fig. 40, said endless belt traveling in the direction indicated by the arrow, Fig. 40. The base $t'$ of the transferring-carriage T is provided with a depending lug $t^\times$, Fig. 43, to which are pivoted at either side the clutch-sleeves $u^7$ $u^8$, through which the endless carrier $u^5$ passes, said clutch-sleeves being provided with upwardly-extended arms $u^9$ $u^{10}$, acted upon by springs $u^{11}$ $u^{12}$, which normally tend to draw the said levers to the left, Fig. 40, to thereby tip or turn the clutch-sleeves $u^7$ $u^8$ on their pivotal centers to cause them to grip the endless carrier $u^5$ to move the transferring-carriage T in one or the other direction, according as one or the other of the clutch-sleeves is tipped. The arm $u^9$, controlling the clutch $u^7$, is restrained from being moved by its spring $u^{11}$ by the spring-controlled pivoted latch $u^{13}$, (shown in Fig. 43,) said latch being moved to release the said arm $u^9$ to permit it to be moved by the spring $u^{11}$ by a slide-rod $u^{14}$, (shown in dotted lines, Fig. 41,) mounted in suitable bearings $u^{15}$ on the frame A, said slide-rod having a pin $u^{16}$, which enters a slot in the bell-crank lever $u^{17}$, pivoted at $u^{18}$, as shown, and connected by a link $u^{19}$ with one arm of the bell-crank lever $u^{20}$, pivoted at $u^{21}$, and having its other arm jointed to one end of the rod $u^{22}$, jointed at its opposite end to one end of the lever $u^{23}$, Fig. 47, pivoted at $u^{24}$ to a bracket $u^{25}$ on the under side of the inner guide-bar or track $z$, said lever $u^{23}$ at its outer end having pivoted to it the spring-controlled latch-block $u^{26}$, so arranged that the space-molding carriage M when moving down the track in front of the line of type and withdrawing the space-blanks and inserting in the place thereof the molded spaces will pass over the latch-block $u^{26}$ without moving the lever $u^{23}$, the said latch-block turning down before it; but as the carriage begins its return movement in the direction of the arrow 25, Fig. 41, it will strike against the latch-block $u^{26}$ and turn the lever $u^{23}$ on its pivot, moving the rod $u^{22}$ downward (see Fig. 40) and acting through the bell-crank levers $u^{20}$ and $u^{17}$ to push forward the push-rod $u^{14}$ against the action of the spring $u^{27}$ and move the latch $u^{13}$ to release the arm $u^9$ and permit the spring $u^{11}$ to turn the clutch-sleeve $u^7$ and cause it to grip the carrier $u^5$ passing through it, which carrier will immediately pull the clutch-sleeve and the carriage T, to which it is pivoted, with it to the right (see Fig. 40) toward the stick upon the table D, containing the line of type in which the molded spaces have been inserted. As the transferring-carriage T is moved to the right, Fig. 40, the rod $t^{27}$ will be drawn after it, and after moving a short distance the washer $t^{29}$ on the end of the rod will strike against the end of the spring $t^{30}$, which latter will retard the forward movement of the bar, so that the forward movement of the carriage will act through the arm $t^{26}$ to turn the shaft $t^4$ in the direction of the arrow, Fig. 40, causing the transferring-head $t^5$ to be turned down into the position Fig. 45, with the recess $t^6$ for the reception of the type in a horizontal rather than a vertical plane, the position of the recess then being such that when the carriage is stopped the recess $t^6$ will lie in line with and directly opposite the end of the opening $c^6$ in the stick C. The transferring-carriage T has two ears $s$, Figs. 40 and 43$^b$, in which slides the vertical rod $s'$, Fig. 40, having a toe $s^2$ at its lower end and jointed at its upper end to one end of the lever $s^3$, pivoted at $s^4$ to the standard $t^2$, as best shown in dotted lines, Fig. 43, said lever $s^3$ at its outer end being jointed to a vertical slide-rod $s^5$, having at its upper end a finger $s^6$. The base $t'$ of the transferring-carriage T also has an ear $s^7$, Fig. 43$^a$, to which is pivoted the movable inclined arm $s^8$, normally held in its lowermost position, as shown, by a spring $s^9$, said incline as the carriage T is moved to the right, Fig. 40, acting to lift the end of the lever $s^{10}$, pivoted at $s^{11}$ to the frame of the machine and normally held in its lowermost position by a spring $s^{12}$, said lever $s^{10}$ after being lifted by traveling up the incline dropping over the end of the same and down upon the toe $s^2$ on the rod $s'$, pulling the said rod down to thereby lift the finger $s^6$, Fig. 43$^b$, which as the carriage T moves forward lies directly under the hook $c^3$ on the plate $c$, Fig. 46, closing the end of the opening $c^6$ in the stick C to lift the said hook $c^3$ and permit the line of type acted upon by the spring-controlled sliding block $c^7$ in the stick to be pushed or ejected from the stick into the recess $t^6$ in the transferring-head $t^5$, previously turned down into a horizontal plane opposite the end of the stick, as described, the movement of the carriage T having been stopped in proper position by the lever $s^{10}$ dropping upon the projecting arm $s^{13}$ on the arm $u^9$ of the clutch-sleeve $u^7$, Fig. 43, at the same time that it drops down and depresses the toe $s^2$ on the rod $s'$, the said toe and arm $s^{13}$ lying side by side, thereby turning the said clutch into its normal horizontal position to release its grip on the carrier $u^5$ and stop the movement of the carriage at the same time that the plate $c$ is being lifted from the end of the stick C, so that immediately as the carriage is stopped the line of type in the stick is pushed therefrom into the recess $t^6$ in the head $t^5$. The space $t^6$, which is to receive the line of type from the stick, is normally filled by a sliding bar $t^{31}$, (see Figs. 43$^a$, 43$^b$, and 44,) which bar is retained in its extreme right-hand position, Fig. 44, by means of a spring $t^{34}$. When the line of type is forced endwise from the stick into the recess $t^6$ by the sliding block $c^7$ in the stick, the end of the line of type first strikes the slide-bar $t^{31}$, which fills the recess and pushes the slide-bar ahead of it out from the recess as the line is forced into the recess, the said slide-bar serving to keep the types composing the line together and prevent their falling apart during the operation of transferring the line from the stick to the galley. This slide-bar $t^{31}$ has two guide pieces or screws $t^{32}$, (shown best in Fig. 44,) which slide in suitable slots in a rib $t^{33}$, depending from the under side of the block $t^5$, the said guide-pieces acting to guide the slide-bar in its sliding movements in and out of the recess. Should the length of the line of type be less than the length of the recess, the filling slide-bar described fills the extra space and maintains the line of type always pushed tightly against that end of the recess at which it entered. When the block $c^7$, acted upon by the spring $c^{14}$, arrives at the end of the stick, having pushed the last type into the recess $t^6$, the projection or ear $c^x$, previously referred to, on the under side of the block will strike against the arm $u^{28}$ on the end of the vertical shaft $u^{29}$, Figs. 40 and 43$^b$, mounted in suitable bearings on the standard $t^2$, said shaft having an arm $u^{30}$ at its lower end connected by a link $u^{31}$ with a similar arm $u^{32}$ on the end of the vertical shaft $u^{33}$, also mounted in suitable bearings on the standard $t^2$, and carrying at its lower end a catch $u^{34}$, which normally holds the arm $u^{10}$, controlling the clutch-sleeve $u^8$, in a vertical position against the action of the spring $u^{12}$; but as the pin $c^x$ on the under side of the block $c^7$ strikes against the arm $u^{28}$ it will cause the shafts $u^{29}$ and $u^{23}$ to be rotated to disengage the catch $u^{34}$ from the arm $u^{10}$ on the clutch $u^8$ and permit the spring $u^{12}$ to pull the said arm $u^{10}$ over to thereby tip the clutch-sleeve $u^8$ and cause it to grip the endless carrier or rope $u^5$, which on this side moves in the opposite direction from that on the other side, which moved the carriage up to the stick, and will now act to return the carriage T, now carrying the line of type in its recess $t^6$, (still, however, in a horizontal plane,) to the left, Fig. 40. As the carriage moves to the left the rod $t^{27}$ will be moved to the left with it, thereby permitting the relaxation of the spring $t^{30}$, when immediately thereafter the collar $t^{29}$ on the said rod will strike against the end of the spring $t^{31}$, which will retard the movement of the rod $t^{27}$ in that direction, causing the arm $t^{26}$ to be turned down to the right, (see Fig. 40,) and thereby rotate the shaft $t^4$ in the opposite direction from before to turn the transferring-head $t^5$ up into its former position, Fig. 2, with the recess $t^6$, carrying the line of type, now in a vertical position, as shown in full lines, Fig. 43, in readiness to be ejected upon the galley. The arm $u^{10}$ on the clutch-sleeve $u^8$ is moved into its normal vertical position to stop the return movement of the carriage at the proper point by means of a stop $u^\times$, Fig. 40, on one side of the guide $t$. The line of type is now confined within the recess $t^6$ and back of the movable gates $t^7$ and $t^{13}$, which gates must be separated in order to permit the full line of type to be ejected upon the galley $w$ by the ejecting-frame $t^{18}$ described. The vertical shaft $u^2$ at its upper end has fast to it a bevel-pinion $v$, in mesh with the bevel-wheel $v'$, loose on the horizontal shaft $v^2$, journaled in the auxiliary frame $A^3$, said wheel $v'$ being formed to coöperate with the friction-disk $v^3$, carried by the hub $v^4$, splined to the shaft $v^2$, to form a clutch mechanism, said member being moved to grip the revolving wheel $v'$ to rotate the shaft $v^2$ by an arm $v^5$, lying in the path of movement of and adapted to be struck by a projecting arm $v^6$ on the transferring-carriage T, said projecting arm striking the said arm $v^5$ just before the carriage is to stop to throw into operation the clutch $v^4$ and cause the shaft $v^2$ to be rotated, it carrying a cam $v^7$, which acts upon a roll or other stud $v^8$ on and to lift the outer end of the lever $v^9$, pivoted at $v^{10}$, Fig. 40, and having its opposite end connected by a link $v^{11}$ with the block $t^{14}$, carrying the lower gate $t^{13}$, which partially closes the entrance to the recess $t^6$. The upper gate $t^7$ is at the same time lifted by means of a cam $v^{12}$ on the shaft $v^2$, Fig. 42, which acts upon a stud $v^{13}$ to depress the outer end of a lever $v^{14}$, Fig. 43$^a$, pivoted at $v^{15}$ and connected by a link or connecting-rod $v^{16}$ with an arm $v^{17}$ on a short horizontal shaft $v^{18}$, carrying at its outer end an arm $v^{19}$, which acts upon the lower end of and lifts the rod $t^{12}$, connected with and lifting the block $t^8$ and upper movable gate $t^7$, thus leaving the line of type free to be pushed forward out from the recess upon the galley $w$ by the ejecting-frame $t^{18}$, moved by the bell-crank lever $t^{22}$, acted upon by the lug $t^{24}$ on the bar $t^{12}$ as the latter is lifted to withdraw the upper movable gate.

The line of type is confined within the recess $t^6$ during the operation of transferring to prevent its dropping out through the entrance side of the recess by means of a retaining-plate $g$, Figs. 44 and 45$^a$, normally pressed down against the bottom supporting-plate $t^{17}$, closing the entrance to the recess by a spring $g^2$; but during the movement of the transferring-carriage T toward the stick C as the head $t^5$ is turned down into a horizontal position to receive the type the edge 10 of the plate $g$ will strike against the end of the stick and be pushed back to its dotted-line position, Fig. 45, and full-line position, Fig. 45$^a$, thereby uncovering the entrance to the recess $t^6$ to permit the line of type to be inserted therein, and as the carriage begins its return movement, leaving the stick, the spring $g^2$ will throw the plate $g$ back again into position to close the recess $t^6$ and retain the line of type therein during the operation of transferring. When the type has been deposited upon the fixed galley by the ejecting-frame $t^{18}$, the lower gate $t^{13}$ is again lifted partially to its former position to prevent the type from falling back as the ejecting-frame is withdrawn, said ejecting-frame being cut away slightly at 50 on its under side to permit the lower wall $t^{13}$ to be partially raised before the frame begins its return movement, the line of type thus deposited upon the fixed galley remaining there until the next succeeding line is deposited in like manner behind it, when it is pushed forward a distance equal to the thickness of the type, this operation being repeated, the lines of type being moved forward as each succeeding one is deposited upon the fixed galley $w$ until the same are forced from the fixed galley into the removable galley $w'$, which, when full, is locked up by the printer and removed for proof-printing in the usual manner.

It is desirable to have the cam-shaft $v^2$ rotated through one revolution at a time only in order to prevent repeated operation of the transferring mechanism previously described, one rotation of the shaft performing all the movements necessary for the ejectment of the type. To stop the rotation of the shaft after it has made one revolution, it is provided with a cam $v^{20}$, Fig. 47, which coöperates with a lever $v^{21}$, pivoted at $v^{15}$ and provided with a projection $v^{22}$, as shown best in Fig. 40, a spring $v^{23}$ acting to keep said lever in its position, as shown. The cam $v^{20}$ will act upon the lever $v^{21}$ just before the shaft $v^2$ has completed one revolution and will lift the said lever until the projection $v^{22}$ contacts with the stop $v^{24}$, thereby preventing further lifting of the lever, the shaft having now nearly completed its revolution, when, further lifting of the lever $v^{21}$ being impossible, the cam $v^{20}$ will push the same and the carriage T, to which it is attached, to the right, Fig. 40, away from the cam, withdrawing the projection $v^6$ from behind the arm $v^5$, controlling the clutch $v^3$, and permitting the spring $v^\times$ to move the said arm $v^5$ to disengage the clutch and stop the rotation of the shaft $v^2$.

If the length of the line were fixed before any of the type were set up and the space-blanks were inserted between every two words, they would soon fill up the line, owing to their abnormal width, and to obviate this the end of the line (which is formed by the measuring device) is moved away, as described, from the end of the stick a distance substantially equal to the width of a space-blank every time one of the latter is inserted, so that the same amount of space is retained in the line to be occupied by the type forming the words as would be the case were the space-blanks not inserted; but if the end of the line (which is the measuring device) were moved away from the end of the stick a distance exactly equal to the width of a space-blank whenever one of the latter was inserted in the line the operator might through carelessness completely fill the line with type, thus leaving no room for spaces between the words when the space-blanks were withdrawn and the line closed up to its proper length, for the reason that the line would be shortened by a distance exactly equal to the aggregate width of all the space-blanks withdrawn. To obviate this, the ratchet-teeth on the bar $c^{26}$ will preferably be made slightly less in length than the width of a space-blank, so that whenever a space-blank is inserted in the line the end of the line (which is the measuring device) is moved back a distance slightly less than the space taken up by the space-blank, this difference between the length of the teeth and the width of the space-blanks being preferably about one thirty-second of an inch, so that whenever a space-blank is inserted the line is actually lengthened by one thirty-second of an inch. Thus if the space-blanks are one-half inch wide the teeth on the bar $c^{26}$ would be fifteen thirty-seconds of an inch in length, so that whenever a space-blank is inserted in the line, taking up one-half inch in the line, the end of the line will be moved back only fifteen thirty-seconds of an inch, which is equivalent to inserting a space one thirty-second of an inch in width. Thus a space of at least one thirty-second of an inch in width between every two words is always assured, and therefore the smallest space which the mold is set to cast would be one thirty-second of an inch in width, varying from that upward, according to the additional space in the line which is to be filled by justification.

In the foregoing specification I have described the best mechanism at present known to me for carrying out my invention. Many equivalent devices may be substituted for various parts of said mechanism, and hence the specific construction and arrangement illustrated are not of importance.

The mode of operation of the machine described and the important elements and combinations in the mechanism are of my invention, and for such I desire broad protection. I believe myself to be the first to justify lines of type by forming or manufacturing spaces for justification after the type are assembled, the first to cast spaces for justification after the type are assembled, the first to measure an assembled unjustified line and provide a justifier controlled automatically by the measuring devices, the first to provide a justifying-lever with suitable connections whereby the shortage in a line to be justified is distributed uniformly in the word-spaces, the first to use a justifying-lever having connections with the word-space key, the device for measuring the unjustified line, and the device for determining the width of the justifying-spaces, the first to use a plurality of sticks which are automatically circulated between the assembling mechanism and the justifying mechanism, and the first to interpose a rotating table provided with sticks between an assembling mechanism and a justifying mechanism.

Without, therefore, limiting myself to the construction and arrangement illustrated and described, I claim—

1. A mechanism for justifying composed lines of type, comprising means for forming justifying-spaces and means for inserting them in the lines.

2. A mechanism for justifying composed lines of type, comprising means for forming justifying-spaces and means for parting the lines between words and inserting the justifying-spaces.

3. A mechanism for justifying lines of type composed with temporary spaces, comprising means for removing the temporary spaces, and means for forming justifying-spaces and inserting them in lieu of the temporary spaces.

4. A mechanism for justifying lines of type composed with temporary spaces, comprising means for parting the lines at the temporary spaces, means for forming justifying-spaces, and means for inserting the justifying-spaces in the lines in lieu of the temporary spaces.

5. The combination with means for assembling type into lines and means for justifying, of a plurality of sticks arranged to circulate between the assembling means and the justifying means.

6. The combination with means for assembling type into lines and means for justifying, of a plurality of sticks arranged to circulate between the assembling means and the justifying means, and a separate series of space-blanks for each stick.

7. The combination with means for assembling type into lines and means for justifying the lines, of a plurality of sticks arranged to circulate between the assembling means and the justifying means, the said assembling and justifying means being operative simultaneously and independently, whereby one line may be justified while the succeeding line is being assembled.

8. The combination with a movable table and a plurality of sticks mounted on said table, of independent means for assembling and justifying lines of type in the sticks, said table being movable to carry each stick from the assembling means to the justifying means and to return it to the assembling means.

9. A mechanism for justifying composed lines of type comprising a device for measuring the unjustified line, and means controlled by said measuring device for forming justifying-spaces.

10. A mechanism for justifying a composed line of type comprising a device for measuring an unjustified line to ascertain the total shortage, and devices for dividing the said shortage by the number of word-spaces in the line.

11. A mechanism for justifying a composed line of type comprising devices for measuring an unjustified line, devices for dividing the shortage in the line by the number of word-spaces, and means controlled by said devices for forming justifying-spaces adapted to justify the line.

12. A mechanism for justifying a composed line of type comprising an adjustable space-mold, a melting-pot, devices for measuring an unjustified line, devices for dividing the shortage in the line by the number of word-spaces, and connections whereby the mold is adjusted once for each line by the said devices.

13. In a justifying mechanism a device for measuring an unjustified line, and a lever and coöperating devices constructed to divide the shortage of the unjustified line by the number of word-spaces in the line.

14. In a mechanism for justifying composed lines of type, a justifying-lever, a device in connection with said lever for measuring an unjustified line, and a second device movable relatively to the lever in proportion to the number of spaces in the line.

15. In a mechanism for justifying lines of type, devices for measuring an unjustified line, in combination with a lever operatively connected to said devices, and a part coöperating with said lever and means for adjusting said part relatively to the lever in accordance with the number of word-spaces in the line.

16. In a justifying mechanism, a justifying-lever, a space-key, and a part coöperating with said lever and adjustable from the said key, its relation to the lever for each line depending upon the number of spaces in the line.

17. In mechanism for justifying composed lines of type, a justifying-lever, a measuring device, a word-space key, and an adjustable space-determining device, all coöperating.

18. In mechanism for justifying composed lines of type, a justifying-lever, connections between said lever and a movable part which determines the width of justifying-spaces, a slide for moving the lever, said slide being movable in proportion to the shortage of the assembled line, an adjustable connection between the justifying-lever and the slide, and means controlled by the space-key for adjusting said connection.

19. In a mechanism for justifying, a justifying-lever, devices connected with the lever for measuring the composed line, a connection of said lever adjustable from the space-key in proportion to the number of spaces in the line, a weight for operating the lever and a cam arranged to regulate the movement of the weight.

20. A mechanism for justifying composed lines of type, comprising means for casting justifying-spaces and inserting them in the lines.

21. A mechanism for justifying composed lines of type, comprising means for parting the lines between words, and means for casting and inserting justifying-spaces.

22. A mechanism for justifying lines of type composed with temporary spaces, comprising means for removing the temporary spaces, and means for casting justifying-spaces and inserting them in lieu of the temporary spaces.

23. A mechanism for casting justifying-spaces and inserting them in a composed line of type, comprising a mold, a melting-pot, a pump, means for parting the line, means for operating the pump when the line is parted, and devices for transferring the resulting cast space to the line.

24. In mechanism for justifying composed lines of type, a space-forming device, a movable carriage upon which said device is mounted, means for moving the carriage along the composed line and stopping said movement at proper points, and means for forming and inserting a justifying-space each time the carriage stops between words of a line.

25. In a machine for assembling and justifying type, mechanism to assemble the type in lines with space-blanks between the words, a space-mold, means for adjusting the mold to cast justifying-spaces for each line, and means for substituting said spaces for the space-blanks in the line.

26. In a machine for assembling and justifying type, mechanism for assembling the type in lines, a space-mold, and mechanism for moving the line of type and the mold relatively to each other and for successively molding justifying-spaces and inserting them in the line.

27. In a machine for justifying lines of type composed with temporary space-blanks, means for lengthening the device within which the line is confined for measurement in proportion to the number of space-blanks in the line, in combination with a measuring device constructed to measure the shortage in the line required to be filled by justification, and means for substituting justifying-spaces for said space-blanks.

28. The combination with mechanism for assembling a line of type and space-blanks upon a stick, of a movable part forming one end of the stick and means for retreating said part to lengthen the stick each time a space-blank is assembled, said part remaining immovable when character-type are assembled.

29. The combination with mechanism for assembling a line of type and space-blanks upon a stick, of a movable part forming one end of the stick, a ratchet and pawl for operating said part, a space-key, and means controlled by the space-key for moving said part each time said space-key is operated.

30. In a machine for assembling and justifying type, the combination with a stick, of means for assembling type and space-blanks upon the stick, a part upon said stick for gaging the length of line, and means for moving said part each time a space-blank is assembled an amount less than the width of such space-blank, said part remaining immovable when character-type are assembled.

31. A stick to receive the type, a plate $c^3$ closing the end thereof and having a hook $c^{18}$, and a yielding block $c^7$, combined with a type-assembling arm to place the type in the stick in front of said yielding block, and having a projection to engage and lift said hook and its plate $c^3$.

32. A stick to receive the type, combined with a type-assembling arm $b$, and a yielding guard carried thereby and having ears to hold the type.

33. The combination of a guideway closed at one end; a moving carrier to convey the type along the guideway in succession; a type-assembling arm to pick the leading type from the guideway and insert it in a stick; and a retaining device operated in conjunction with the type-assembling arm and adapted to retain the next succeeding type while the arm is depositing a type in the stick.

34. The combination of the revolving disk, the guideway, the spring-pressed brake, the pivoted type-setting arm, and the stick, said arm operating to release the brake at intervals to permit the type to advance.

35. A movable stick to receive the type, combined with a type-assembling arm, and means controlled by movement of the stick to control the operation of the said arm.

36. A movable table, and a stick thereon, and a table-operating mechanism, combined with a type-assembling arm, and mechanism to move said type-assembling arm adapted to be rendered inoperative by movement of the table-operating mechanism.

37. In a machine for assembling and justifying type, a stick to receive the type and space-blanks; a measuring device movable between the end of the stick and the end of the line; and mechanism regulated by movement of said measuring device and adapted to supply spaces of the proper size for and in place of the space-blanks in the line.

38. In a machine for assembling and justifying type, a stick to receive the type and space-blanks; and a yielding block in said stick to keep the type pressed toward the end of the stick, combined with a measuring device also arranged in said stick and adapted to compress and measure the assembled line for justification.

39. In a machine for assembling and justifying type, a stick to receive the type and space-blanks; a yielding block to keep the type and space-blanks pressed together and toward the end of the stick, combined with a measuring device also arranged in said stick and adapted to be moved farther away from the entrance to the stick whenever a space-blank is inserted in the stick.

40. A stick to receive the type and space-blanks, combined with the measuring member $c^{16}$, means tending to move said member away from the entrance end of the stick, the pawl $c^{24}$, ratchet-toothed bar $c^{26}$, and means controlled by the space-blank-inserting mechanism to release said pawl and permit the member $c^{16}$ to move back one tooth as each space-blank is inserted.

41. A stick to receive the type and space-blanks, combined with the measuring-device member $c^{16}$, means to move it away from the entrance end of the stick, the pawl $c^{24}$, ratchet-toothed bar $c^{26}$, and the notched pivoted plate $c^{29}$.

42. A stick to receive the type and space-blanks, and mechanism for inserting type in the said stick, combined with a series of space-blanks permanently associated with the stick, and mechanism to assemble them successively in the stick.

43. A stick to receive the type and space-blanks, and mechanism for inserting type in the said stick, combined with a series of space-blanks permanently associated with the stick, and mechanism to push them in front of said stick into position to be pushed into the stick by the type-assembling mechanism.

44. In a machine for setting and justifying type, a revolving table carrying two sticks to receive the type and space-blanks as they are assembled, a type-assembling mechanism arranged to assemble type and space-blanks in the sticks at one side of the table, a space-molding device arranged at the opposite side of the table, and mechanism to withdraw the space-blanks, and to mold and insert spaces in place thereof.

45. In a type assembling and justifying machine, a stick, and a type-assembling mechanism therefor, combined with a series of space-blanks E, carriers $e$, and guides therefor.

46. In a type assembling and justifying machine, a stick, and a type-setting mechanism therefor, combined with a series of space-blanks E, carriers $e$, and means to release said carriers one at a time as the space-blanks are inserted in the line.

47. In a type assembling and justifying machine, a stick, a type-assembling mechanism therefor, a series of space-blanks and mechanism to insert them one at a time in the stick, combined with automatic means to return the space-blanks to their normal position when the line is justified.

48. In a type-justifying machine, a revolving table carrying two sticks to receive the type and space-blanks, a carriage carrying a space-mold, means for moving the carriage along the line of type, means to withdraw the space-blanks and insert the molded spaces in place thereof, and mechanism actuated by rotation of the table to start the carriage in its movement.

49. In a type-justifying machine, a stick to receive the type and space-blanks, and a continuously-rotating shaft, combined with a carriage carrying a space-mold, and mechanism actuated by and connected with the said continuously-rotating shaft to operate the mold and to cause the carriage to move down along the line of the type.

50. In a type-justifying machine, a stick to hold a line of type and space-blanks, a continuously-rotating shaft having a worm splined thereto, combined with a carriage carrying a space-mold, mechanism connected with said worm through a clutch to operate said mold, forward and return feed mechanisms also connected with said worm through clutches, and suitable controlling devices for said clutches.

51. In a type-justifying machine, a stick to hold a line of type and space-blanks, and a continuously-rotating shaft having a worm splined thereto, combined with a carriage carrying a space-mold, mechanism to operate said mold, feed mechanisms to feed the carriage in both directions, and a clutch device operated by said worm when in one position to set in motion the mold-operating mechanism and when in another position to set in motion the forward feed mechanism.

52. In a type-justifying machine, a stick to hold a line of type, a series of space-blanks one of which is inserted between each two words in the line, each space-blank having a portion projecting beyond the face of the type, combined with a movable carriage carrying a space-mold, and mechanisms to move the said carriage forward in front of the line of type, to stop it on striking against the projecting portions of the space-blanks, and to withdraw the same in succession and to insert molded spaces in lieu of said space-blanks.

53. In a type-justifying machine, a movable stick to receive the type and space-blanks as they are assembled; a measuring device movable against the end of the line of type; a space-mold, a pivoted lever connected to a movable part of said mold; a connection between the measuring device and said lever, made operative by movement of the stick, and means whereby the point of attachment of said connection to said lever is varied by the mechanism for assembling the space-blanks.

54. In a type-justifying machine, a stick to receive the type and space-blanks; a carriage carrying a space-mold, mechanism controlled by the shortage in the line and the number of space-blanks to adjust said mold, a detachable connection between that portion of the mechanism on the carriage and that portion on the machine-frame, and a brake device to hold the parts on the frame fixedly in position while the carriage is moving.

55. A stick to receive type and space-blanks as they are assembled in line, combined with a carriage adapted to move along the line of type, a space-mold thereon, and mechanisms upon the carriage to cast spaces, to eject them from the mold, and to insert them in the line of type in lieu of the space-blanks.

56. The frame, a stick thereon to receive the type and space-blanks as they are assembled in line, a carriage adapted to move along the line of type, a space-mold and mechanisms thereon to cast spaces and insert them in the line of type in place of the space-blanks, and mechanism on the frame controlled from the carriage to withdraw each space-blank previous to the insertion of a space.

57. In a machine for assembling and justifying lines of type, a magazine of space-blanks, means for inserting said space-blanks in assembling lines of type, an automatic justifying mechanism constructed and arranged to insert justifying-spaces in lieu of the space-blanks, and means for automatically removing said space-blanks from the lines and returning them to their magazine.

In testimony whereof I have signed my name to this specification in the presence of two subscribing witnesses.

PATRICK H. McGRATH.

Witnesses:
FREDERICK L. EMERY,
EMMA J. BENNETT.